United States Patent
Katsumata

(10) Patent No.: US 9,291,972 B2
(45) Date of Patent: Mar. 22, 2016

(54) DISPLAY APPARATUS, IMAGE FORMING APPARATUS, CUSTOMIZING METHOD, AND PROGRAM

(75) Inventor: Motoyuki Katsumata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 314 days.

(21) Appl. No.: 13/579,654

(22) PCT Filed: Mar. 1, 2011

(86) PCT No.: PCT/JP2011/055179
§ 371 (c)(1),
(2), (4) Date: Aug. 17, 2012

(87) PCT Pub. No.: WO2011/108743
PCT Pub. Date: Sep. 9, 2011

(65) Prior Publication Data
US 2012/0324399 A1 Dec. 20, 2012

(30) Foreign Application Priority Data

Mar. 5, 2010 (JP) .................................. 2010-049361

(51) Int. Cl.
G06F 3/00 (2006.01)
G06F 3/048 (2013.01)
G03G 15/00 (2006.01)
(Continued)

(52) U.S. Cl.
CPC ............ *G03G 15/502* (2013.01); *G06F 9/4443* (2013.01); *H04N 1/00466* (2013.01); *H04N 1/00474* (2013.01); *H04N 1/00482* (2013.01);
(Continued)

(58) Field of Classification Search
None
See application file for complete search history.

(56) References Cited

U.S. PATENT DOCUMENTS 4,961,070 A * 10/1990 Maher et al. ................... 715/792
8,107,844 B2 * 1/2012 Harigae ........................... 399/81
(Continued)

FOREIGN PATENT DOCUMENTS

JP 2007-249863 9/2007
JP 2008-097305 4/2008

OTHER PUBLICATIONS

International Search Report Issued May 24, 2011 in PCT/JP2011/055179 Filed on Mar. 1, 2011.
(Continued)

*Primary Examiner* — Weilun Lo
*Assistant Examiner* — Stella E Higgs
(74) *Attorney, Agent, or Firm* — Oblon, McClelland, Maier & Neustadt, L.L.P.

(57) ABSTRACT

A display apparatus which displays an operation screen of one or more function-setting components including setting information of a function of an application. The apparatus includes a function list display unit which displays a list of functions for each application software; layout specifying information specifying a layout of the function-setting components on the operation screen; display mode information defining a display mode of setting information and the setting information for each function; a screen generating unit which generates a function-setting component list screen which displays in a list the function-setting component of the function; and an arrangement determining unit which determines an arrangement in the operation screen of a function-setting component to be arranged, a selection of which is accepted from the function setting component list screen, and updates the layout specifying information with a layout including the function-setting component to be arranged.

11 Claims, 47 Drawing Sheets

(51) Int. Cl.
*G06F 9/44* (2006.01)
*H04N 1/00* (2006.01)

(52) U.S. Cl.
CPC ........ *H04N 1/00514* (2013.01); *H04N 1/00925* (2013.01); *H04N 2201/0094* (2013.01)

(56) References Cited

U.S. PATENT DOCUMENTS

| | | | | |
|---|---|---|---|---|
| 2004/0113941 | A1* | 6/2004 | Sliwa et al. | 345/744 |
| 2004/0125141 | A1* | 7/2004 | Mori | 345/765 |
| 2004/0216058 | A1* | 10/2004 | Chavers et al. | 715/810 |
| 2005/0162399 | A1* | 7/2005 | Yamada | 345/173 |
| 2006/0171732 | A1* | 8/2006 | Yamada | 399/81 |
| 2006/0217826 | A1* | 9/2006 | Matsuya | 700/90 |
| 2006/0232811 | A1* | 10/2006 | Yokoyama | 358/1.14 |
| 2006/0282782 | A1* | 12/2006 | Yamada | 715/733 |
| 2007/0083827 | A1 | 4/2007 | Scott et al. | |
| 2007/0180236 | A1 | 8/2007 | Kuroyanagi et al. | |
| 2007/0198845 | A1* | 8/2007 | Morikawa | 713/182 |
| 2008/0141148 | A1* | 6/2008 | Ogita | 715/762 |
| 2008/0141167 | A1* | 6/2008 | Kubo et al. | 715/796 |
| 2008/0276165 | A1* | 11/2008 | Aono | 715/248 |
| 2008/0304849 | A1* | 12/2008 | Harigae | 399/83 |
| 2009/0055764 | A1* | 2/2009 | Katsumata | 715/764 |
| 2009/0064002 | A1* | 3/2009 | Katsumata et al. | 715/762 |
| 2009/0067347 | A1* | 3/2009 | Kimura | 370/255 |
| 2009/0183109 | A1* | 7/2009 | Dan | 715/788 |
| 2009/0316184 | A1* | 12/2009 | Ohyama et al. | 358/1.15 |
| 2012/0015624 | A1 | 1/2012 | Scott et al. | |

OTHER PUBLICATIONS

Extended European Search Report issued Apr. 1, 2014 in Patent Application No. 11750851.5.

* cited by examiner

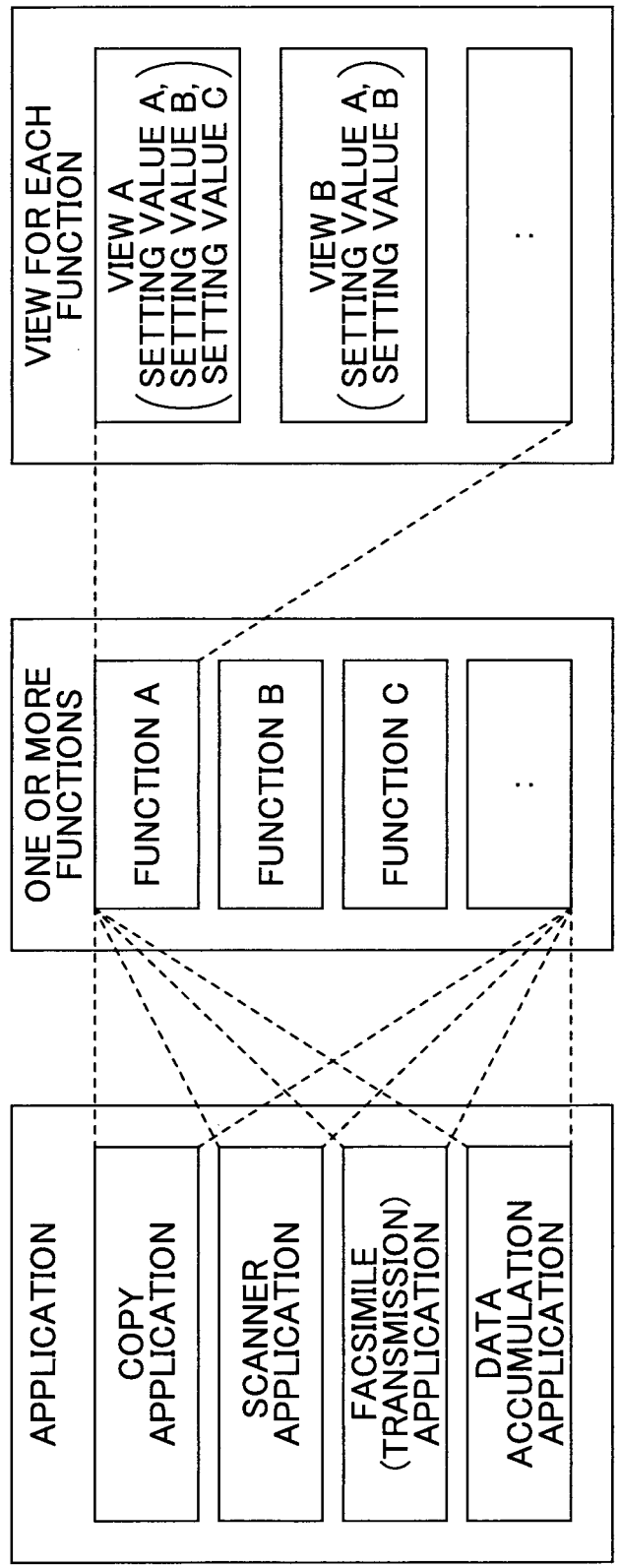

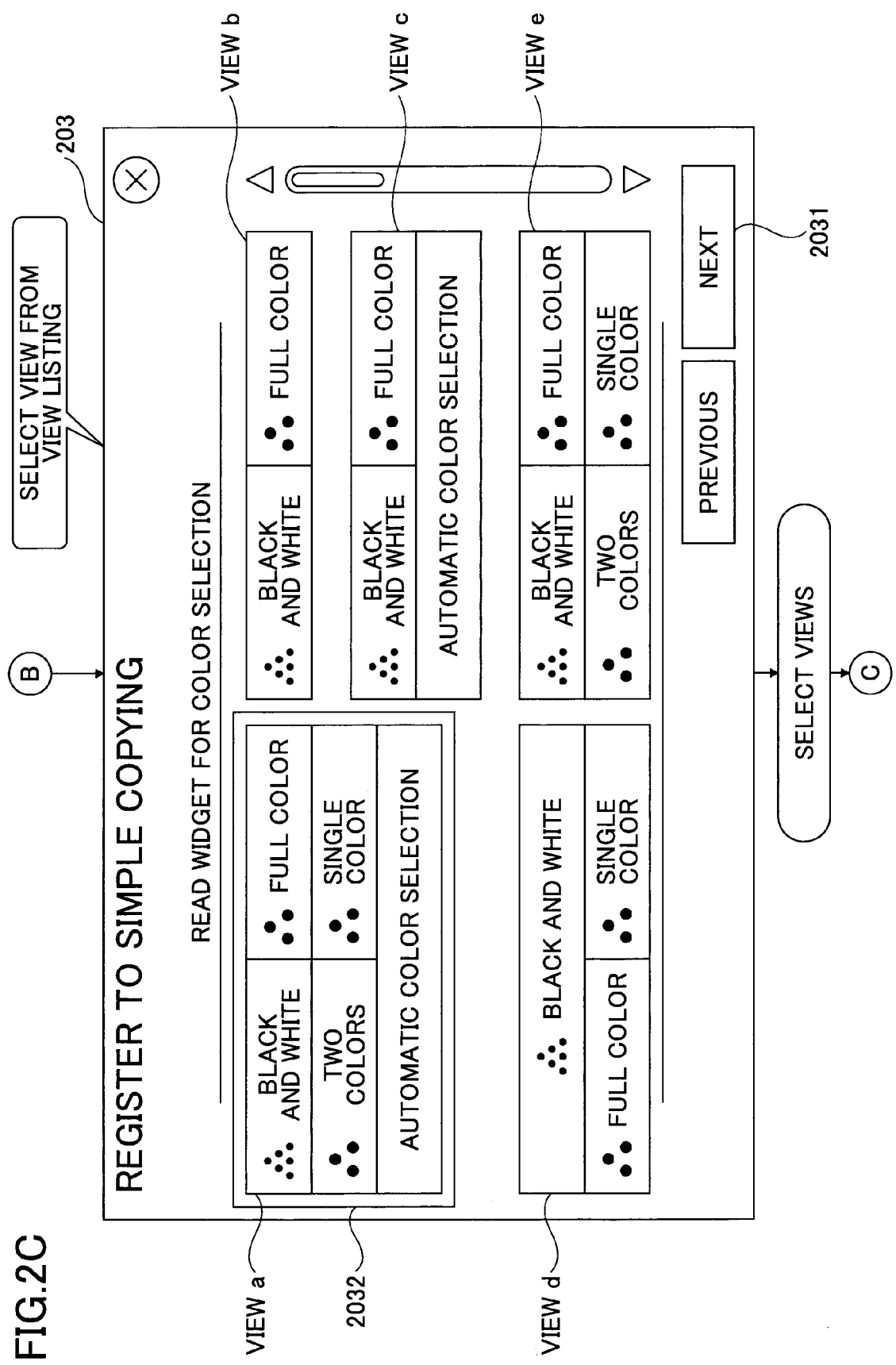

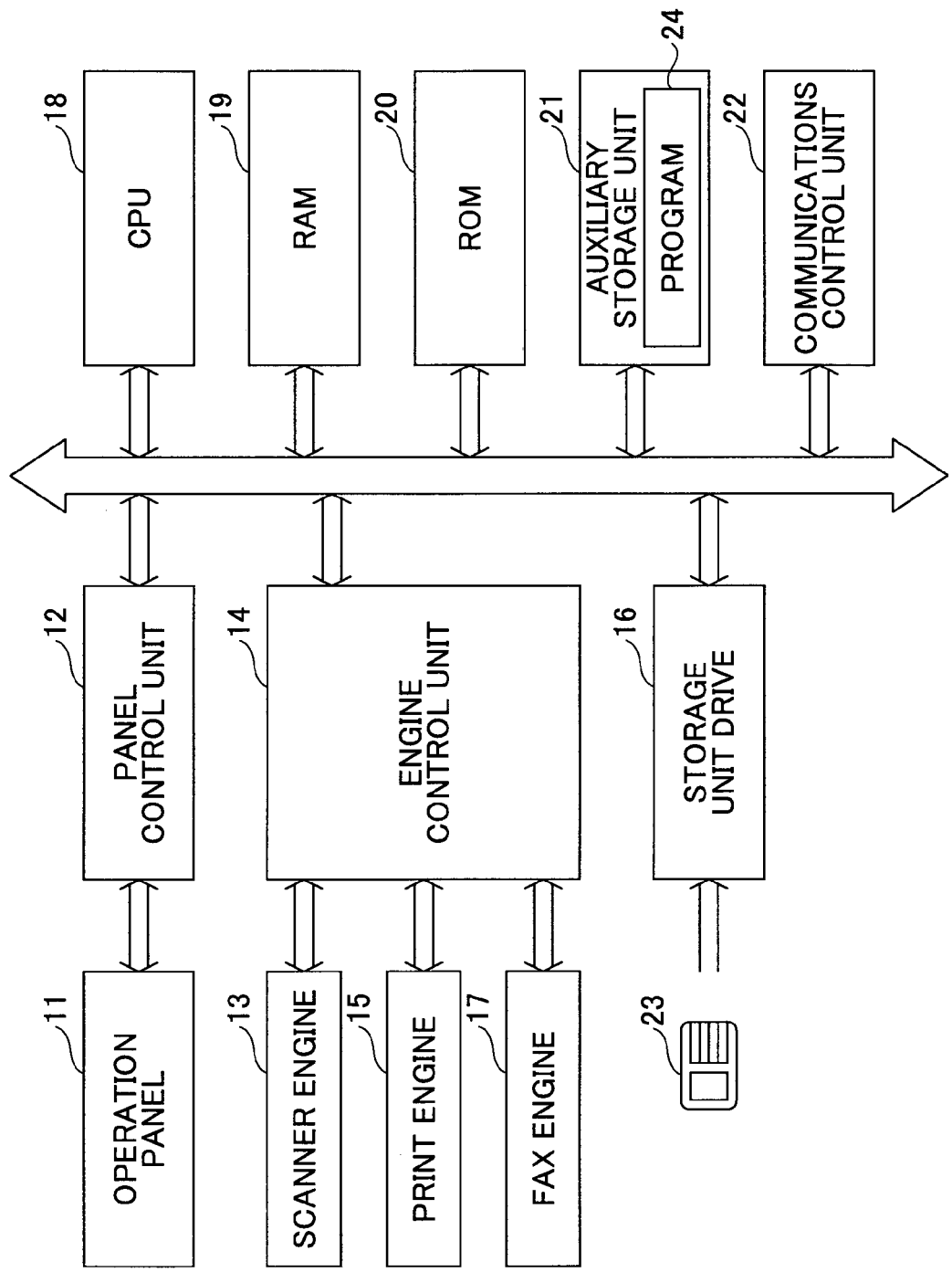

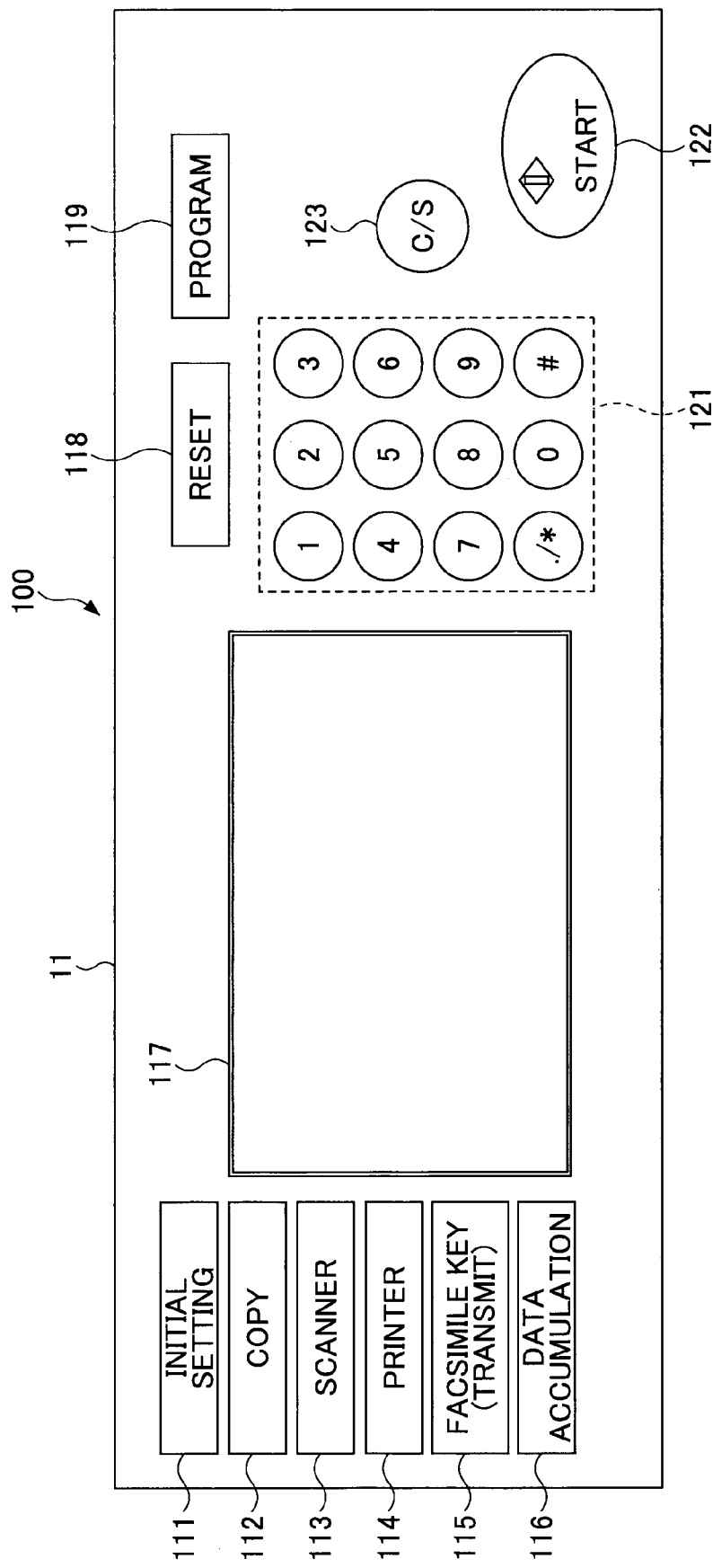

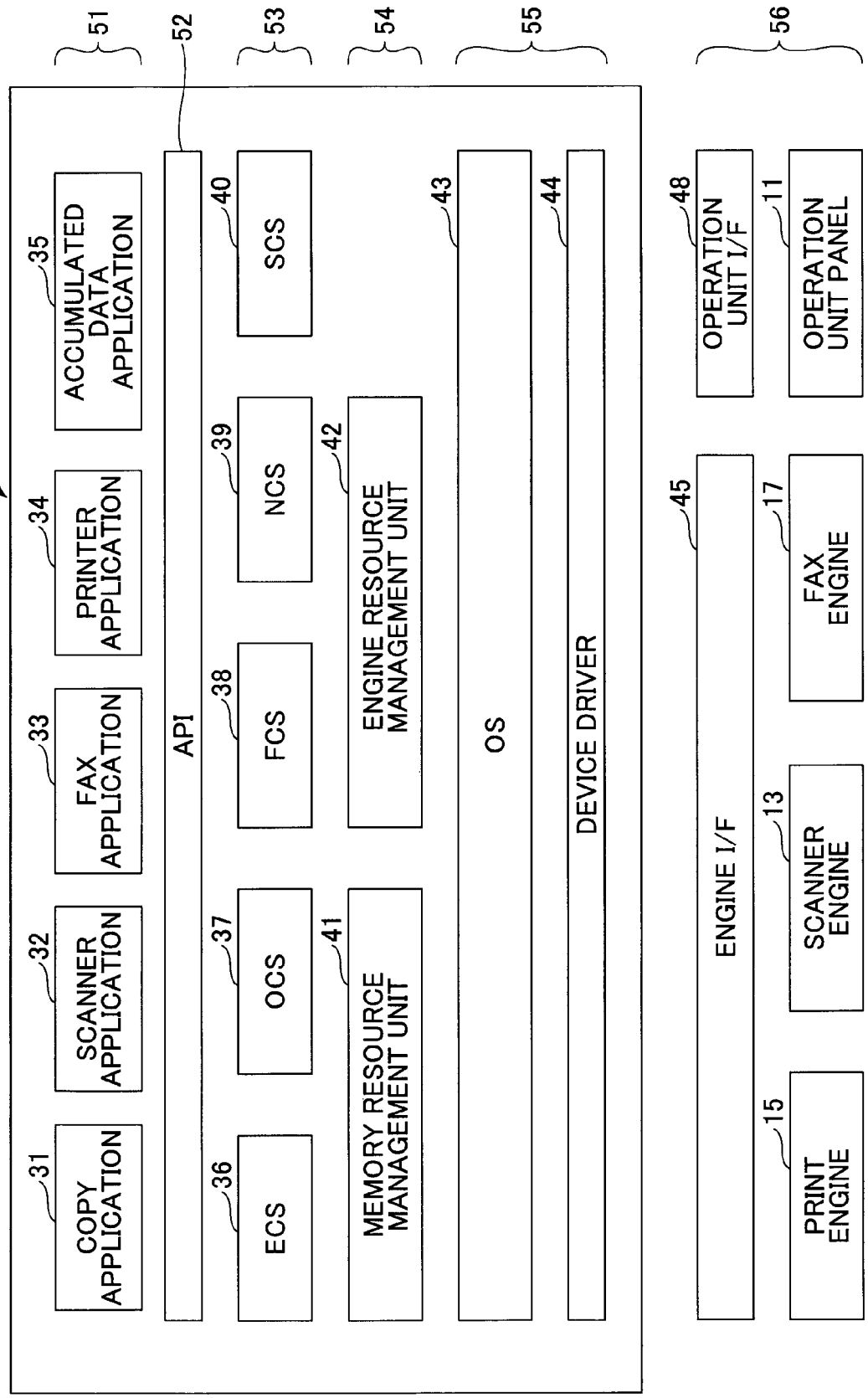

FIG.8

| GRAPHIC DATA NAME FOR COLOR SELECTION | GRAPHIC DATA | SIZE INFORMATION (PIXEL) | SIZE INFORMATION (NO. OF GRIDS) | MULTIPLE DISPLAYS |
|---|---|---|---|---|
| ColorSelect1 | 1 2<br>3 4<br>5 | VERTICAL:15<br>HORIZONTAL:20 | WIDTH:2<br>HEIGHT:4 | NG |
| ColorSelect2 | 1 2 | VERTICAL:5<br>HORIZONTAL:20 | WIDTH:2<br>HEIGHT:2 | NG |
| ColorSelect3 | 1<br>2<br>3 | VERTICAL:10<br>HORIZONTAL:20 | WIDTH:2<br>HEIGHT:3 | NG |
| ColorSelect4 | 1 2<br>3 | VERTICAL:10<br>HORIZONTAL:20 | WIDTH:2<br>HEIGHT:2 | NG |
| ColorSelect5 | 1 2<br>3 4 | VERTICAL:10<br>HORIZONTAL:20 | WIDTH:2<br>HEIGHT:3 | NG |
| ColorSelect6 | 1<br>2 | VERTICAL:10<br>HORIZONTAL:10 | WIDTH:1<br>HEIGHT:3 | NG |

FIG.9

| 0,0 | 1,0 | 2,0 | 3,0 |
|-----|-----|-----|-----|
| 0,1 | 1,1 | 2,1 | 3,1 |
| 0,2 | 1,2 | 2,2 | 3,2 |
| 0,3 | 1,3 | 2,3 | 3,3 |
| 0,4 | 1,4 | 2,4 | 3,4 |
| 0,5 | 1,5 | 2,5 | 3,5 |
| 0,6 | 1,6 | 2,6 | 3,6 |
| 0,7 | 1,7 | 2,7 | 3,7 |

FIG.10

| | 1 | 2 | 3 | 4 | 5 |
|---|---|---|---|---|---|
| ColorSelect1 | BLACK AND WHITE | FULL COLOR | TWO COLORS | SINGLE COLOR | AUTOMATIC COLOR SELECTION |
| ColorSelect2 | BLACK AND WHITE | FULL COLOR | - | - | - |
| ColorSelect3 | BLACK AND WHITE | FULL COLOR | SINGLE COLOR | - | - |
| ColorSelect4 | BLACK AND WHITE | FULL COLOR | AUTOMATIC COLOR SELECTION | - | - |
| ColorSelect5 | BLACK AND WHITE | FULL COLOR | TWO COLORS | SINGLE COLOR | - |
| ColorSelect6 | BLACK AND WHITE | FULL COLOR | - | - | - |

| USER NAME | APPLICATION NAME | FUNCTION NAME | GRAPHIC DATA NAME | ARRANGEMENT (PER GRID) |
|---|---|---|---|---|
| Suzuki | COPY APPLICATION | COLOR SELECTION | ColorSelect6 | (0,0) |
| | | MAGNIFYING | Magnification1 | (0,4) |
| | | FINISHING | Finish1 | (2,0) |
| | | PAPER-FEED TRAY | Tray3 | (3,4) |
| | | FINISHING | Finish2 | (3,0) |

| APPLICATION | FUNCTION |
|---|---|
| COPY APPLICATION | COLOR SELECTION |
| | DOCUMENT SETTING |
| | PAPER-FEED TRAY |
| | MAGNIFYING |
| | DOUBLE SIDED |
| | AGGREGATING |
| | FINISHING |
| | DIVIDING |
| | EDITING |
| | COLOR PROCESSING |
| | BOOKBINDING |
| | OTHER |
| SCANNER APPLICATION | RESOLUTION |
| ⋮ | ⋮ |

FIG.13A

USER NAME : Suzuki    79

| FUNCTION | VIEW | USAGE FREQUENCY |
|---|---|---|
| COLOR SELECTION | ColorSelect1 | 456 |
|  | ColorSelect2 | 123 |
| FINISHING | Finish1 | 777 |
|  | Finish3 | 5 |
|  | Finish4 | 65 |
| MAGNIFYING | Magnification1 | 987 |
|  | Magnification1 | 567 |

FIG.13B

USER NAME : Suzuki    79

| FUNCTION | USAGE FREQUENCY |
|---|---|
| COLOR SELECTION | 579 |
| FINISHING | 847 |
| MAGNIFYING | 1554 |

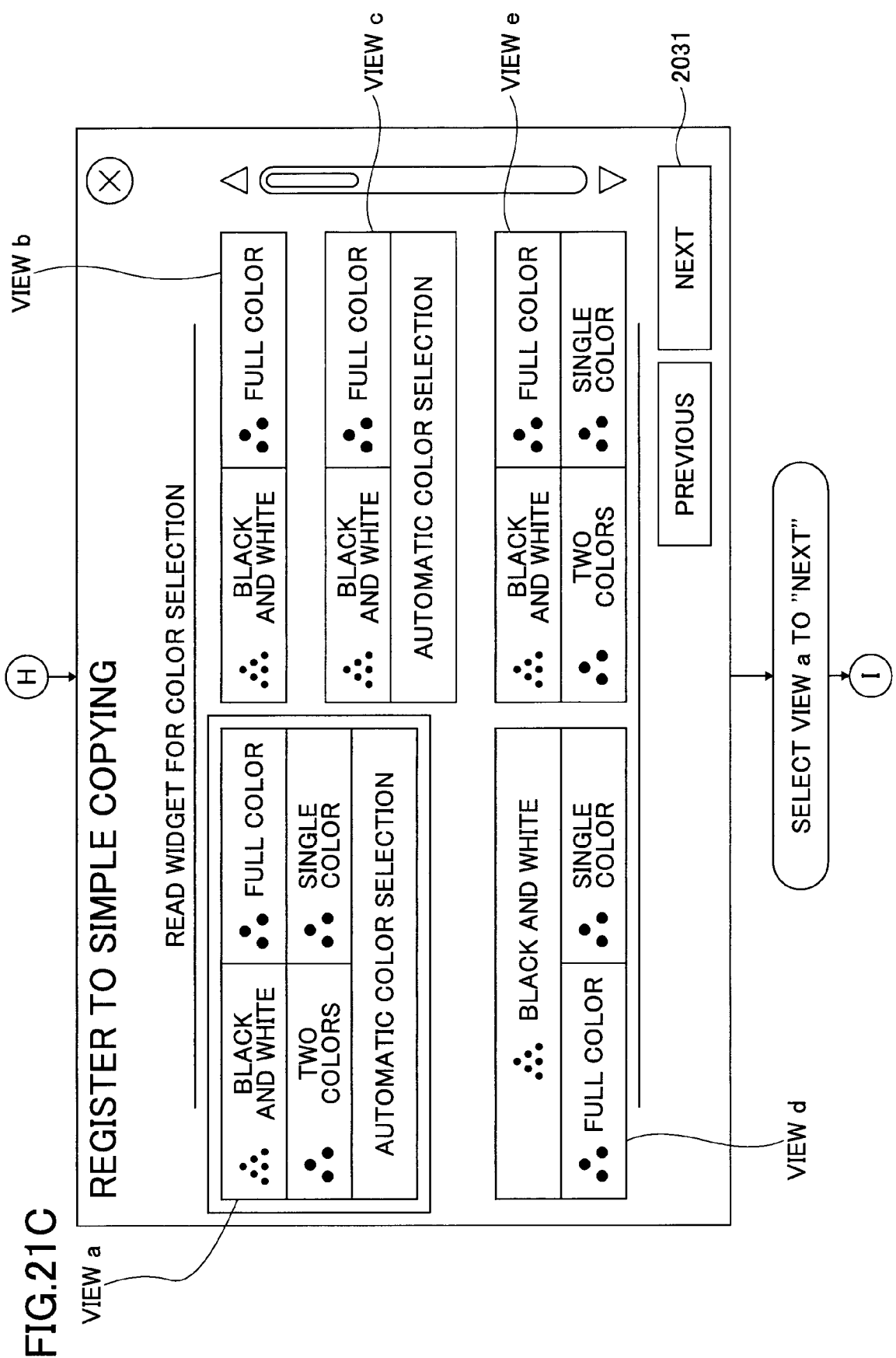

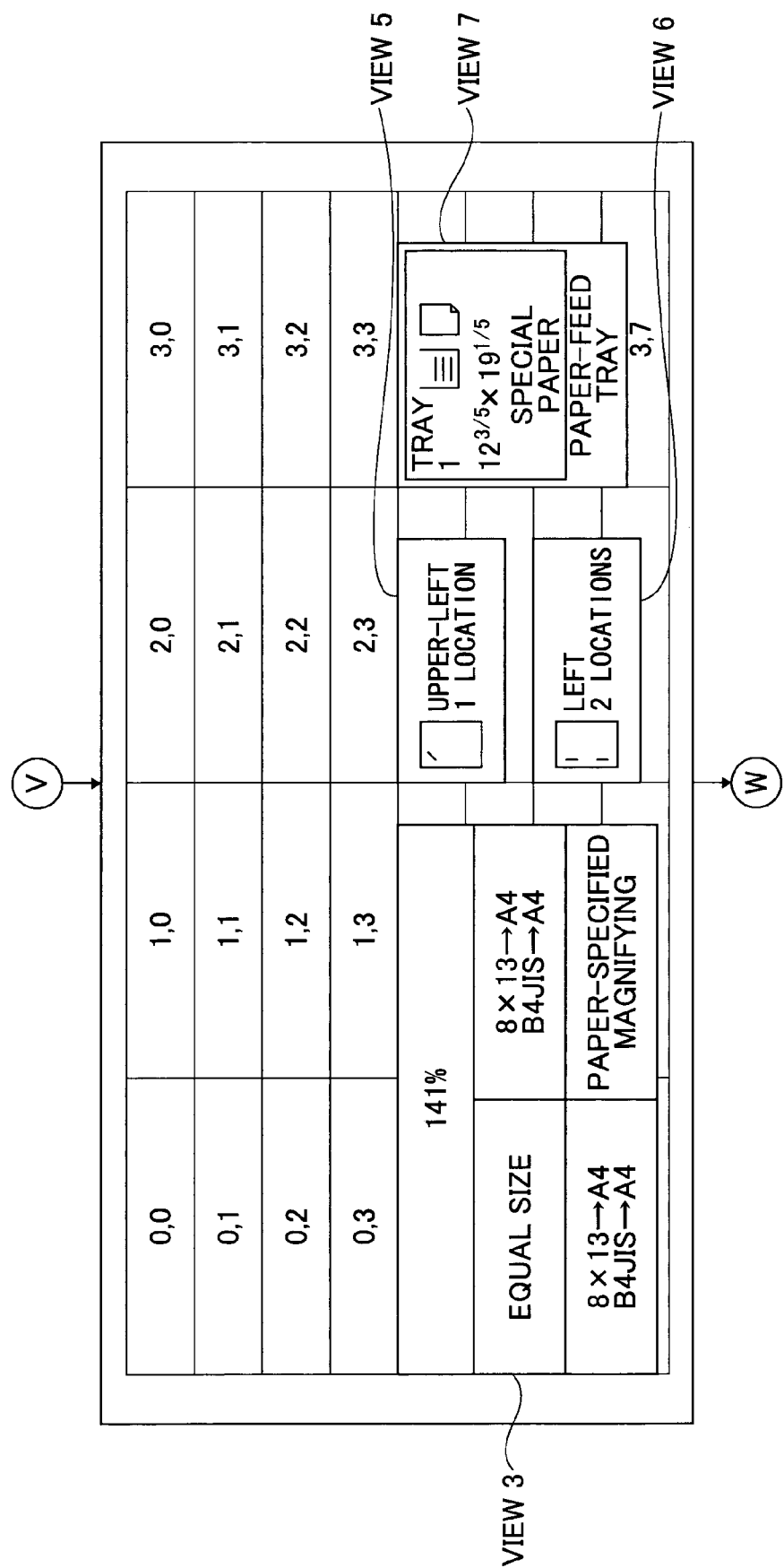

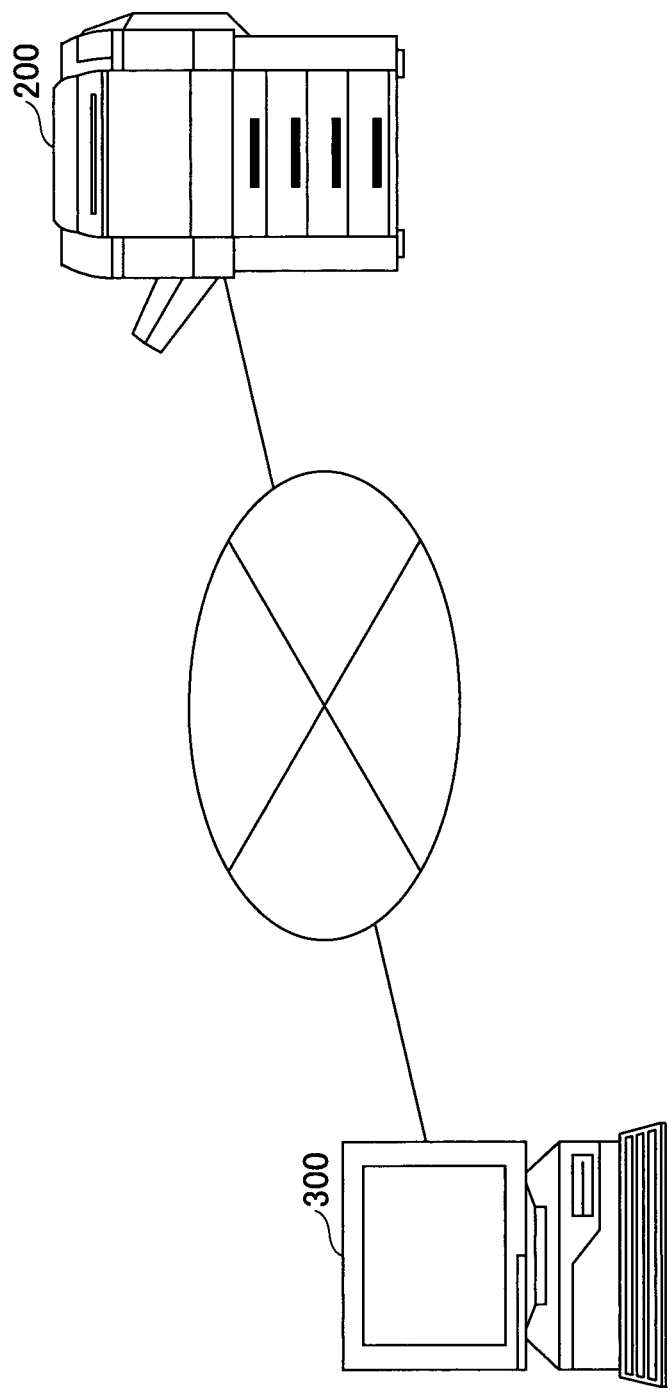

DISPLAY APPARATUS, IMAGE FORMING APPARATUS, CUSTOMIZING METHOD, AND PROGRAM

TECHNICAL FIELD

The present invention generally relates to display apparatuses, etc., which display operation keys, and specifically relates to display apparatuses, image forming apparatuses customizing methods, and programs which allow a user to customize the operation keys.

BACKGROUND ART

A user interface (below called a UI) is known which displays various operation keys on a display apparatus which uses liquid crystal, etc., to accept user operations via a touch panel and a pointing device. A PC (Personal Computer) which uses the display apparatus having a relatively large number of pixels can display a large number of operation keys on one screen, so that the need for effective utilization of the screen is not great. On the other hand, embedded-type apparatuses, for example, have a constraint that a size of the display apparatus cannot be made sufficiently large while the number of operation keys that are desired to be displayed on one screen is increasing with diversification of functions. The embedded-type apparatuses includes, for example, a printer, a copying machine, a facsimile apparatus, a scanner apparatus, an MFP with one of more of these functions installed (below called an image forming apparatus), a navigation apparatus, a mobile telephone, etc.

As a large number of operation keys are arranged in a limited display area while maintaining a UI which is easy to use for the user, each manufacturer devises the size and an arrangement of the operation keys; however, it may be physically difficult to display, on one screen, all of the operation keys which can be operated by the user.

Moreover, even when all of the operation keys which can be operated by the user can be displayed on one screen, only some of the operation keys correspond to functions often used by the user, so it is often the case that it is not necessary to display all of the operation keys which can be operated by the user.

Thus, a display apparatus is known such that each user can customize the UI (see Patent document 1, for example). Patent document 1 discloses an image forming apparatus which displays a list of operation keys corresponding to functions which can be arranged on a screen, and arrange an operation key selected from the list by a user at a desired location for customizing.

PATENT DOCUMENT

Patent document 1: JP2007-249863A

However, with the image forming apparatus disclosed in Patent document 1, while an arrangement of the functions may be customized, customizing of a setting value which can be set in the function is not taken into account. Thus, there is a problem that, even though an arrangement and the number of the functions may be customized, it is difficult to customize the number of setting values and what are to beset for the setting value for each function. Moreover, while Patent document 1 discloses allowing freely arranging the functions one by one, so that a degree of freedom of customizing is high, there is a concern that the user may feel customizing to be troublesome.

In light of the above problems, an object of the present invention is to provide display apparatuses, image forming apparatuses, customizing methods and programs which allow a setting related to one function to be customized such that it becomes a UI which is easy to use for a user.

SUMMARY OF THE INVENTION

Means for Solving the Problems

The present invention provides a display apparatus which displays an operation screen on which are arranged one or more function-setting components on which setting information of a function of application software is arranged, including: a layout specifying information storage unit which stores layout specifying information specifying a layout of the one or more function-setting components on the operation screen; a display information storage unit which stores display mode information defining a display mode of the setting information and the setting information for each function; a function list display unit which displays a list of functions for each application software; a screen generating unit which accepts a selection of a function from the list and which generates a function-setting component list screen which displays in a list the function-setting component of the function; and an arrangement determining unit which determines an arrangement on the operation screen of a function-setting component to be arranged, a selection of which is accepted from the function setting component list screen, and updates the layout specifying information with a layout in which is arranged, the function-setting component to be arranged.

The present invention makes it possible to provide display apparatuses, image forming apparatuses, customizing methods and programs which allow a setting related to one function to be customized such that it becomes a UI which is easy to use for a user.

BRIEF DESCRIPTION OF THE DRAWINGS

FIG. 1 is an exemplary diagram for schematically explaining a customizing procedure;

FIGS. 2A-2D are exemplary diagrams for explaining specific examples of customizing;

FIG. 3 is an exemplary hardware configuration diagram of an image forming apparatus;

FIG. 4 is a diagram illustrating an example of an operation panel;

FIG. 5 is an exemplary software configuration diagram of the image forming apparatus;

FIG. 8 is an exemplary diagram for schematically explaining graphic data;

FIG. 9 is an exemplary diagram for explaining a grid;

FIG. 10 is a diagram for schematically explaining an example of a setting value table;

FIG. 11 is a diagram illustrating an example of customized data;

FIG. 12 is a diagram illustrating an example of installed data;

FIGS. 13A and 13B are diagrams illustrating examples of usage frequency data;

FIGS. 21A-21D are drawings illustrating an exemplary screen transition when a view of a function to which a selected view belongs cannot be displayed in multiple numbers;

FIGS. 24A-24G are drawings illustrating an exemplary screen transition when a view to be erased is determined with reference to usage frequency data; and FIG. 25 illustrates an example of an overview configuration diagram of a customized system connected with the image forming apparatus and a PC.

DESCRIPTION OF THE REFERENCE NUMERALS

Figure 2A:
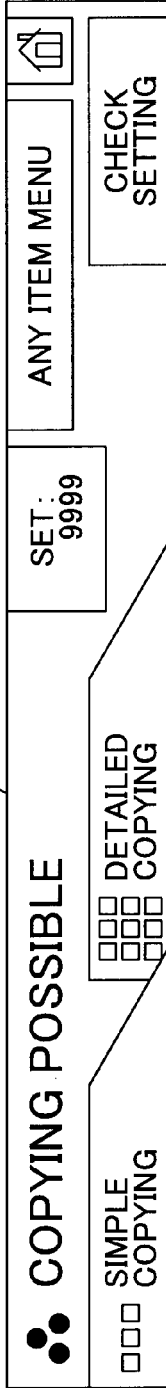

11 Operation panel
24 Program
31 Copying application
32 Scanner application
33 FAX application
34 Printer application
35 Accumulated data application
51 Application
52 API
53 Control service
54 Resource management unit
55 Platform
56 Hardware resources
61 Panel control unit
62 Customizing function selecting unit
63 View information selecting unit
64 Screen arrangement location selecting unit
66 Functional UI control unit
67 Setting order change selecting unit
68 Screen building unit
69 Saving unit
71 Graphic data
72 Setting value table
73 Installed data management unit
74 User information saving unit
75 Installed data saving unit
77 Installed data
78 User information
79 Usage frequency data 100 Display apparatus
117 LCD display unit
200 Image forming apparatus
201 Operation screen
202 Function list screen
203 View selecting screen
206 Customizing result checking screen

MODE FOR CARRYING OUT THE INVENTION

Embodiment 1

A description is given below with regard to embodiments of the present invention with reference to the drawings. FIG. 1 is an exemplary drawing for schematically explaining a customizing procedure. Multiple applications are installed on an image forming apparatus 200. An application may be defined, for example, as "software for providing a series of processing according to a combination of one of multiple input units and of one of multiple output units that the image forming apparatus 200 includes". There are various applications; In FIG. 1, copying application, scanner application, FAX application (transmission application), and data accumulating application are set to be the applications. For example, an inputting means of the copying application is reading of a manuscript by a scanner engine, while an output means thereof is printing onto a paper medium by a print engine. Moreover, for example, an input means of the scanner application is reading of the manuscript by the scanner engine, while an output means thereof is storing of image data into a storage unit. In this way, with a combination of the input means and the output means, the image forming apparatus 200 may provide various applications to the user.

Internally, a control service, etc., and a platform are provided between applications and hardware resources which allow multiple applications to be utilized in common, which control service and platform provide various services such as a screen control of an operation panel, management of the hardware resources, execution control, etc. A user selects, from an operation screen which differs from one application to another, a function which can be used in the application; however, the user does not need to be aware of the control services operated internally.

Each function allows setting for designating a further detailed operation, so that on the operation screen of the application is displayed a setting value of functions A, B, C (below called merely "a function" when not distinguishing therebetween) that can be used in the application. The setting value is a parameter which can be set by the user for each function. Representative setting values for the function of "color selection" are "black and white", "full color", "two colors", "single color", "automatic color selection", etc., where the setting value may be expressed, for example, as information for controlling a result of output when an application uses the function to provide the output.

Thus, when the function and the setting value are integrally displayed, an operation method may be grasped visually for the user, so that operability may improve. In the present embodiment, an icon which integrally displays the function and the setting value is referred to as "a view" (corresponding to "function setting component" in the claims). The image forming apparatus 200 of the present embodiments makes it possible for the user to select a view from multiple views for one function.

For example, when the copying application provides a function A, the user selects, as a view of the function A, one from a view A and a view B (below, merely called "a view"

when not distinguishing therebetween.). Each view differs in the number of setting values to be displayed as what can be selected, and at least one of the setting values that are displayed are different even when the setting value is the same (the same value may be arranged in one view). For example, the view A has three setting values of setting values A, B, and C, while view B has two setting values of the setting values A and B. Thus, the user can easily customize an operation screen by selecting a view which includes, without excess or deficiencies, a setting value it often uses for the function.

A display apparatus of the present embodiment provides a procedure for determining an arrangement when a view selected by a user is arranged on an operation screen. With this procedure, determining of the arrangement of the view on the operation screen, rearrangement of another view, replacement with other view, etc., are executed.

Figure 2B:
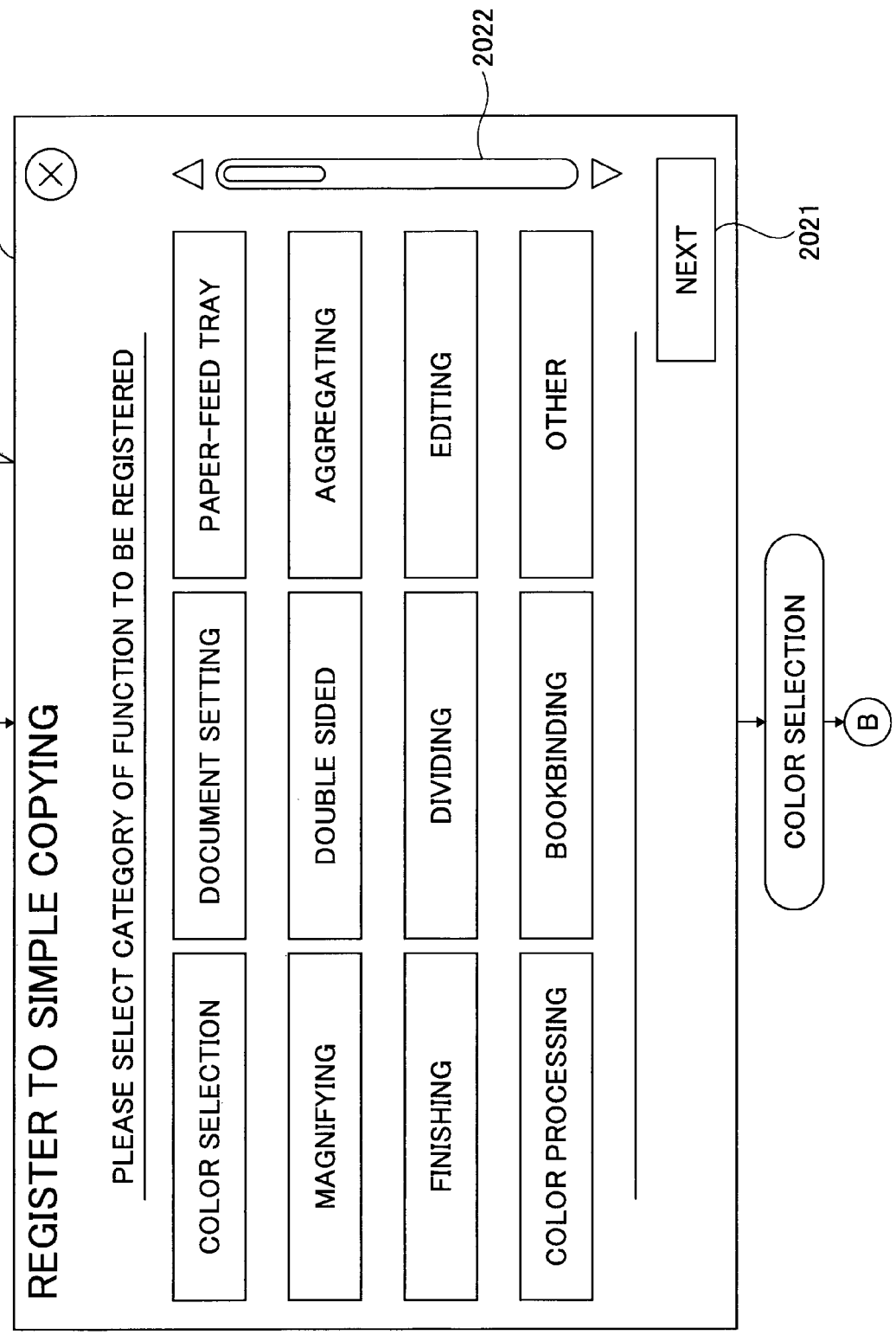

FIG. 2A-2D are exemplary diagrams for explaining specific examples of customizing. FIG. 2A illustrates an example of an operation screen of a copying application. In the copying application of FIG. 2A, a view of a "color selection" function, a view 2 of a "magnifying" function, a view 3 of a "paper-feed tray" function, views 4 and 5 of a "finishing" function, and views 6 and 7 of a "double sided" function. When a user operates the image forming apparatus to begin customizing, a list of functions (a function list screen 202) included in the copying application of FIG. 2B is displayed. In FIG. 2B, assume that the user selected a "color selection" function.

FIG. 2C exemplarily shows a list of a view (a view selecting screen 203) of a function called "color selection". For example, the "color selection" is provided with five views a-e (a screen may also be scrolled to display more than five views). Setting values of the "color selection" function are, for example, "black and white", "full color", "two colors", "single color", "automatic color selection", a view is provided in advance according to a combination or an arrangement of these setting values).

A user may select a desired view out of five views a-e in FIG. 2C. If a user selects a view a on the upper left ("black and white", "full color", "two colors", "single color", "automatic color selection", the view a includes five setting values.

The display apparatus 100, upon accepting a selection of the view a by the user, executes a process of arranging the view a. In other words, the display apparatus 100 executes a process of determining a location of the view a as it needs to arrange the view A somewhere on the operation screen of FIG. 2A.

Figure 2D:
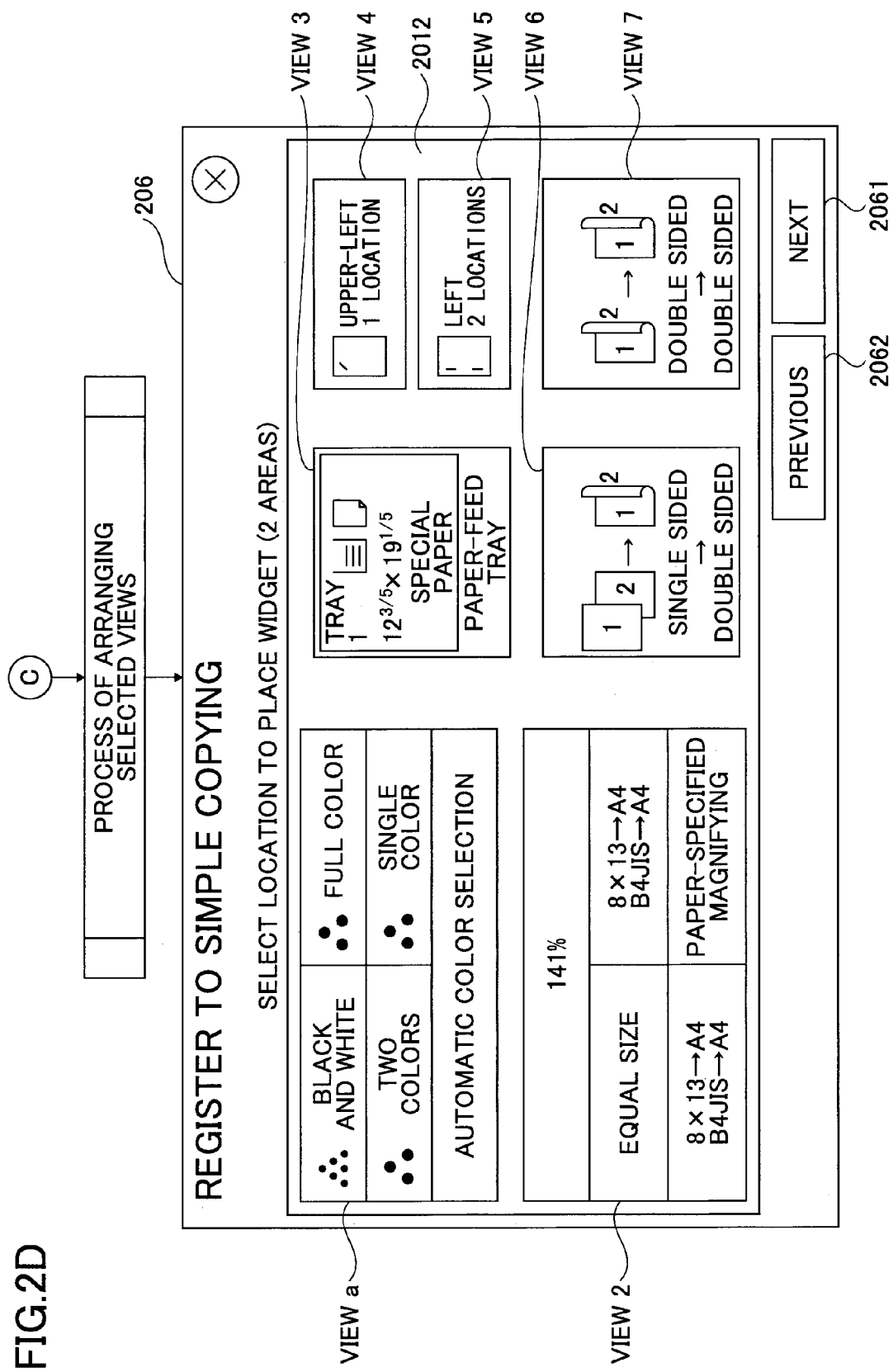

When the arrangement process is completed, the display apparatus 100 displays a customizing result checking screen 206 such as in FIG. 2D. The customizing result checking screen 206 is almost the same as the operation screen 201, so that the user may confirm the customizing result. When the user presses down a "Next" button 2061, the display apparatus 100 receives the operation and fixes the arrangement of the view a. Moreover, when the user presses down a "Previous" button 2062, the display apparatus 100 accepts the operation and redisplays the view selecting screen 203 of FIG. 2C.

In FIG. 2D, a view 1 of an operation screen 201 of FIG. 2A is replaced by the view a. In this way, the display apparatus 100 may arrange a view selected by a user at a suitable location.

Image Forming Apparatus 200

The image forming apparatus 200 is described. While customizing of a screen is described with a display apparatus 100 which is installed in the image forming apparatus 200 as an example, in the present embodiment, the display apparatus 100 of the present embodiment may be suitably installed in an apparatus with a constraint in the size of the screen (for example, a car navigation apparatus, a mobile telephone, a smart phone, a PDA, a music player, etc.).

FIG. 3 illustrates an example of a hardware configuration of the image forming apparatus 200. The image forming apparatus includes a configuration such that a CPU 18, a panel control unit 12, an engine control unit 14, a storage apparatus drive 16, a communications control unit 22, an auxiliary storage apparatus 21, a ROM 20, and a RAM 19 are connected via a bus. An operation panel 11 is connected to the panel control unit 12, while a scanner engine 13, a print engine 15, and a FAX engine 17 are connected to the engine control unit 14.

The operation panel 11 includes mainly hard keys and a touch panel, and the panel control unit 12 accepts an operation of the operation panel 11 by a user and displays various screens on the touch panel.

The scanner engine 13 illuminates, with a light source, a manuscript over a contact glass plate, and converts the reflected light into digital data with a photoelectric conversion element such as a CCD, etc., via an optical system of a mirror and a lens. The digitized manuscript image data is image processed by a soft process executed by the CPU 18 and an ASIC (application specific integrated circuit).

The print engine 15 transfers, onto paper, a toner image formed from image data with a drum-shaped photoconductor drum, which is an image-bearing body, a charging apparatus which charges the photoconductor drum, an exposing apparatus which exposes the photoconductor drum, a developing apparatus and a cleaning apparatus, and further fixes it, onto the paper, with a fixing apparatus.

The FAX engine 17 demodulates facsimile data from a telephone circuit to generate image data and stores it at an auxiliary storage apparatus 21, and, when a FAX application is active, modulates, for facsimile, image data read with the scanner engine 13 to output the data from the telephone circuit. The FAX may be transmitted and/or received using an IP network as opposed to the telephone circuit.

The storage apparatus drive 16 reads data from a storage medium 23 and writes, into the storage medium 23, data received from the CPU 18. The storage medium 23 is a semiconductor memory such as a memory card, etc., which adopts a flash memory, an optical disk, etc. such as a CD-ROM, etc.

The communications control unit 22, which is an Ethernet (registered trademark) card, for example, transmits data according to HTTP, etc., to a router which is connected to a network. The router routes, to a target server, etc., data based on an IP address contained in the data.

The ROM 20 stores an I/O system and a program for activating an OS. The auxiliary storage device 21, which is a hard disk drive or a flash drive, for example, stores a program 24 for customizing the operation screen 201, a device driver, a platform which includes an OS and an application. The RAM 19, which is a working memory for the CPU 18 to execute the OS and the program 24, is used as a temporary storage location.

The program 24, which is often shipped with the image forming apparatus 200 as being recorded in the auxiliary storage apparatus 21, may also be distributed with a part or the whole of the program 24 being recorded in the storage medium 23. Moreover, the program 24 may also be distributed as being received by the communications control unit 22 from a server (not shown) to be installed in the auxiliary storage unit 21.

FIG. 4 is a diagram illustrating an example of the operation panel 11. The operation panel 11 includes an initial setting key 111, a copying key 112, a scanner key 113, a printer key 114, a facsimile key 115, a data accumulating key, a ten key 121, a reset key 118, a program key 119, a clear/stop key 123, and a start key 122, which are fixed hard keys, and a liquid crystal display (LCD) unit 117. The LCD unit 117 integrally includes a touch panel, on which are formed operation keys as soft keys according to various screens. The initial setting key 111 is used for each application for the user to set on/off icon displaying of the operation screen 201 and to perform various settings such as on/off of an authentication function.

The copying key 112, the scanner key 113, the facsimile key 115, and the data accumulating key 116 are keys for switching between each application. The ten key 121 is a key for the user to input the number of sheets to be printed and a FAX number. The reset key 118 is a key for putting back, to an initial value, a setting value which was set for operating each application. The program key 119 is a key to register, to call up to, or to erase from the image forming apparatus 200 a program. The clear/stop key 123 is a key for canceling a numerical value input, or stopping reading or printing. The start key 122 is an execution key for starting facsimile transmission or execution of copying.

FIG. 5 shows an example of a software configuration diagram of the image forming apparatus 200. The image forming apparatus 200 includes an application 51, an API (application programming interface) 52, control service 53, a resource management unit 54, a platform 55, and a hardware resource 56.

The application 51 includes a copying application 31, a scanner application 32, a FAX application 33, a printer application 34, and a data accumulating application 35. Besides, it may include a Web application, a network application, etc. Each process of the application 51 and each process of the control service 53 conduct inter-process communications by transmission and reception of messages and call up of a function and acquisition of a return value thereof, and provide services such as copying, scanning, facsimile, data accumulation, etc.

Moreover, the control service 53 includes each process of an ECS (an engine control service) 36, an OCS (an operational panel control service) 37, a FCS (a facsimile control service) 38, an NCS (a network control service) 39, and an SCS (a system control service) 40. The process of the ECS 36 controls a print engine 15, a scanner engine 13, and a FAX engine 17 that are connected via an engine I/F 71. The process of the OCS 37 controls the operation panel 11 to be an information conveying unit between the user and the image forming apparatus 200. The process of the OCS 37 acquires from the operation panel 11 as a key event a hard key or a soft key and reports, to the SCS 40, a key event function corresponding to the key acquired. The process of the FCS 38 provides an interface for conducting facsimile transmission/reception using a PSTN/ISDN network, registration/reference of various facsimile data stored in an auxiliary storage apparatus, reading of image data for transmission, and printing of a facsimile received, etc. The process of the NCS 39 provides a communications service in a manner common to applications 51 which transmit and receive via a network. For example, it requests that data be received from the application 51 and that data received from the network side by the communications control unit 22 is allocated to each application 51. Besides, the image forming apparatus 200 may include each process of a user information control unit which manages user information, user authentication management unit which manages user authentication, a file control unit which controls registration, delivery, cancellation, and transfer of a file and document data accumulated in the auxiliary storage unit 21, etc.

Moreover, the process of the SCS 40 performs application control, etc., by interrupt, resource management, LED display, system screen display, session management, and application management. Furthermore, the SCS 40, based on an event function reported from the OCS 37, calls up a drawing function and draws various screens on the operation panel 11, and, with a request from an application 51 or a control service 53, calls up a drawing function to draw various screens on the operation panel 11.

The memory resource management unit 41 monitors a usage status of the RAM 19 and performs releasing, securing, etc., of the RAM 19. With the SCS 40, an engine resource management unit 42 arbitrates a request from an upper layer which uses a hardware resource 56, and controls execution. The engine resource management unit 42 determines whether a requested hardware resource 56 is usable, and, if yes, conveys that to the requesting Upper layer.

The application 51 requests for provision of a function to the control service 53 via the API 52. The control service 53 interprets a request for processing from the application 51, and generates a request for acquiring a hardware resource 56. The memory resource management unit 41 or the engine resource management unit 42 acquires these requests for acquisition. Moreover, the OS (e.g., LINUX (registered trademark)) 43 execute in parallel each software of the application 51 and the control service 53 as processes.

Furthermore, a device driver 44 uses an engine I/F 45 and an operation unit I/F 48 to request a processing to the hardware resource 56. Such a configuration makes it possible for the image forming apparatus 200 to unitarily process the process commonly required for each application 51 using processes of the control service 53 and beyond.

(Functions of Display Apparatus 100)

Figure 6:
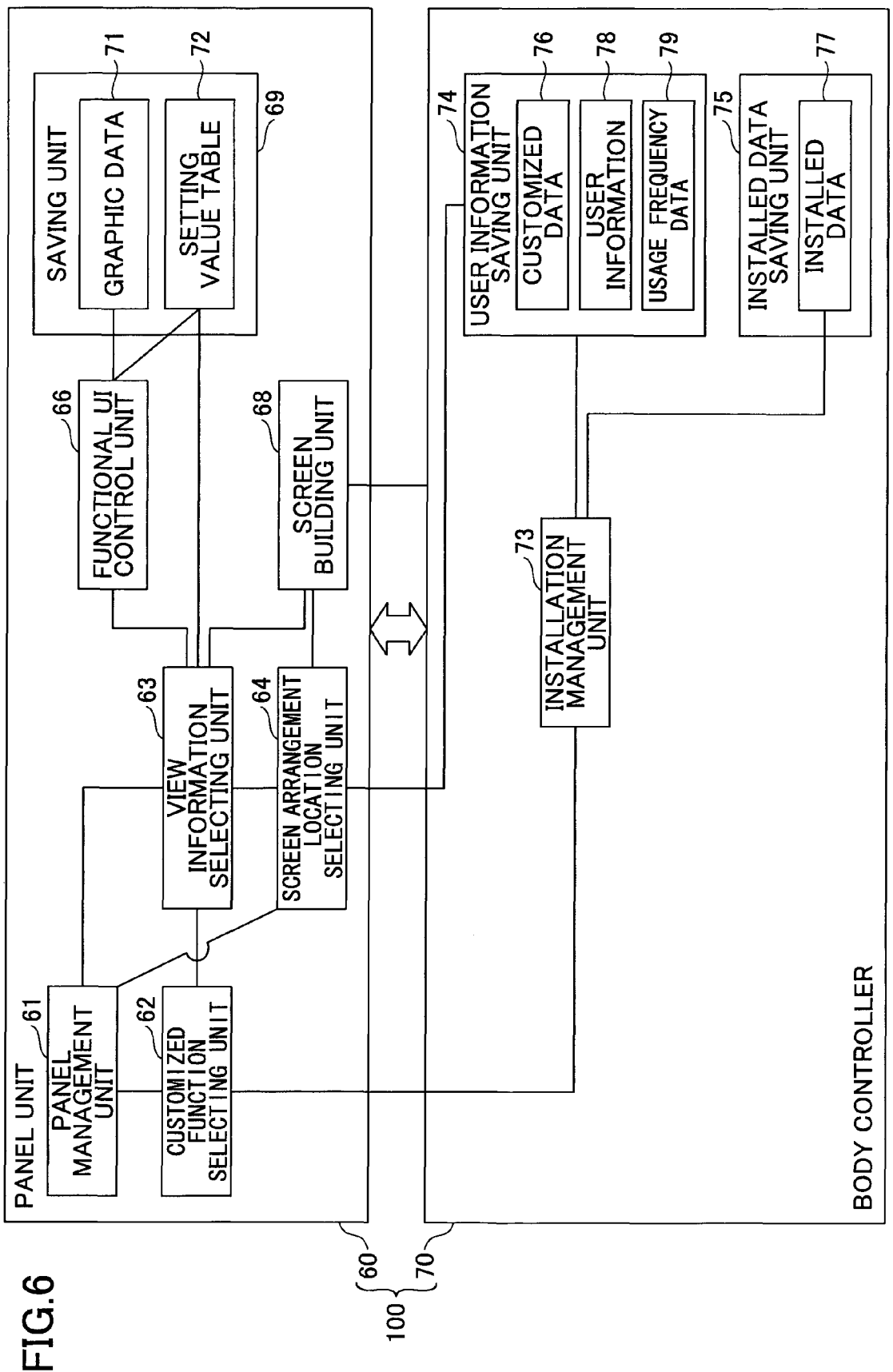
FIG. 6 is an exemplary functional block diagram of a display apparatus.

FIG. 6 shows an example of a functional block diagram of a display apparatus 100 of the present embodiment. While the functional block in FIG. 6 is divided into a panel unit 60 and a body controller unit 70, in general, the panel unit 60 corresponds to the operation panel 11 and the panel control unit 12, while the CPU 18 and an ASIC (not shown) corresponds to the body controller unit 70.

First, the panel unit 60 includes a panel management unit 61, a customized function selecting unit 62, a view information selecting unit 63, a screen arrangement location selecting unit 64, a functional UI control unit 66, and a screen building unit 68. Moreover, a saving unit 69, which is arranged to have, as actual entities, an auxiliary storage apparatus 21 and a non-volatile memory that the panel unit 60 has, stores therein graphic data 71 and a setting-value table 72.

The panel management unit 61 accepts an operation from a user. In other words, information identifying a soft key, information identifying a hard key pressed by the user, or location information on a location pressed down by the user is accepted.

The customized function selecting unit 62 displays, on the operation panel 11, a function list screen 202, which displays a list of functions to be customized such that the user may select. Thus, the customized function selecting unit 62 uses the installed data 77 and user information to acquire, from the installation management unit 73, a function to be customized. The customized function selecting unit 62 holds, in a flag, etc., that the own function is being called up, or the user is customizing the operation screen 201, and sets this flag off when the user terminates customizing the operation screen 201. In this way, each functional block can determine which state (normal operation or during customizing) the display apparatus 100 is in.

The view information selecting unit 63 provides functions on generating and displaying the view. More specifically, the view information selecting unit 63 generates a functional UI control unit 66 corresponding to the function, which functional UI control unit 66 generates below-described "view component" from graphic data 71, and arranges a setting value for each setting value region of the view component. Thus, the functional UI control unit 66 may use graphic data 71 of each view component.

The graphic data 71 are data used for the functional UI control unit 66 to generate the view component, specifies information collating view shape, size, region partition, partitioned region and the identification number thereof.

Moreover, the view information selecting unit 63 generates a view selecting screen 203, and accepts a selection of a view by the user. The view information selecting unit 63 may provide a screen for each function selected at the customized function selecting unit 62.

The view information selecting unit 63 is not only used for customizing of the operation screen 201, but also operates in a normal operation, or in other words, in an operation which accepts a selection of a setting value of each view from the operation screen 201 in each application. Thus, there is no need to newly implement the view information selecting unit 63 for the operation screen 201, making it possible to suppress a cost increase and to shorten a development period. Moreover, the same view as the view displayed on an operation screen 201 is displayed at the time of customizing, making it possible to perform customizing which is easy to understand for the user.

The screen arrangement location selecting unit 64 determines where the view to be customized is to be arranged on the operation screen 201. The screen arrangement location selecting unit 64 is described below.

The screen building unit 68 builds the operation screen 2091 based on default layout information which defines a location of a view of each function, or customized data 76 in which the layout information is customized.

Moreover, the body controller 70 includes an installation management unit 70 which is implemented by the CPU 18 executing the program 24. Moreover, the user information saving unit 74 and the installed data saving unit 75 have the auxiliary storage apparatus 21 as an actual entity, and the user information saving unit 74 includes the customized data 76, user information and usage frequency data 79, and the installed data saving unit 75 includes installed data 77.

The installed management unit 73 manages for each application 51, as installed data 77, a function installed in the image forming apparatus 200. The user information saving unit 74 holds information related to the user. The customized data 76 are data including customizing result of the operation screen 201 for each user, and, more specifically, includes location information of each view (arrangement location in the operation screen 201) that is collated to a user name (a user ID). A storage location of each data set is merely exemplary.

(Regarding Each Data Set)

Below, data handled by the display apparatus 100 of the present embodiments are described.

Figure 7:
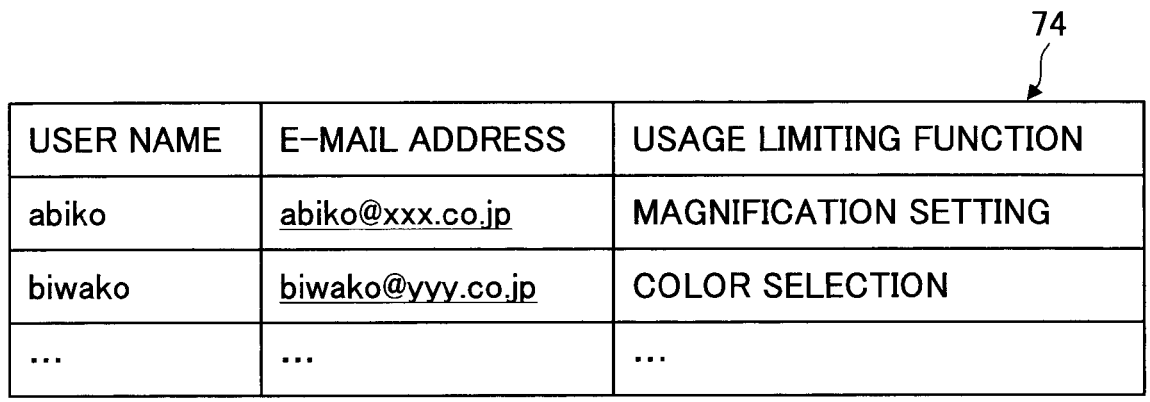
FIG. 7 is a diagram illustrating an example of user information stored at a user information saving unit.

FIG. 7 is a diagram illustrating an example of user information 78 stored at a user information saving unit 74. In the user information 78 are registered "an e-mail address", "a usage limiting function", etc., which are collated with a user name. The "e-mail address", which is for transmitting various information sets to a user, may be an IP address, etc. The "usage limiting function" is a function for which usage is not allowed for that user.

FIG. 8 is an example of a diagram which schematically describes graphic data 71 of a function called a "color selection". While the graphic data 71 may be stored as bit map data, the graphic data 71 may be stored as data which specify the magnitude or shape to flexibly operate the relationship between a setting value and the graphic data 71. For example, the graphic data 71 are provided as an abstract data type (more specifically, a "class") of an object-oriented language.

In FIG. 8, the graphic data 71 and "size information" are registered, which are collated with a "graphic data name". In the function called the "color selection", assuming that the user can select from six views, graphic data sets 71 are registered, which are respectively collated to "Color Select 1-6". Below, a view for which setting information is not arranged is called "a view component".

In FIG. 8, size information (in units of pixels) of each view component is registered. This size information is also actually specified as a variable (a member) of a class. For example, the vertical length of "Color Select1" is 15 pixels, while the horizontal length is 20 pixels. The display apparatus 100 may use this size information to display a frame line, etc., which surrounds a view selected by the user.

Even when the application 51 is different, functions of the operation screen 201 should be displayed in common, so that, for the same function, the graphic data name should also be the same.

Moreover, each view component has another size information. The unit of this size information is the number of grids.

FIG. 9 is an exemplary diagram for explaining a grid. Each region of rectangles of the same shape into which the operation panel 11 is divided is the grid. Thus, as shown, four grids are arranged horizontally and eight grids are arranged vertically, each grid being provided with coordinate information sets (0, 0) to (3, 7), which are specified by a row number and a column number. This coordinate information is used for specifying a location of a view component.

For example, size information of a view component of width of 2 and height of 4 means that the view component needs two grids in the horizontal direction and four grids in the vertical direction.

Returning to FIG. 8, each view component has one or more setting value regions. As shown, while identifying numbers (1-6) are assigned to the setting value regions, the numbers are used for the functional UI control unit 66 to arrange setting values. Thus, the user does not have to be conscious thereof.

FIG. 8 represents that graphic data 71 of "Color Select 1" may display 5 setting values, graphic data 71 of "Color Select 2" may display 2 setting values, graphic data 71 of "Color Select 3" and "Color Select 4" may display 3 setting values, graphic data 71 of "Color Select 5" may display 4 setting values, and graphic data 71 of "Color Select 6" may display 2 setting values.

Moreover, in FIG. 8, whether multiple displays are possible (OK) or not (NG) is registered for each function, so that whether the multiple displays is possible is common to the function. For example, for the function of "color selection", the multiple displays are "NG", so that only one view can be displayed on one operation panel 1 for views of "Color Select 1-6".

On the contrary, while not shown, for a function called "Finishing", for example, "OK" is registered for the multiple displays, making it possible to display two or more views on one operation panel 11. Even for a function for which the multiple displays are "OK", it may be arranged for the maximum number thereof to be registered.

Whether the multiple displays are "NG" or "OK" is predetermined depending on whether the user operability is likely to improve by arranging multiple views. It may be arranged for each user to be able to customize the multiple displays to be "NG" or "OK".

Moreover, the saving unit 69 stores a setting value table 72 for collating a setting value region and a setting value.

FIG. 10 is a drawing for schematically explaining an example of a setting value table 72. As shown, each setting value to be placed in the setting value region is registered, collating to a number for identifying the setting value region and "the graphic data name". Therefore, the functional UI control unit 66 may set a setting value read from a setting value table 72 for each setting value region of a view component. The setting value also includes an icon such as "∴". In this way, an operation screen 201, such as in FIG. 2A and a view selecting screen 203, such as in FIG. 2B are generated. These setting values may be placed in a program, the setting values being collated with the setting value regions.

Moreover, while details are not described in the present embodiment, the user may also customize allocation of the setting value or the setting value itself for each view component. For example, the user may customize the relationship between the setting value region and the setting value, such as "full color" in a first setting region, which is ColorSelect1, and "black and white" in a second.

FIG. 11 is a diagram illustrating an example of customized data 76. In the customized data 76 are registered a "function name", a "graphic data name", and an "arrangement (per grid)", which are collated with a "user name" and an "application name". In the column of the "function name" is registered a function name of each view arranged in the operation screen 201 of the copying application, in the column of the "graphic data name" is registered a "graphic data name" for specifying a view of each function, and in the "arrangement" is registered for each grid a location of a customized view.

Each user may generate one customized data set 76 for each application, or multiple customized data sets 76 for each application for registration at the user information saving unit 74. In this way, the screen building unit 68 may read out customized data 76 based on a user name of a user logged in to reconstruct the operation screen 201.

In order to build the operation screen 201 for default, the screen building unit 68 holds default views arranged on the operation screen 201, and layout information of the views.

FIG. 12 is a diagram illustrating an example of installed data 77. Functions installed in the image forming apparatus 200 are registered for each application 51. When the function name is specified, the "graphic data name" of the function becomes known from the customized data 76, so that each view component as shown in FIG. 8 can be specified if the user selects the function. Even when the application 51 is different, the same, function is registered in common.

FIG. 13A shows an example of usage frequency data 79 for each view, while FIG. 13B shows an example of the usage frequency data 79 for each function. The usage frequency is registered for each function and for each view in FIG. 13A, while it is registered for each function in FIG. 13B. Thus, the total of usage frequency of each view for each function in FIG. 13A corresponds to usage frequency for each function in FIG. 13B.

Customizing of the operation screen 201 is to be done according to the preference of each user, so that it is also preferable to obtain statistics of usage frequency of the function and the view for each user. In FIGS. 13A and 13B, the usage frequency is also counted for each user name ("Suzuki"). Moreover, the usage frequency may be counted for each group or department.

Moreover, the usage frequency may be set to be the times of selecting (or executing) of a view or a function during a previous predetermined period. The previous predetermined period is a relatively long period, such as all periods since the image forming apparatus 200 is installed, period between previous one year and several years, etc. In this way, a view or a function with a large number of selection times may be estimated as having a high usage frequency.

The usage frequency is initialized each time the operation screen 201 is customized. This is because the usage frequency of the view which is newly arranged is zero, so that there is a case that customizing is performed again when the usage frequency of the view arranged due to the user wanting to use it is small. In this case, if the user subsequently selects some view from the view selecting screen 203, the usage frequency of the view selected by the user previously remains small, so that it becomes what is to be replaced by a newly selected view.

The operation screen 201 is initialized each time it is customized, so that the usage frequency of all the views or functions becomes zero, making it possible to prevent that a view for which time has not passed since the user selected is to be replaced.

Moreover, the usage frequency data 79 is information for each user, so that it is stored with the customized data 76 in a computer user information saving unit 74. Where it is saved at is merely exemplary, so that the usage frequency data 79 for each view may be stored with the graphic data 71 in the saving unit, and the usage frequency data 79 for each function may be stored in the saving unit with the installed data 77 in the saving unit.

(Overall Procedure of Customizing)

Figure 14A:
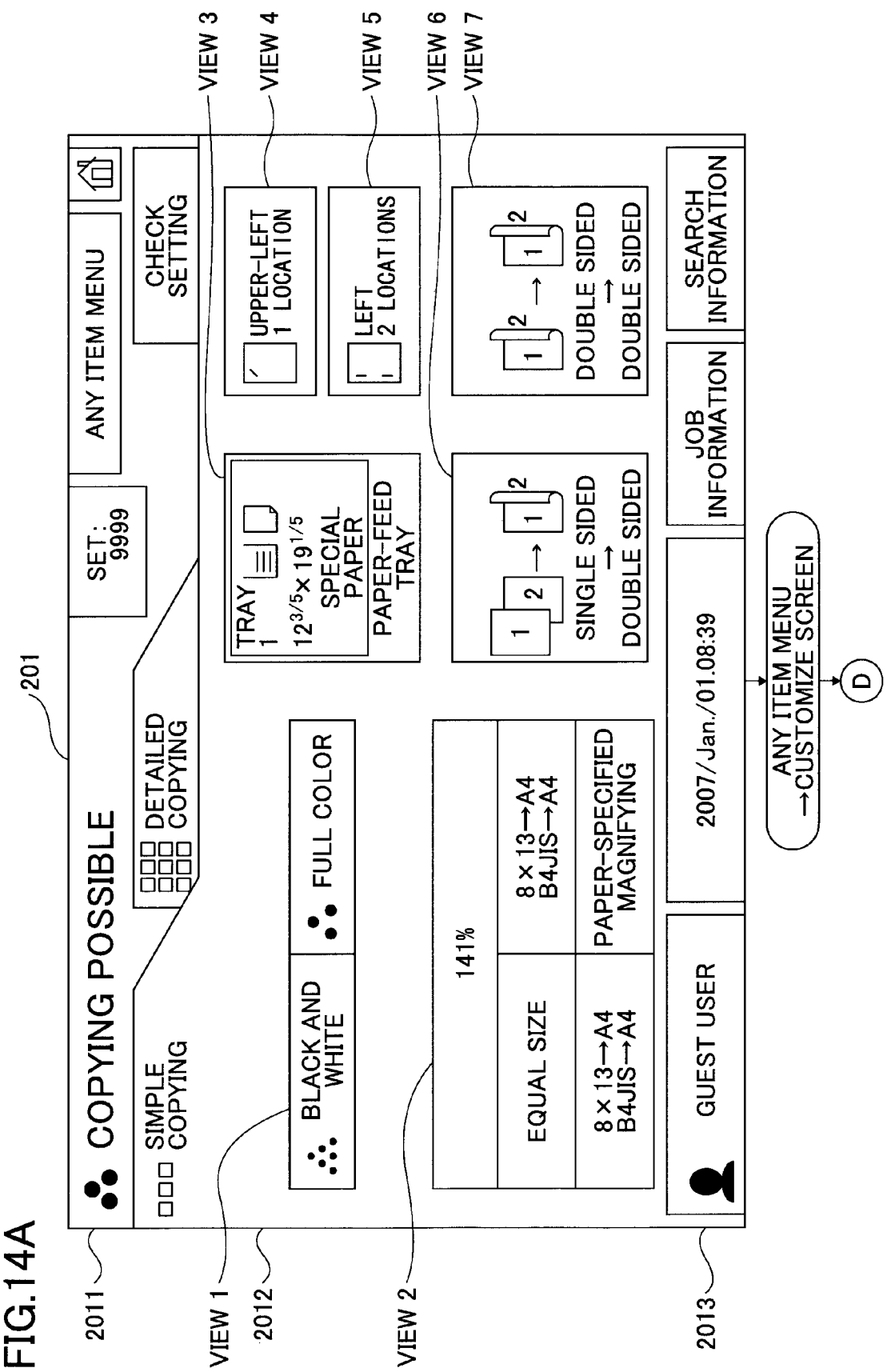
FIGS. 14A and 14B are diagrams illustrating an example of a transition of a screen displayed on the operation panel when a user customizes a UI.
Figure 14B:
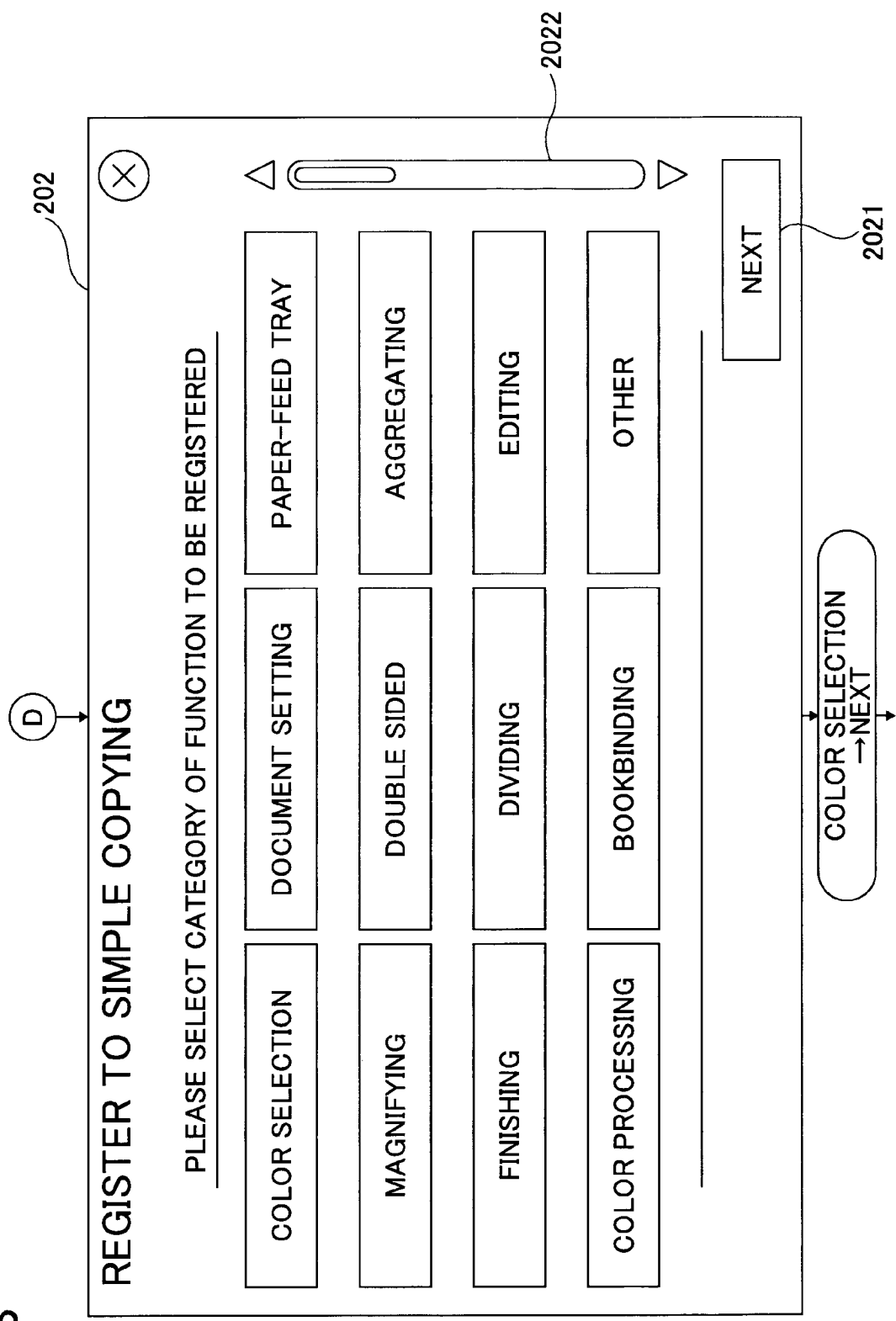

FIGS. 14A and 14B are diagrams illustrating an example of a transition of the screen displayed on the operation panel 11 when the user customizes the UI.

Immediately after the image forming apparatus 200 is activated, or when a user presses down a copying key 112 of the operation panel 11, the OCS 37 detects it to report to the SCS 40, which displays an operation screen 201 of the copying application 31 shown in FIG. 14A. Thus, the SCS 40 may display an initial screen of the application 51 as in FIG. 14A.

For the copying application 31, the operation screen 201 called "simple copying" and the operation screen 201 called "detailed copying" are provided, so that the customizing of the present embodiment may be suitably applied to either of the operation screens 201. The operation screen 201 of "the detailed copying" is such that the number of functions displayed in a list is larger than "the simple copying". The operation screen 201 of "the simple copying" and "the detailed copying" may be switched by the user selecting a tab. Below, an explanation is provided with an operation screen 201 of "simple copying" as an example.

The operation screen 201 of "simple copying" includes principally a function list unit 2012, as well as a setting unit 2011, and a bibliographic matter display unit 2013. The user may newly add a view to each view of the function list unit 2012, or delete one or more views. In one view is displayed a setting value which may be selected directly. For example, in a view 1 of a "color selection" function, two setting values of "full color" and "black and white" are arranged to be selectable, while, in a view 3 of a "paper-feed tray" function, only one setting value of "tray 1" is arranged to be selectable. On the other hand, in a view 2 of a "magnifying" function, it is made possible to select a setting value from five setting values of "141%", "equal size", "8×13→A4, B4JIS→A4", "8×13→A4", "B4JIS→A4", and "paper-specified magnifying".

The user may select a setting value of "full color" and a setting value of "black and white" for the function of "color selection" without changing the screen, and may also select a setting value of "141%" and a setting value of "equal size" for the function of "magnifying" without changing the screen. In this way, a view of each function that includes the setting value is displayed in a list, so that the operability is improved.

In FIG. 14A, multiple views which belong to the same function depending on the function are displayed. For example, for the "double sided" function, a view 6 of "single sided to double sided" and a view 7 of "double sided to single sided" are respectively displayed. Similarly, for the "finishing" function, a view of "upper left, one location" and a view of "left, two locations" are respectively displayed. Whether multiple views which belong to the same function are displayed in the function list unit 2012 is predetermined in the above-described graphic data 71.

Setting values of the same function are divided into multiple views because ease of selection (ease of use) by the user is taken into account, so that the operation screen 201 may also be designed such that, for the functions of "double sided" and "finishing", multiple setting values are displayed in a collection view, or each setting value for the function of "magnifying" is displayed in different views.

The user which wishes to customize the arrangement of the view presses down an "any item menu" key of the setting unit 2011. From this key, which is a key which accepts various settings on the image forming apparatus 200, the user presses down a "customizing key" (not shown), so that a function list screen of FIG. 14B is displayed.

FIG. 14B shows an example of a list of functions which can be customized in the copying application 31. The customizing function selecting unit 62 reads the installed data 77 of the copying application 31 to display a function list as in FIG. 14B. When the user operates a scroll bar 2022, a further more functions are displayed. In FIG. 14B, various functions included setting values which can be set by the user in the copying application 31 are displayed in a list. A function other than the copying application 31 that can be used by the user is also displayed when an operation screen 201 of the application 51 other than the copying application 31 is customized.

Figure 15A:
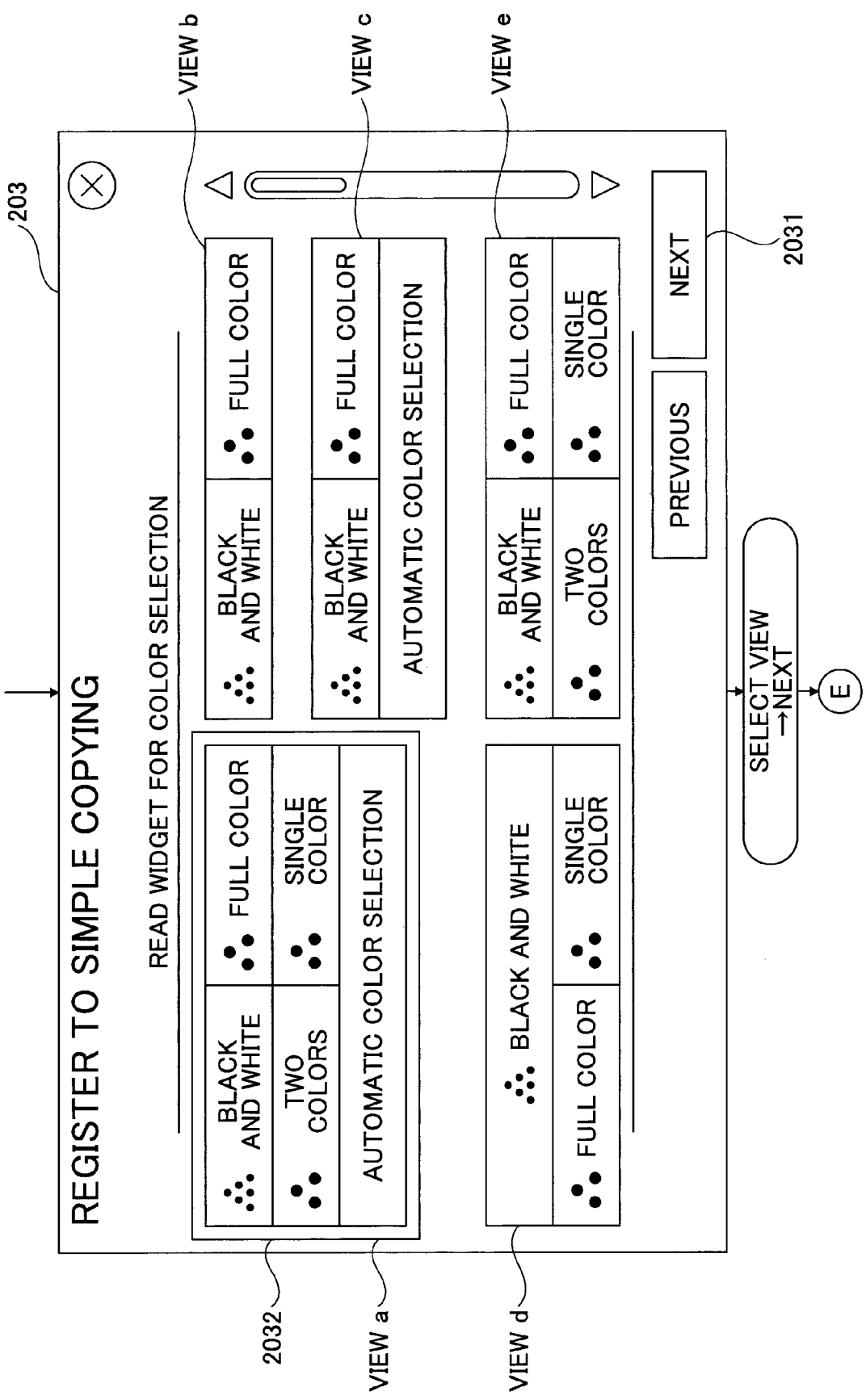
FIGS. 15A and 15B are diagrams illustrating an example of a transition of the screen displayed on the operation panel when the user customizes the UI.

Next, when the user presses down a "color selection" from a function list, the view selecting screen 203 of FIG. 15A is displayed. The view information selecting unit 63 displays a view selecting screen 203 such as in FIG. 15A with reference to graphic data 71. As described in FIG. 9, there are 6 view components of a function called color selecting, in FIG. 15A discloses five views.

The user takes into account a setting value often used in the color selection function to select a view in which the setting value is included. After selecting, when the user presses down a "next", key 2031, an "arrangement process" is executed, after which the customizing result checking screen 206 in FIG. 15B is displayed.

Figure 15B:
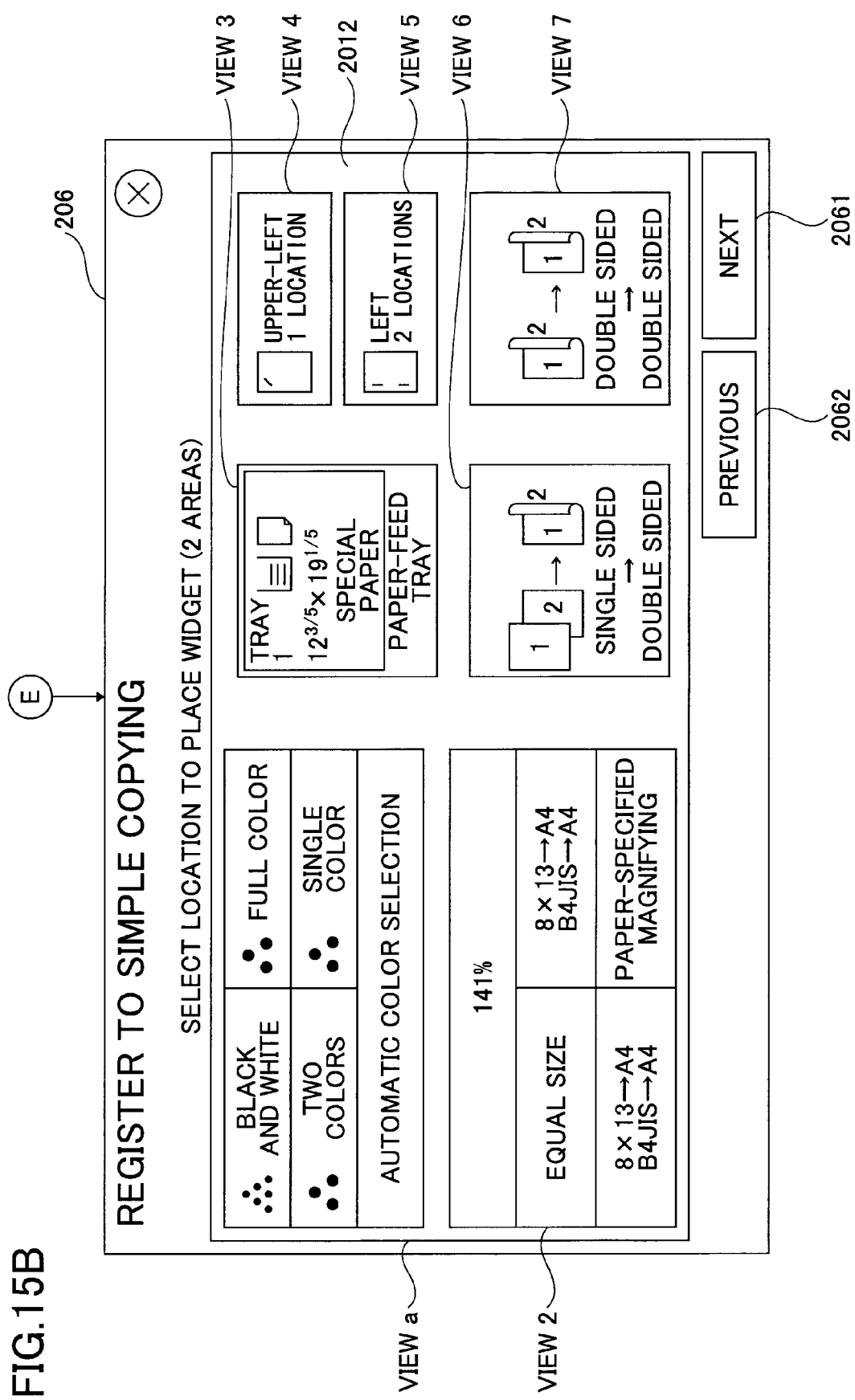

In FIG. 15B, instead of the view 1 of the function of the color selection of FIG. 14A, the view a, which is selected in FIG. 15A is arranged. After checking, when the user presses down the "Next" key 2061, a screen is displayed indicating that customizing has been completed, for example.

In this way, the user may select the number or a combination of setting values displayed for each function. Then, a location of arrangement of the selected view is determined by the display apparatus 100, so that the user does not need to determine the location of the selected view, making it possible for the user to easily execute customizing.

(Operation Procedure)

The procedure of FIGS. 14A and 14B is explained in detail using a sequence diagram.

Operation screen 201 to function list screen 202

Figure 16:
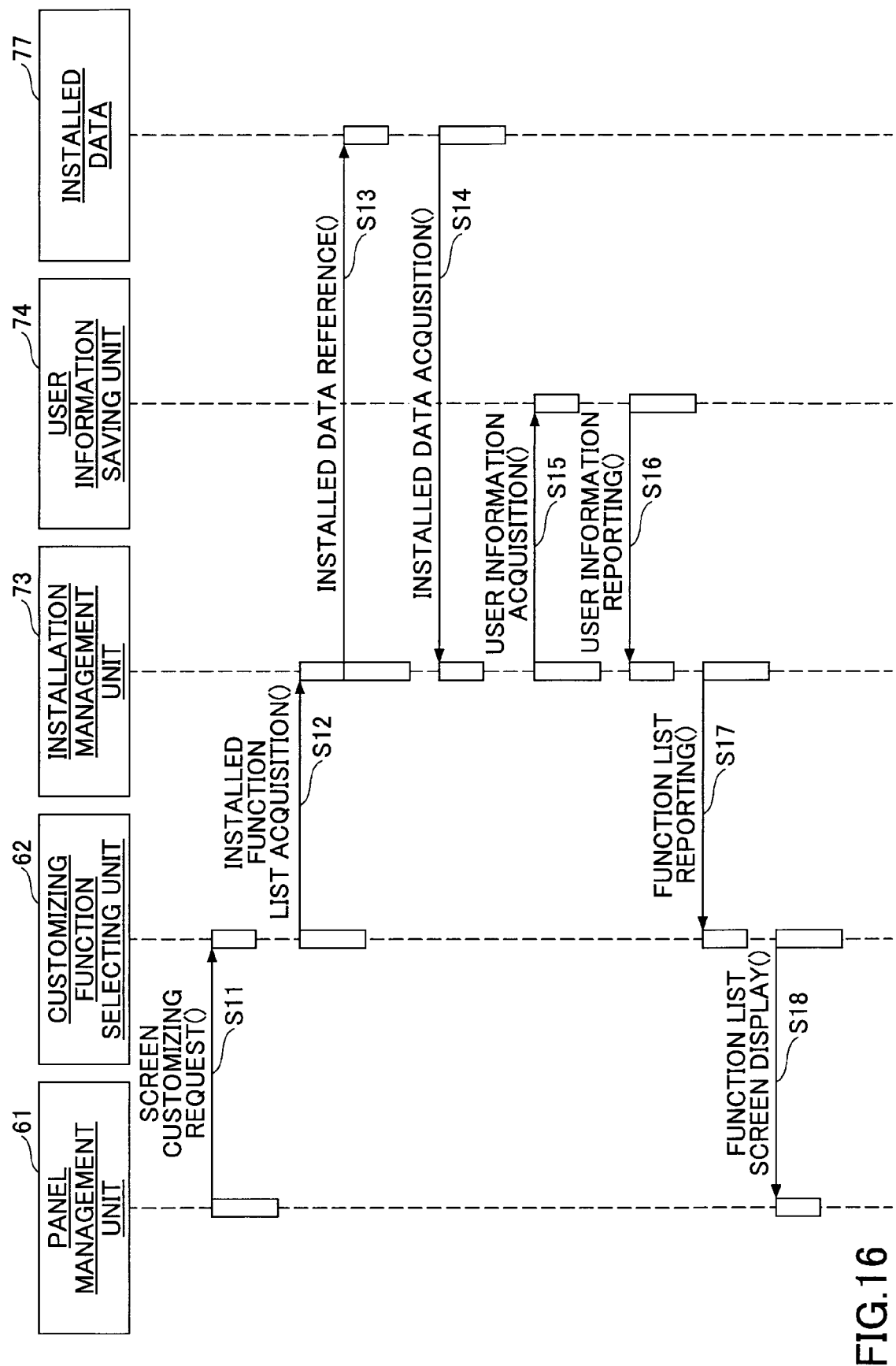
FIG. 16 is an exemplary sequence diagram illustrating a procedure for displaying a function list screen in FIG. 14B from an operation screen of an easy copying in FIG. 14A.

FIG. 16 is an exemplary sequence diagram illustrating a procedure for displaying the function list screen 202 of FIG. 14B from the operation screen 201 of the simple copying in FIG. 14A. The sequence diagram in FIG. 16 starts from a screen (not shown) which is displayed when the user presses down an "any item menu" key. The user selects a copying application 31. Moreover, when the operation screen 201 of FIG. 14A is displayed, the user is logged into the image forming apparatus 200. Thus, the panel management unit 61 holds a user name and application 51 identifying information (below-called an application name).

When the user presses down a "screen customizing" key, which is an operation key displayed by the operation panel 11, the panel management unit 61 reports, to the customizing function selecting unit 62, that the "screen customizing" key has been pressed down. Parameters (arguments) reported are the user name and the application name.

The customizing function selecting unit 62 accepts a request for customizing of the operation screen 201 (S11). In other words, the customizing function selecting unit 62 accepts a call up request of the function list screen 202 of FIG. 14B of the operation screen.

In order to generate the function list screen 202 of FIG. 14B, the customizing function selecting unit 62 reports, to the installation management unit 73, a request for acquiring a list of installed functions (S12). The customizing function selecting unit 62 reports the user name and the application name to the installation management unit 73.

In order to specify the function installed on this application 51, the installation management unit 73 refers to the installed data 77 with an application name as a key (S13). The installation management unit 73 may acquire installed data (S14) such as "color selection", "document setting", etc., that are installed on the copying application 31 (S14).

Next, in order to specify the function for which use by a logged-in user is prohibited, the installation management unit 73 requests for acquisition of user information to the user information saving unit 74 with the user name as a key (S15). The information requested by the installation management unit 73 is "a usage limiting function", so that only this information may be requested. The user information saving unit 74 reports to the installation management unit 73 user information 78 of the logged-in user (S16).

The installation management unit 73 erases, from installed data, a function for which usage is limited by a usage limiting function to report installed function list (installation data) to the customizing function selecting unit 62 (S17). The user may customize only usable functions, making it possible to eliminate the need for determining whether it is a function which the user may use or not and to improve the operability.

The customizing function selecting unit 62 generates a function list screen 202 such as in FIG. 14B that displays each function name of installed data upon receiving a report from the installation management unit 73, and displays it on an operation panel 11 (S18). As shown in FIG. 14B, each function name is displayed in a list in a cell-shaped manner.

As described above, the customizing function selecting unit 62 may display a function list screen 202 of FIG. 14B for each application 51 and for the user.

Function list screen 202 to view selecting screen 203

Figure 17:
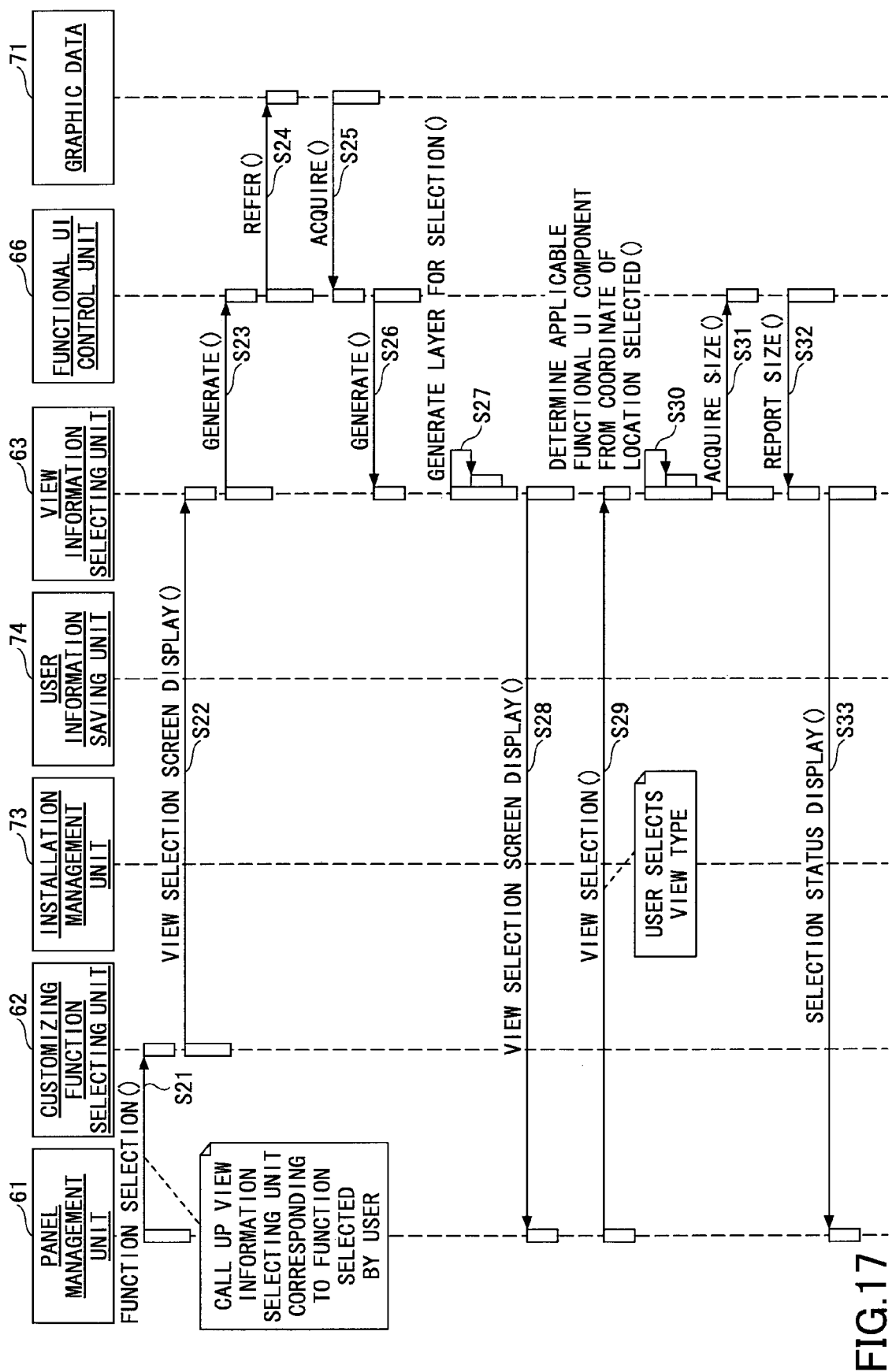
FIG. 17 is an exemplary sequence diagram illustrating a procedure for displaying a view selecting screen in FIG. 15A from the function list screen in FIG. 14B.

FIG. 17 is an exemplary sequence diagram illustrating a procedure for the view information selecting unit 63, etc., to display a view selecting screen 203 in FIG. 15A from the function list screen 202 in FIG. 14B.

When the user selects a function to customize from the function list screen 202 of FIG. 14B, the panel management unit 61 reports, to the customizing function selecting unit 62, information identifying the selected function or information on the pressed down location (S21). At any rate, the customizing function selecting unit, 62 acquires the function selected by the user.

Next, the customizing function selecting unit 62 requests the view information selecting unit 63 to display the view selecting screen 203 in order to display a view corresponding to the function selected (S22). Then, the parameter reported is a function name.

The view information selecting unit 63 is called up corresponding to the function, and the called up view information selecting unit 63 generates a functional UI control unit 66 corresponding to the function (S23). The functional UI control unit 66 provides a function of displaying a view (generating a view) which can be displayed for each function. Here, the term generating means generating an instance in an object-oriented language, corresponding to generating an instance of the functional UI control unit 66 from a predetermined "class", for example. The functional UI control unit 66 is generated for each view. For example, if the user can select five views with one function, five of the functional UI control units 66 are generated.

Each functional UI control unit 66 refers to the graphic data 71 (S24). Each functional UI control unit acquires graphic data 71 of the respective view components (S25). Based on the function name, each functional UI control unit 66 reads out graphic data 71 of each view component from FIG. 8.

With reference to the setting value table 72 in FIG. 10, each functional UI control unit 66 arranges each setting value in each region of the graphic data 71 to generate each view (S26).

A setting value arranged in each view component of the view selecting screen 203 may be read from predetermined data which the user customized the display value of the setting value thereof.

Next, the view information selecting unit 63 generates a layer for selection for each view (S27). The layer for selection is a layer for seizing selection of a view by the use by force from a system (SCS40, for example) which normally controls operation as opposed to screen customizing. The layer has a description on a program as an actual entity, for example. The view itself which is generated by the functional UI control unit 66 is what is also displayed on the operation screen 201 which the user operates as in FIG. 14A, so that, when a view is merely displayed and the user selects a setting value of the view, a predetermined event (color selection, etc.) ends up getting accepted by the image forming apparatus 200 in response to pressing down of the setting value of the view.

Then, the user can not customize the operation screen 201, so that the view information selecting unit 63 generates the above-described layer for selection. The layer for selection has about the same size as that of the view or has somewhat of a larger size than that thereof and a transparent button, etc., (it suffices to be a method which accepts the operation of the user), so that the user may select the whole view without being conscious of the layer for selection. The event due to pressing down the layer for selection is executed earlier than an acceptance thereof by a system, so that the view information selecting unit 63 may seize the operation of the user by force.

The view information selecting unit 63 displays, on an operation panel 11, a view selecting screen 203, which is a view generated as image data, onto which the layer for selection is overlaid (S28). As described above, the view selecting screen 203 of FIG. 15A is displayed.

Next, when the user presses down (selects) a desired view, the panel management unit 61 reports information on location of the selected view to the view information selecting unit 63 (S29). Then, the view information selecting unit 63 specifies a view selected by the user based on the location information (S30). These processes are for clearly indicating on the operation panel 11 with a frame line 2032, etc., the view selected by the user.

The view information selecting unit 63 requests that size information of the specified view be reported to the function UI control unit 66. Size information of the view is held in the graphic data 71, so that the size information (vertical and horizontal lengths) of the view is known for the functional UI control unit 66. The function UI control unit 66 reports the size information of the view to the view information selecting unit 63 (S32).

The view information selecting unit 63 displays, on an operation panel 11, a frame line 2032 which indicates the state of selection (S33). In FIG. 15A, the frame line 2032 which indicates the state of selection is displayed such that it surrounds the view selected by the user. Besides the frame line 2032, the brightness of the selected view may be increased, or a color may be changed for display.

The layer for selection may be arranged in this way to accept customizing operation of the user even when the same view is displayed as at the time of operation.

The selecting of the view may be accepted without generating the layer for selection. In this case, the functional UI control unit 66 determines whether the state of the image forming apparatus 200 is during customizing of the operation screen 201 or during use of the image forming apparatus 200. While there are a number of methods of determining, the functional UI control unit 66, for example, refers to a flag generated by the customizing function selecting unit 62. The customizing function selecting unit 62 is a function which is called up during customizing of the screen, so that, if a flag indicates that the customizing function selecting unit 62 is active, the function UI control unit 66 may determine that the image forming apparatus 200 is being customized.

The view information selecting unit 63 may also determine the status of the image forming apparatus 200 with reference, as needed, to a flag and a function which hold the status of the image forming apparatus 200.

Procedure for counting usage frequency

Figure 18:
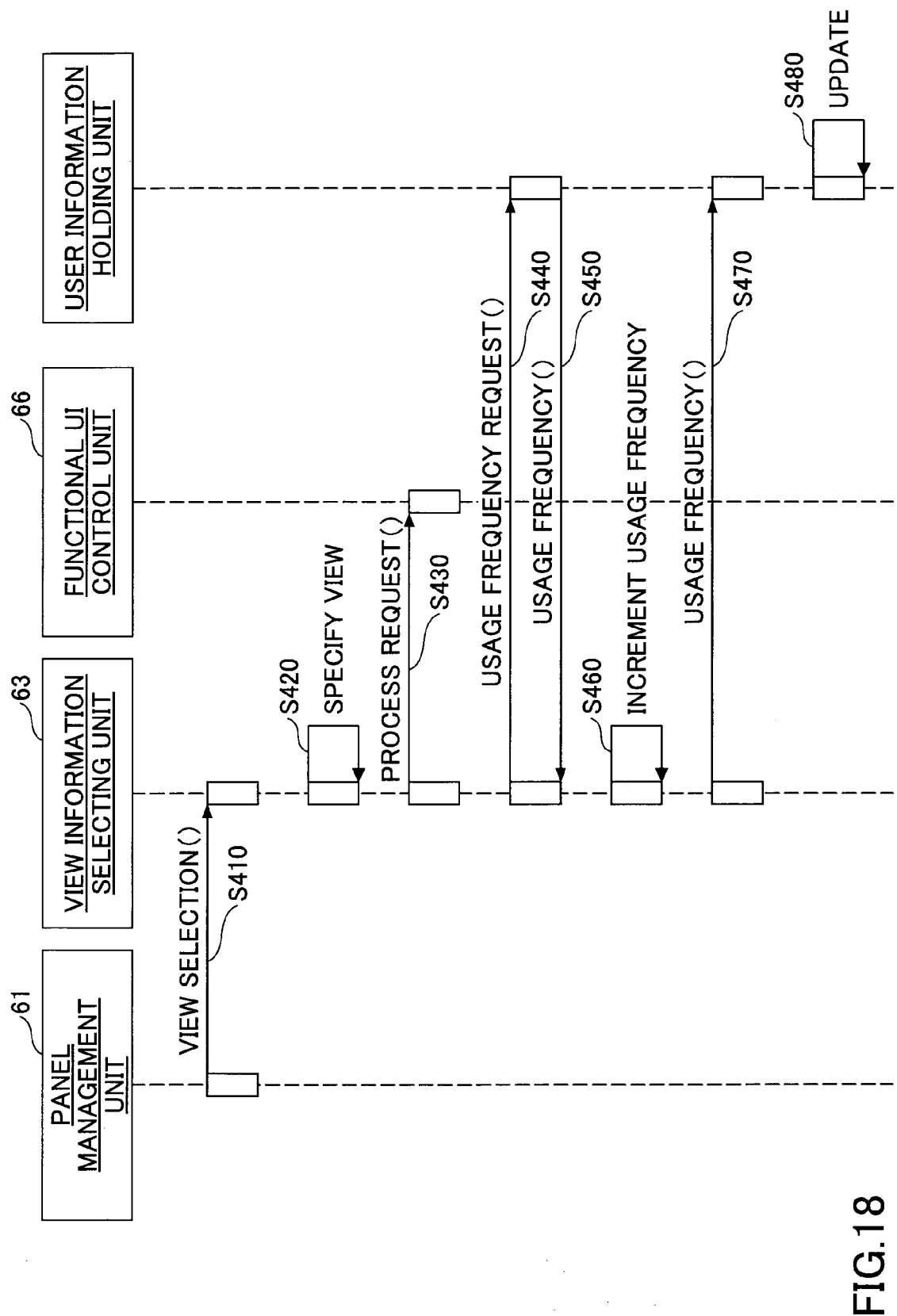
FIG. 18 is an exemplary sequence diagram illustrating a procedure for a view information selecting unit to count usage frequency.

FIG. 18 is an exemplary sequence diagram illustrating a procedure for a view information selecting unit to count usage frequency. A functional UI control unit has already been generated, so that a screen building unit 68 displays, on an operation panel 11, an operation screen 201 (in other words, an operation screen for normal operation).

When the user presses down on (selects) a desired view from the operation screen 201, the panel management unit 61 reports information on location of the selected view to the view information selecting unit 63 (S410).

Then, the view information selecting unit 63 specifies a view selected by the user based on location information (S420).

The view information selecting unit 63 reports, to a functional UI control unit 66 which corresponds to a specified view, that a view has been selected, so that a process based on a setting value is requested (S430). Hereby, the functional UI control unit accepts user operations and starts setting output conditions, etc.

Moreover, the view information selecting unit 63 requests for usage frequency of a function and a view of a user logged in to the user information saving unit 74 (S440), and acquires, from the user information saving unit 74, the usage frequency of the view and the function (S450).

Then, the view information selecting unit 63 increments the usage frequency of the view selected by the user and the usage information of the function to which the view belongs (S460), and the incremented usage frequency of the view and of the function is sent to the user information saving unit 74 (S470). The user information saving unit 74 updates the usage frequency for each user (S480).

(View Selecting Menu 203 to Arrangement Process)

The arrangement process is described. When the user, after selecting the view, presses down on a "Next" key 2031 from the view selecting screen 203 in FIG. 15A, the panel management unit 61 reports, to the screen arrangement location selecting unit 64, that the "Next" key 2031 has been selected.

Figure 19:
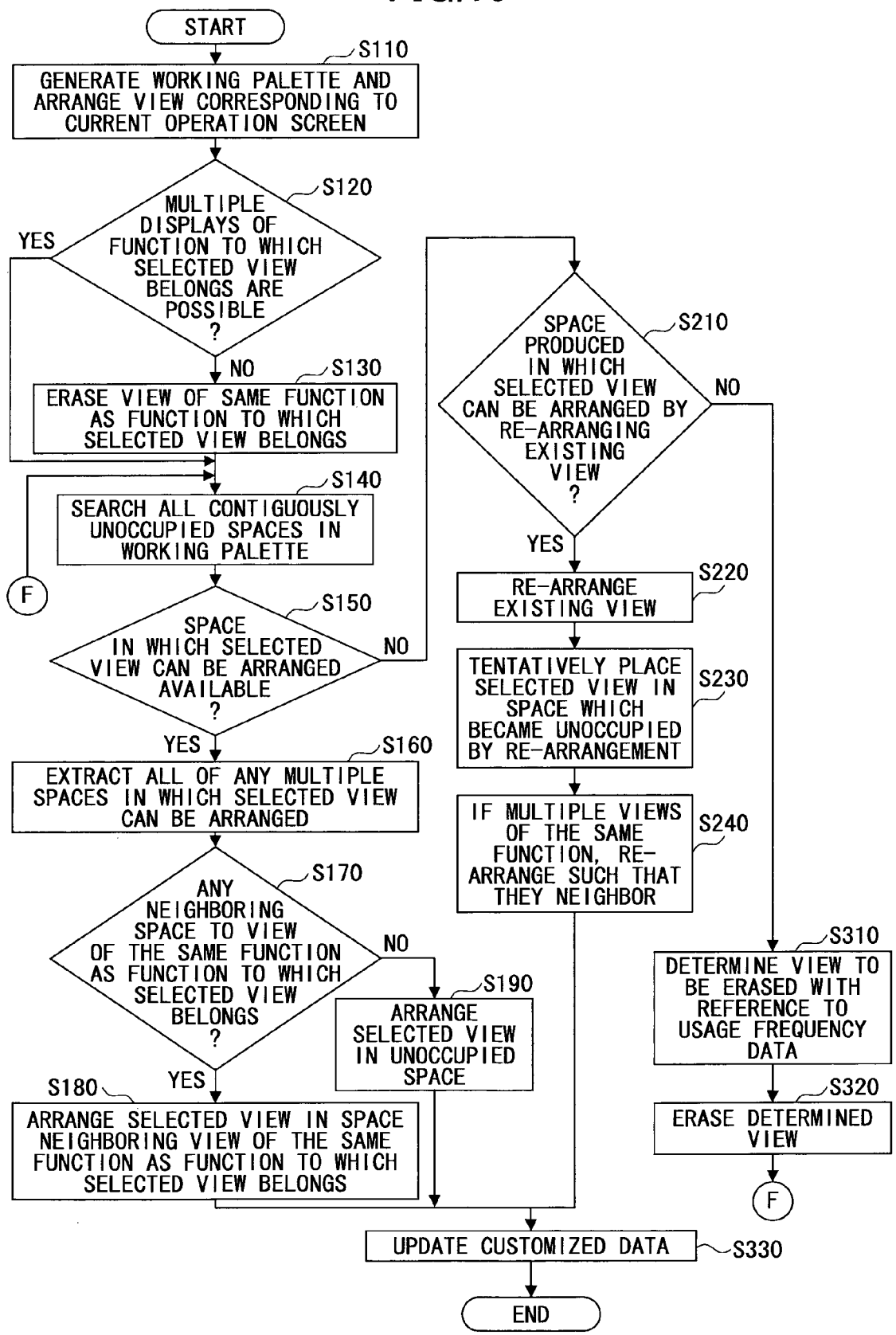
FIG. 19 is an exemplary diagram for explaining a procedure for a screen arrangement location selecting unit to determine an arrangement of a view.

FIG. 19 is an exemplary flowchart for explaining a procedure for the screen arrangement location selecting unit 64 to determine an arrangement of a view. Specific examples to which the procedure in FIG. 19 is applied are explained below using examples of screens.

S110

First, the screen arrangement location selecting unit 64 generates a working palette, and arranges a view corresponding to the current operation screen 201. The working palette, which is a two-dimensional plane for visually explaining a determination of a view arrangement, is divided into grids. Moreover, the screen arrangement location determining unit 64 may designate the grid of the working palette with coordinate information (0,0)-(3,7). In the arrangement process, there is not necessarily a need to generate a working palette in a memory such as a RAM, etc., so that it is possible to determine the view arrangement according to the logic in FIG. 19.

Figure 20:
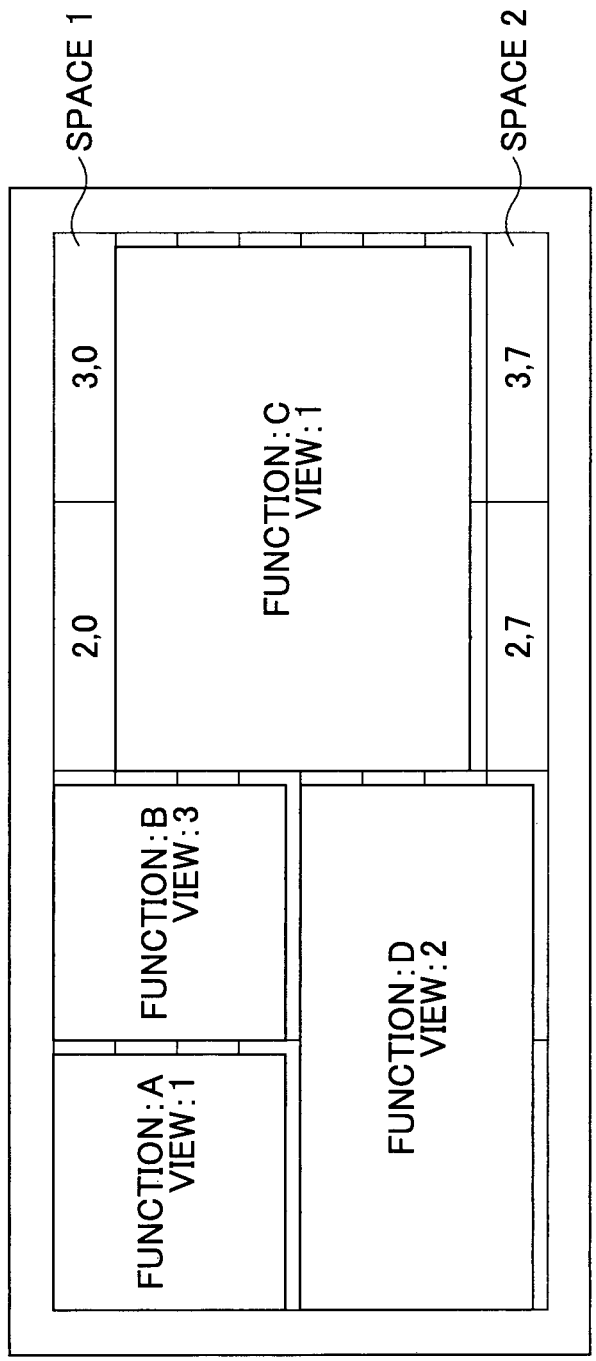
FIG. 20 is an exemplary diagram which schematically illustrates a relationship of an arrangement of each view and a working palette.

FIG. 20 is an exemplary diagram which schematically illustrates a relationship of an arrangement of each view and a working palette. The screen arrangement location selecting unit 64 reads, from customized data 76, etc., an arrangement (in units of grid) of each view of the current operation screen (e.g., a default operation screen, an operation screen customized by the user in the past) 201.

S120

Next, the screen arrangement location selecting unit 64 determines whether it is possible to make multiple displays of the function to which the selected view belongs. The screen arrangement location selecting unit 64 acquires reporting of a view selected by the view information selecting unit 63, for example. The screen arrangement location selecting unit 64 determines whether multiple displays are possible based on ("OK"/"NG": (whether the multiple displays are possible), since whether the multiple displays are possible ("OK"/"NG") is registered in the graphics data 71.

If the multiple displays are possible (Yes in S120), a view which belongs to the same function as the selected view that is already arranged in the working palette does not have to be erased. In this case, the process proceeds to step S140.

S130

If the multiple displays are not possible (No in S120), multiple views of the same function cannot be displayed on the operation screen 201 all at once, so that the screen arrangement location selecting unit 64 erases, from the working palette, the view of the same function as the function to which the selected view belongs.

S140

Then, the screen arrangement location selecting unit 64 searches all of the spaces contiguously unoccupied in the operation palette. Contiguously unoccupied means that one grid and another are contiguously unoccupied in the row or the column direction, and does not include that corners of the grids are contiguous.

In FIG. 20, a space 1 in which grids of (2, 0) and (3, 0) are contiguous, and a space 2 in which grids of (2, 7) and (3, 7) are contiguous are detected.

S150

The screen arrangement location selecting unit 64 determines whether there is space in which the selected view can be arranged. Thus, the screen arrangement location selecting unit 64 reads out size information (in units of grid) of the selected view from the graphic data 71 and compares it with the size of the space.

When both:

(a1) the number of grids in the vertical direction of the view<the number of grids in the vertical direction of the space; and (a2) the number of grids in the horizontal direction of the view<the number of grids in the horizontal direction of the space are met, the screen arrangement location selecting unit 64 determines that there is a space in which the selected view can be arranged.

When there is no space in which the selected view can be arranged (No in S150), the process proceeds to step S210.

S160

If there are multiple spaces in which the selected view can be arranged, the screen arrangement location selecting unit 64 extracts all of the multiple spaces. Thus, the screen arrangement location selecting unit 64 executes determination in step S150 on all spaces. The determination in S160 is necessary to arrange views of the same function next to each other.

S170

The screen arrangement location selecting unit 64 determines whether there is a space neighboring a view of the same function as a function to which the selected view belongs. In step S110, the screen arrangement location selecting unit 64, which specifies a function to which each view of the working palette belongs, may determine whether a view of the function to which the selected view belongs is already arranged in the working palette. When there is a view of the same function as a function to which the selected view belongs, it suffices to determine whether a space neighbors the view.

S180

When there is the space which neighbors the view of the same function as the function to which the selected view belongs (Yes in S170), the screen arrangement location selecting unit 64 arranges the selected view in that space. In this way, a selected view may be arranged as neighboring a view of the same function, making it possible to improve the design characteristics and the operability of the operation screen 201.

S190

When there is no space which neighbors the view of the same function as the function to which the selected view belongs (No in S170), the screen arrangement location selecting unit 64 arranges the selected view in an unoccupied space. In this way, a newly-selected view might have been arranged in a space of a working palette.

Preferably, the process subsequently proceeds to step S240, where re-arrangement is made such that multiple views which belong to the same function neighbor.

S210

When there is no space in which the selected view can be arranged (No in S150), the screen arrangement location selecting unit 64 determines whether an existing view can be re-arranged to determine whether a space is made available in which the selected view can be arranged. This determination is according to the following condition:

(b1) the total number of grids of the space≥the number of grids of the selected view is met. Even when the condition (b1) is met, it may be that the existing view cannot be moved such that the space is contiguous. Thus, the condition of (b1) becomes the necessary condition.

(b2) the size of one space≥size of the minimum existing view.

When the size of one space (for example, (2, 0) (3, 0) in FIG. 20) is at least the size of the existing view (not met in FIG. 20), the existing view is arranged in the space to obtain a contiguous space. However, even in this case, it is not necessarily the case that the selected view can be arranged in a space which is obtained by arranging the existing view such as when the size of the selected view is large. In this case, (b2) also does not become a sufficient condition.

However, if the shape and the size of the grid may be suitably designed so that the conditions of (b1) and (b2) are met, it is likely to obtain space in which the selected view can be arranged. Thus, when the conditions of (b1) and (b2) are met, the screen arrangement location selecting unit 64 re-arranges the existing view to determine that a space may become available in which the selected view can be arranged. Determination may be done with just (b1).

S220

If the existing view is re-arranged to determine that the space becomes available in which the selected view can be arranged (Yes in S210), the screen arrangement location selecting unit 64 re-arranges the existing view.

For example, the screen arrangement location selecting unit 64:

(c1) focuses attention on a certain view of the working palette, and searches for a space in which the view on which the attention is focused can be arranged, and arranges, in the space, the view on which the attention is focused; and (c2) focuses attention on a certain view of the working palette, and, if there is a space neighboring the view on which the attention is focused, moves to the space, the view on which the attention is focused.

Repeating these tasks, the existing view is re-arranged such that the screen arrangement location selecting unit 64 re-arranges the existing view.

S230

The screen arrangement location selecting unit 64 tentatively places the selected view in a space which became unoccupied as a result of re-arrangement. At the time of tentative placement, a space neighboring a view of the same function as the selected view is preferentially selected. With the tentative placement, the selected view has been arranged at least on the working palette.

If the size of the space made unoccupied by the re-arrangement is smaller than the size of the view selected, the process proceeds to step S310.

S240

Next, when there are multiple views of the same function, the screen arrangement location selecting unit 64 re-arranges them so that they neighbor. In this way, a selected view may be arranged as neighboring a view of the same function, making it possible to improve the design characteristics and the operability of the operation screen 201.

For example, a view which neighbors at least one of two views which belong to the same function and which has the same size as the view which belongs to the same function is temporarily taken out from the working palette, and arranges therein one of two views which belong to the same function. Then, the view temporarily taken out from the working palette is arranged in a location prior to one of two views which belong to the same function. In this way, multiple views of the same function may be made to neighbor.

S310

Then, even when the existing view is re-arranged, if it is determined that no space in which the selected view can be arranged is yielded (No in S210), the screen arrangement location selecting unit 64 refers to usage frequency data 79 to determine the view to be erased.

For example, the screen arrangement location selecting unit 64 determines the view erased based on the following conditions:

(d1) a view with the usage frequency which is the smallest of usage frequencies of views is determined as a view to be erased;

(d2) a function with the usage frequency which is the smallest of usage frequencies of functions is specified, a view which belongs thereto is determined as a view to be erased; and (d3) A view with the smallest usage frequency of views which belong to the same function as the selected view is determined as a view to be erased.

If (d1) is set as a condition, a view called "Finish 3" of the "finishing" function from FIG. 13A is determined as a view to be erased. Thus, a view with the lowest usage frequency may be erased, making it possible to minimize failures due to the erasure.

If (d2) is made a condition, "a color selection" function from FIG. 13B is specified, and out of views of the working palette, a view which belongs to the "color selection" function is determined as a view to be erased. If there is no view which belongs to the "color selection" in the working palette, then a function with a small usage frequency is specified, and a view which belongs to the function is determined to be a view to be erased. A view which belongs to a function not often used may be erased, so that only views of the function often used by the user may be arranged on the operating screen 201.

When (d3) is made a condition, if the selected view is a view which belongs to the function of "color selection", a view "Color Select 2" from FIG. 13A is determined as a view to be erased. In this case, a large number of views of the same functionality is prevented from being arranged on the operation screen 201.

Not a view of the low usage frequency, but a view with the longest elapsed time from the time last used may be erased preferentially.

S320

Then, the screen location selecting unit 64 erases from the working palette a view determined based on the usage frequency. Specifically, it suffices to erase the view from customized data 76.

Next, the process proceeds to step S140, where the screen arrangement location selecting unit 64 searches for a contiguously unoccupied space in the working palette and tries to arrange the selected view therein. The process of S140 and beyond may be repeated to eventually arrange the selected view in the working palette all the time.

S330

When the arrangement of the selected view is determined the screen arrangement location selecting unit 64 updates the customized data 76 of the logged-in user, thus completing the process in FIG. 19.

When there is shortage of space, it may be arranged for allowing the user rather than the display 100 to delete the view. The user selects a view to be erased to erase the view. When the space is yielded due to the erasure, the display apparatus 100 may arrange the selected view.

Customizing Result Checking Screen 206

When the screen arrangement location selecting unit 64 updates customized data 76 the screen building unit 68 reads out the customized data 76 to display the customizing result checking screen 206 on the operation panel 11. In this way, the user can finalize the operation screen 201.

Specific examples to which are applied procedure in FIG. 19

The procedure of FIG. 19 is described using specific screen examples.

Primarily S120, S130

FIGS. 21A-21D are drawings illustrating an exemplary screen transition when a view of a function to which a selected view belongs cannot be displayed in multiple numbers.

Figure 21A:
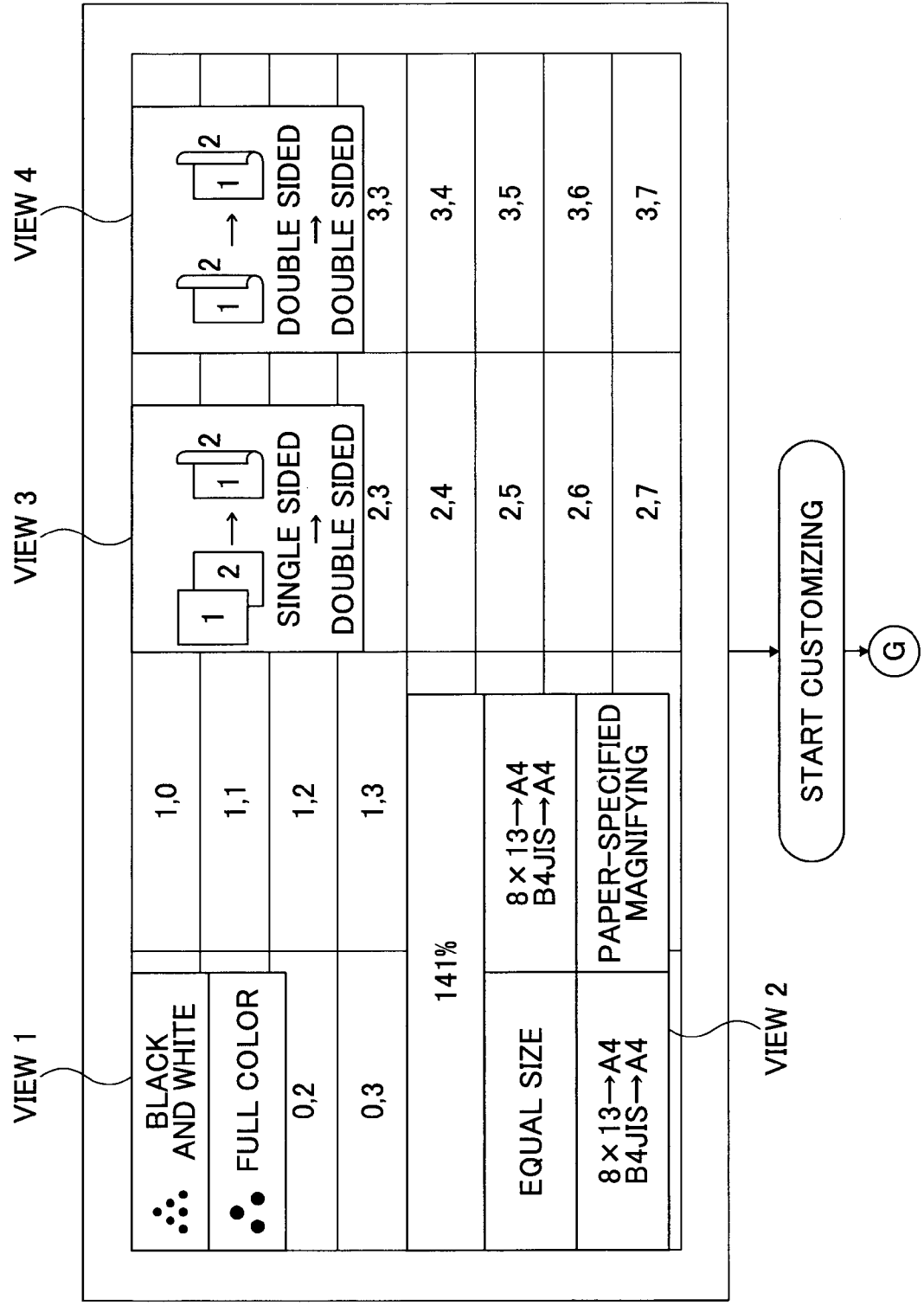

In the working palette in FIG. 21A, a view 1 of the "color selection" function, a view 2 of the "magnifying" function, and views 3 and 4 of the "double sided" function.

Figure 21B:
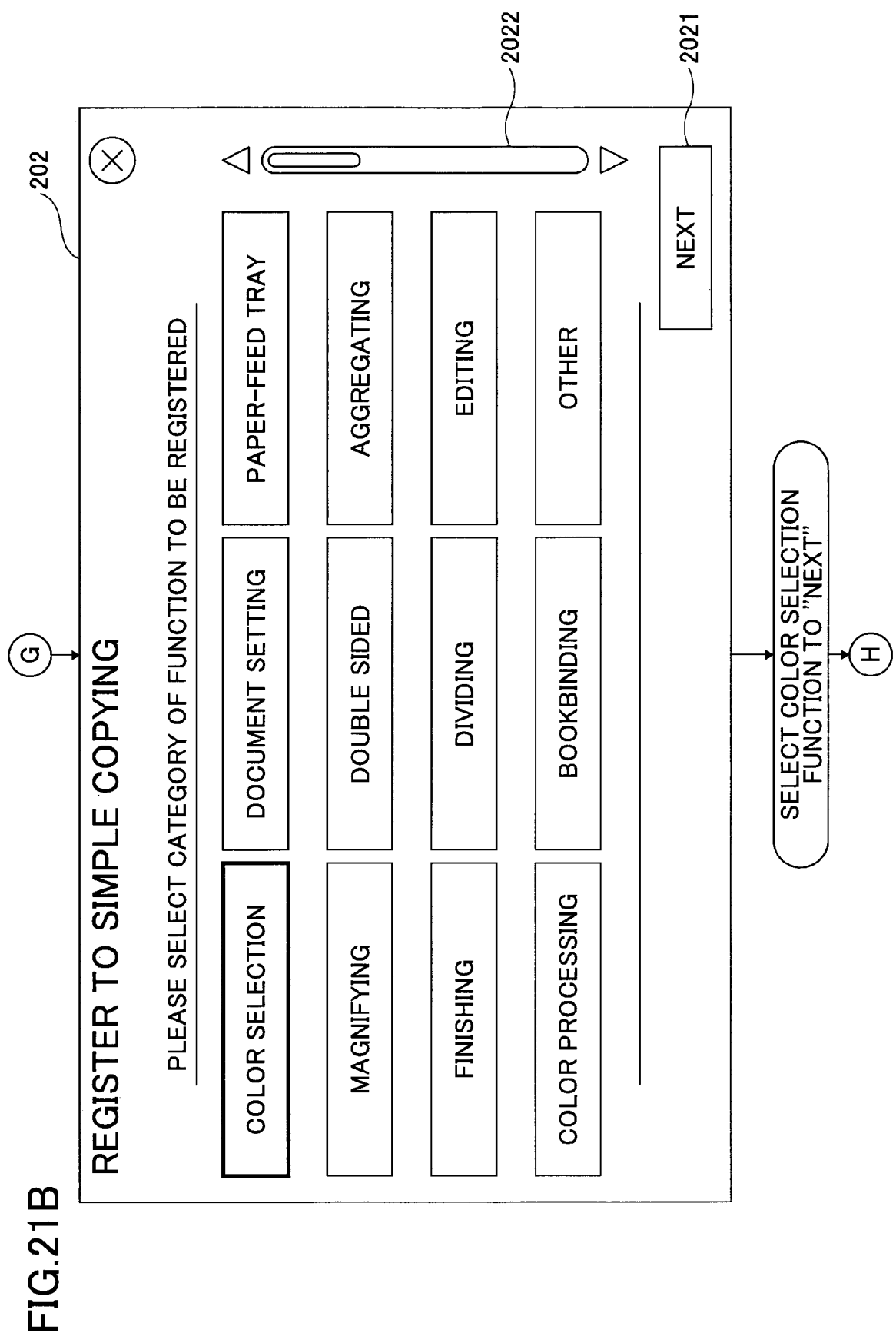

In the function list screen of FIG. 21B, the user selected a "color selection" function. Thus, in FIG. 21C, a view selecting screen of the "color selection" function is displayed. In the view selecting screen, views a-d are displayed, and the user selects the view a.

Then, the screen arrangement location selecting unit 64 reads out the graphic data 71 of the view a, and determines whether the view a is a view such that multiple thereof can be displayed based on "OK" or "NG" which is collated with "multiple displays". In the "color selection" function, the "multiple displays" are "NG", so that the screen arrangement location selecting unit 64 erases, from the working palette, a view 1 of the same function as a function to which the selected view a belongs.

With the erasure, a space is obtained in which the selected view can be arranged, so that the screen arrangement location selecting unit 64 arranges the selected view a in an unoccupied space.

Figure 21D:
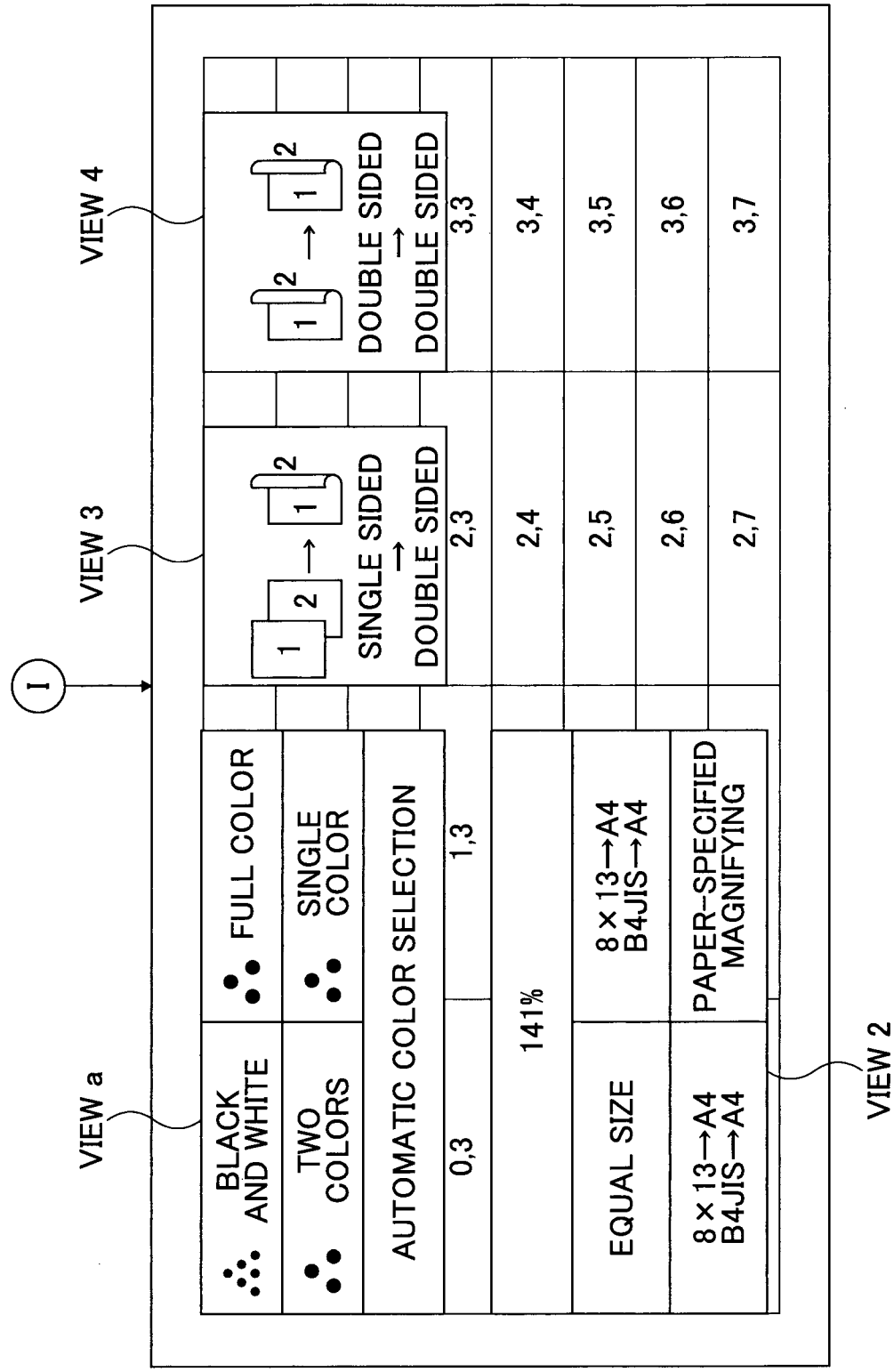

FIG. 21D shows one example of a customized working palette. In FIG. 21D, it is seen that a view 1 of FIG. 21A is replaced by the view a.

Primarily S160-S180

FIGS. 22A-22D are drawings illustrating an exemplary screen transition when there are multiple spaces for arranging selected views.

Figure 22A:
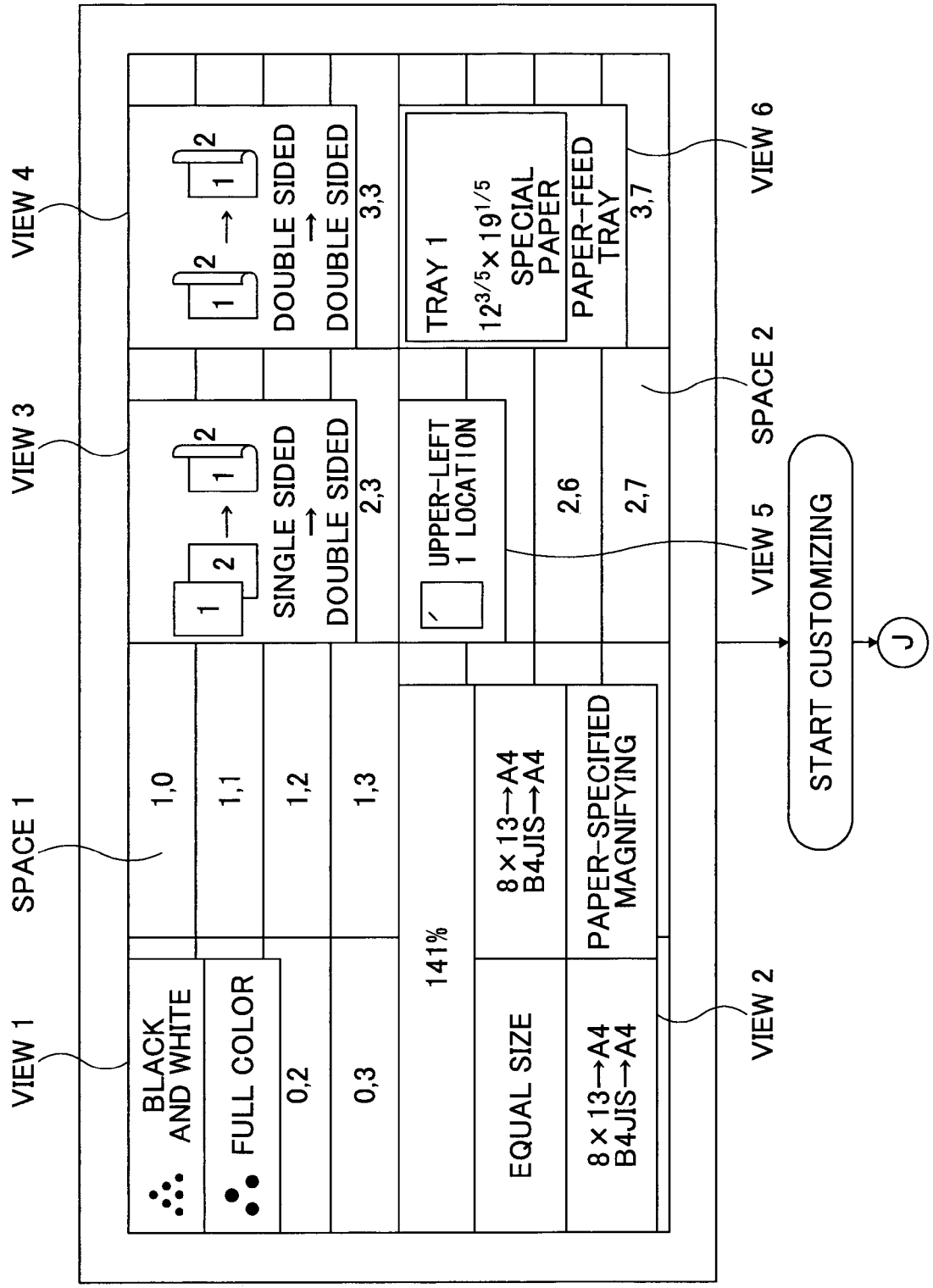
FIGS. 22A-22D are drawings illustrating an exemplary screen transition when there are multiple spaces for arranging selected views.

In the working palette of FIG. 22A are arranged a view 1 of a "color selection" function, a view 2 of "magnifying" function, views 3 and 4 of "double sided" function, a view 5 of "finishing", and a view 6 of "double sided" function.

Figure 22B:
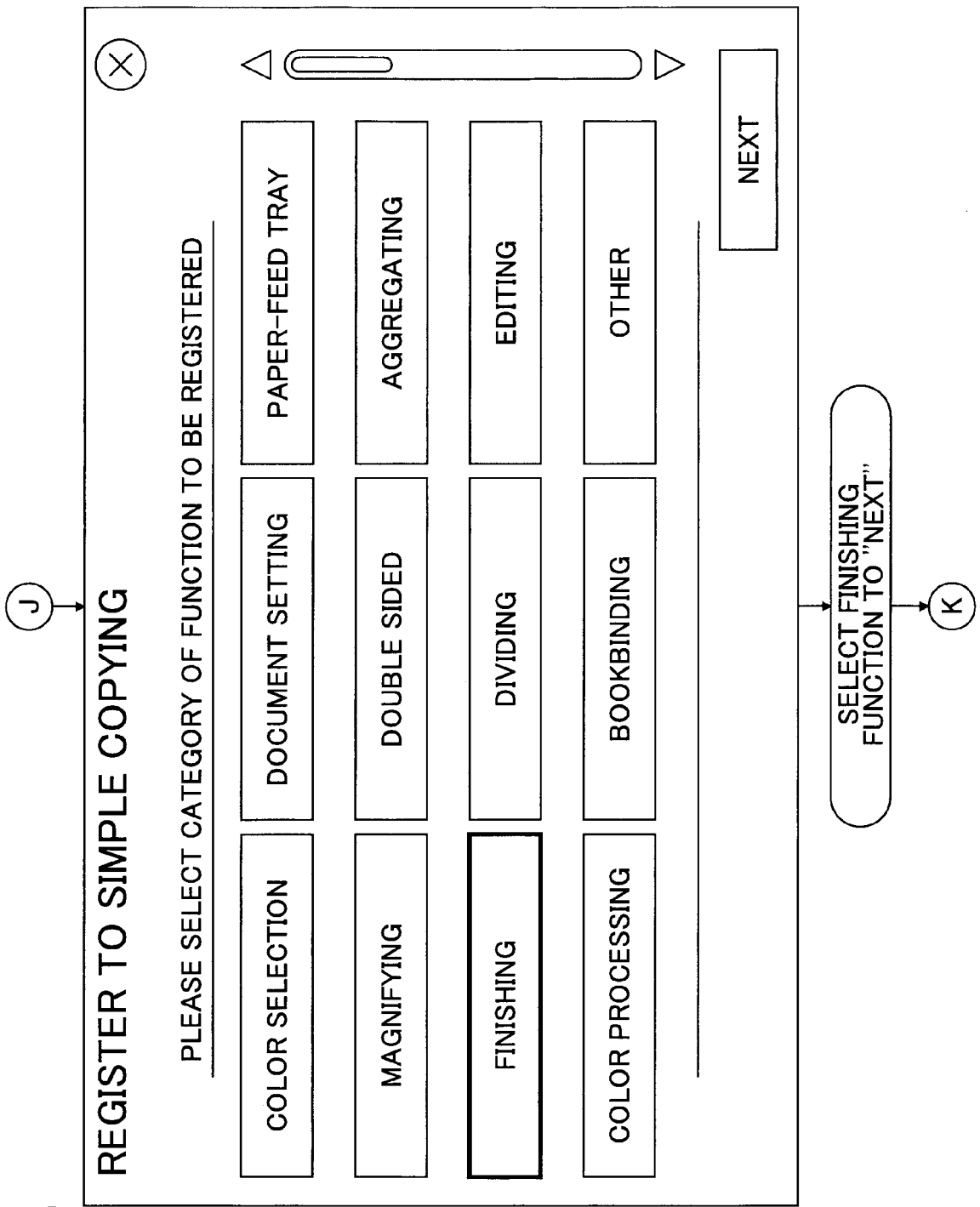
Figure 22C:
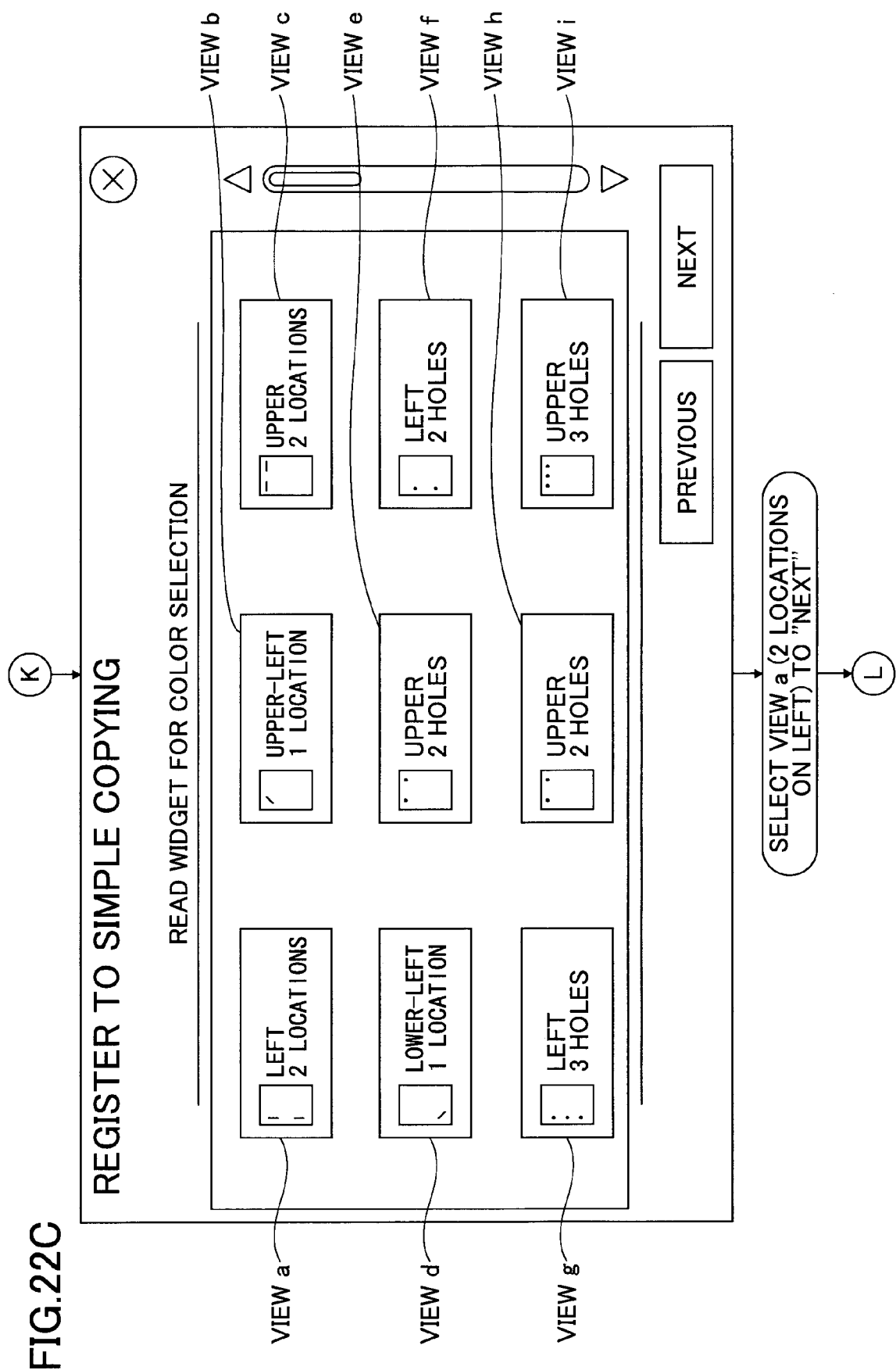

In the function list screen of FIG. 22B, the user selected a "finishing" function. Thus, in FIG. 22C, a view selecting screen of the "finishing" function is displayed. In the view selecting screen, views a-i are displayed, and the user selects the view a.

The screen arrangement location selecting unit 64 reads out size information from the graphic data 71 of the view a, compares it with the size of the space and extracts two spaces in which the selected view a can be arranged. Spaces 1 and 2 in FIG. 22A are spaces extracted.

As there are multiple spaces, the screen arrangement location selecting unit 64 determines whether there is a space neighboring a view of the same function as a function to which the selected view a belongs. The space 2 neighbors the view 5 of the "finishing" function 5, so that the screen arrangement location selecting unit 64 determines that the space 2 is a space which neighbors a view of the same function as a function to which the selected view a belongs.

Figure 22D:
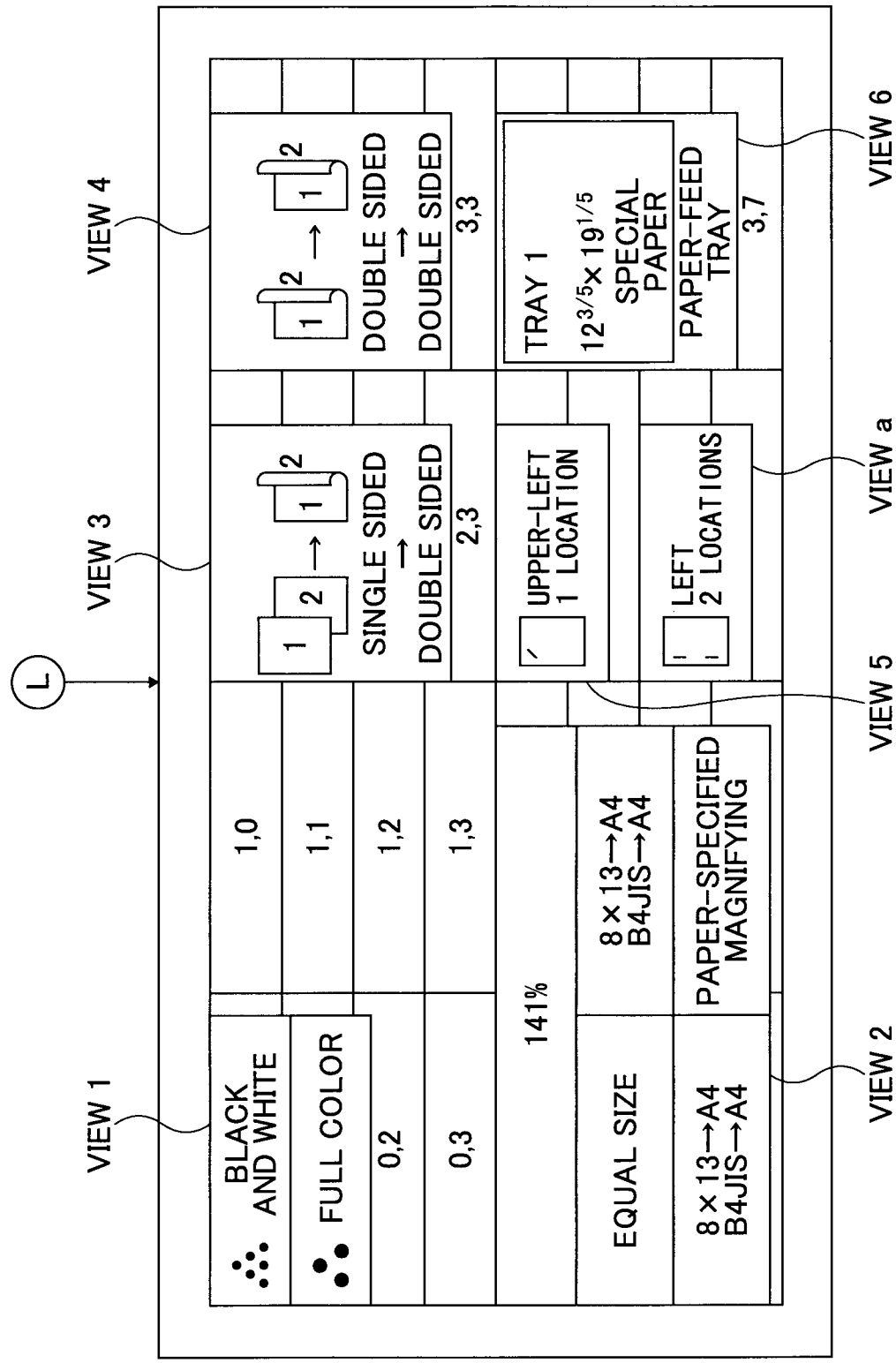

Thus, the screen arrangement location selecting unit 64 arranges the selected view a in the space 2, which is unoccupied. FIG. 22D shows one example of a customized working palette. In FIG. 22D, the view a is seen to be arranged in the space 2 of FIG. 22A.

Primarily S210-240

FIGS. 23A-23F illustrates an exemplary screen transition when an existing view is re-arranged to arrange a selected view.

Figure 23A:
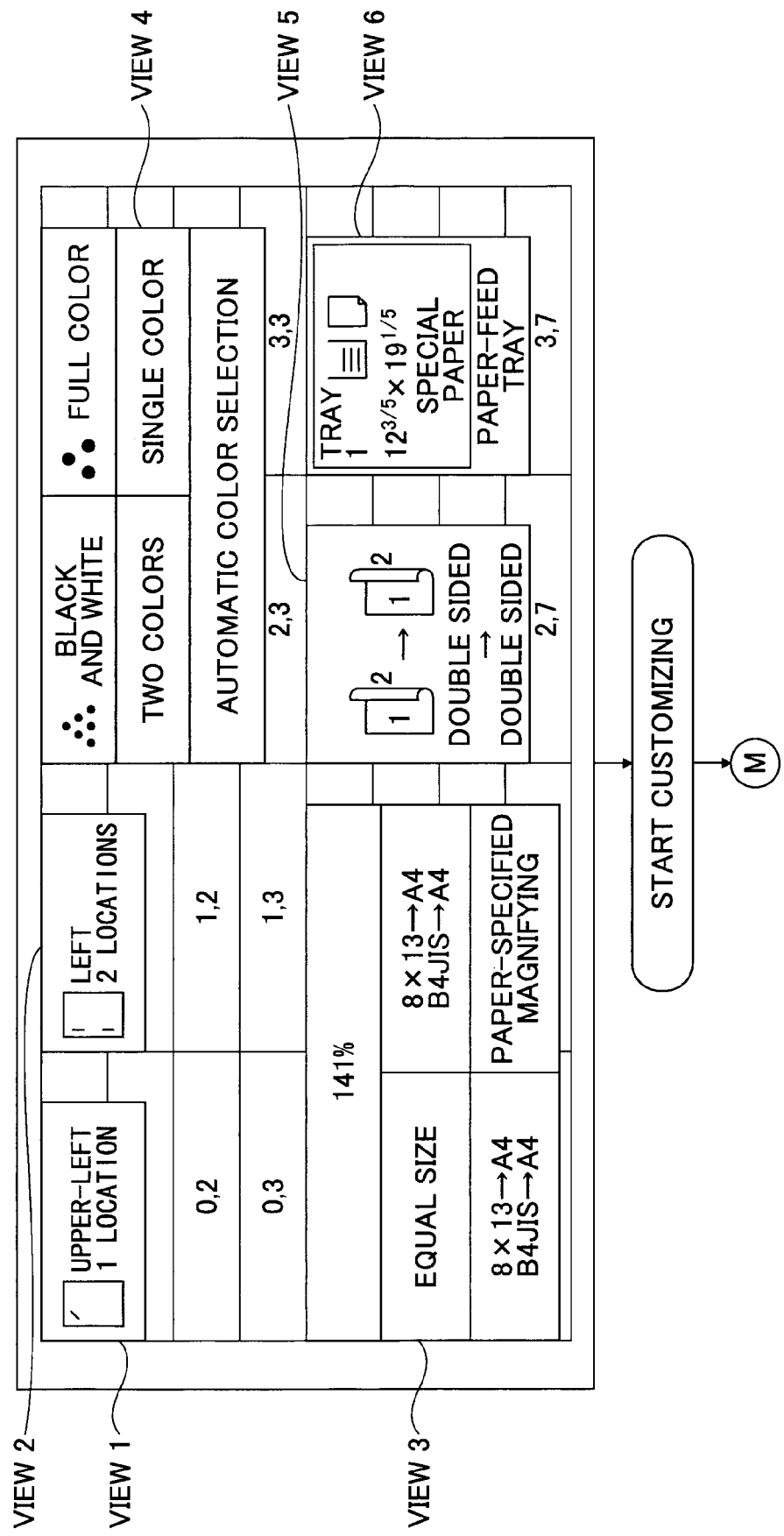
FIGS. 23A-23F illustrates an exemplary screen transition when an arrangement of an existing view is changed to arrange a selected view.

In the working palette of FIG. 23A are arranged a view 1 of a "finishing" function, a view 2 of "magnifying" function, views 3 and 4 of "double sided" function, a view 5 of "finishing", and a view 6 of "double sided" function.

Figure 23B:
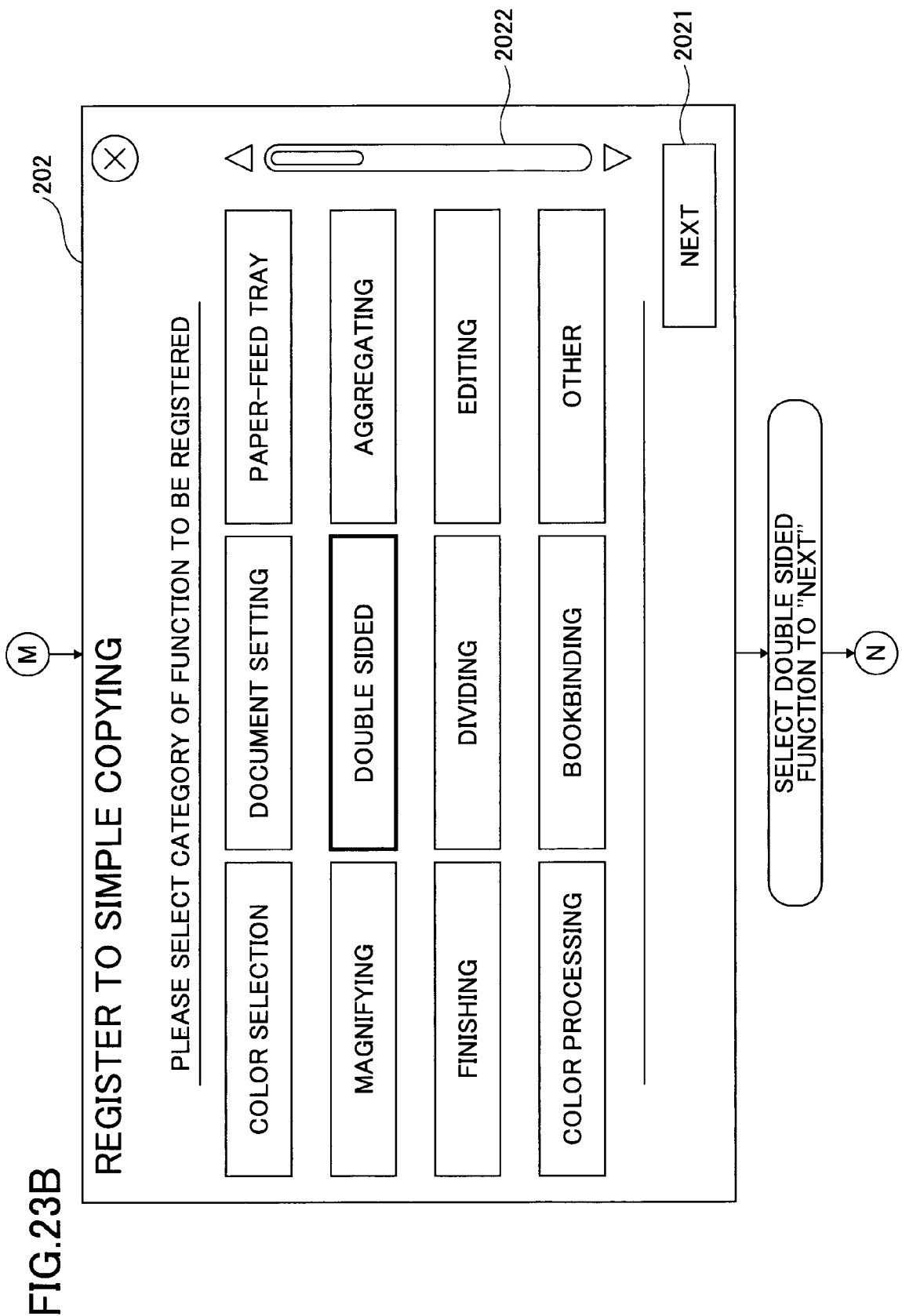
Figure 23C:
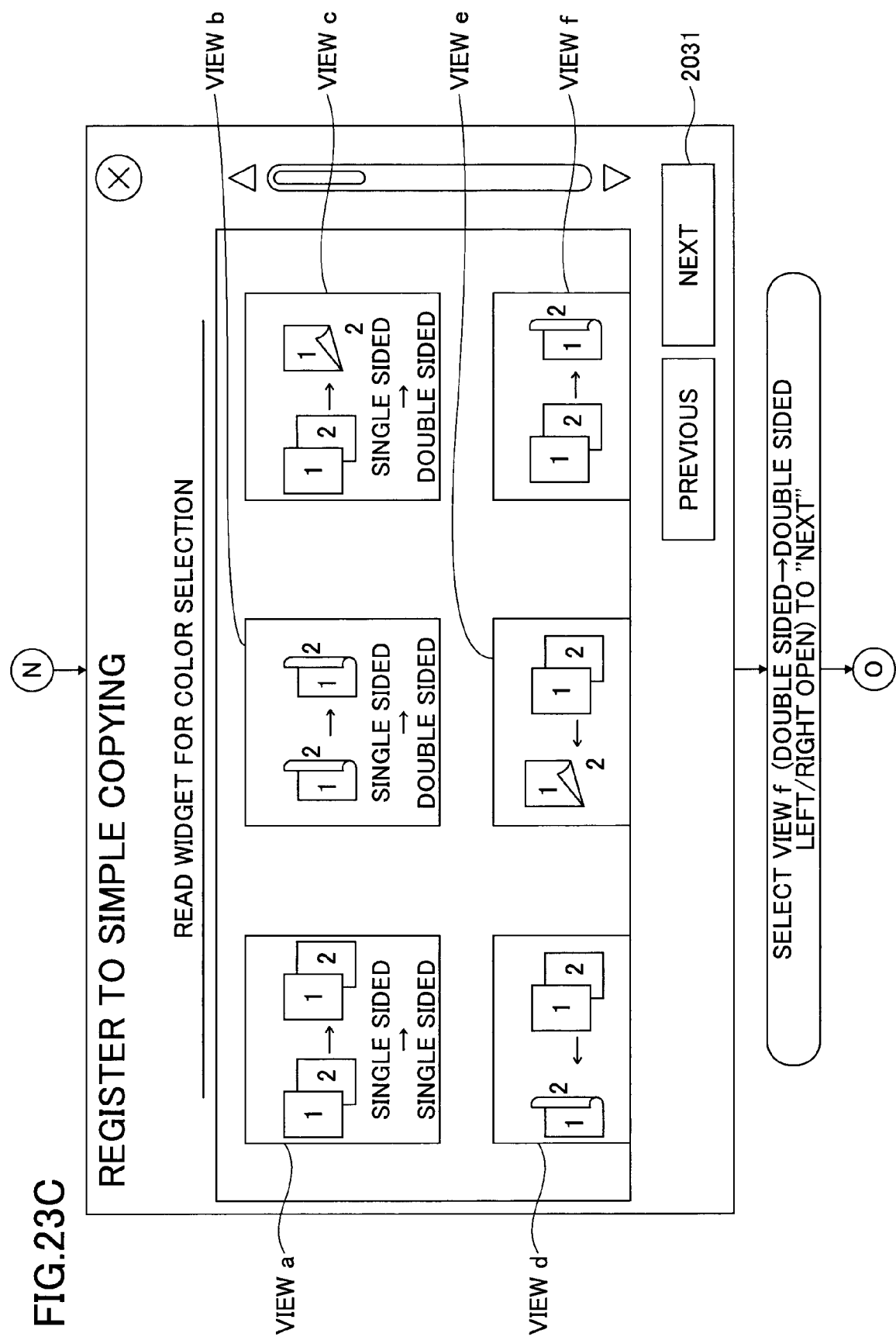

In the function list screen of FIG. 23B, the user selected a "double sided" function. Thus, in FIG. 23C, a view selecting screen of the "double sided" function is displayed. In the view selecting screen, views a-f are displayed, and the user selects view f.

The screen arrangement location selecting unit 64 reads out size information from the graphic data 71 of the view f, compares it with the size of the space to determine that the selected view f cannot be arranged as it is, while determining that, with the existing view re-arranged, the selected view F can be arranged.

Figure 23D:
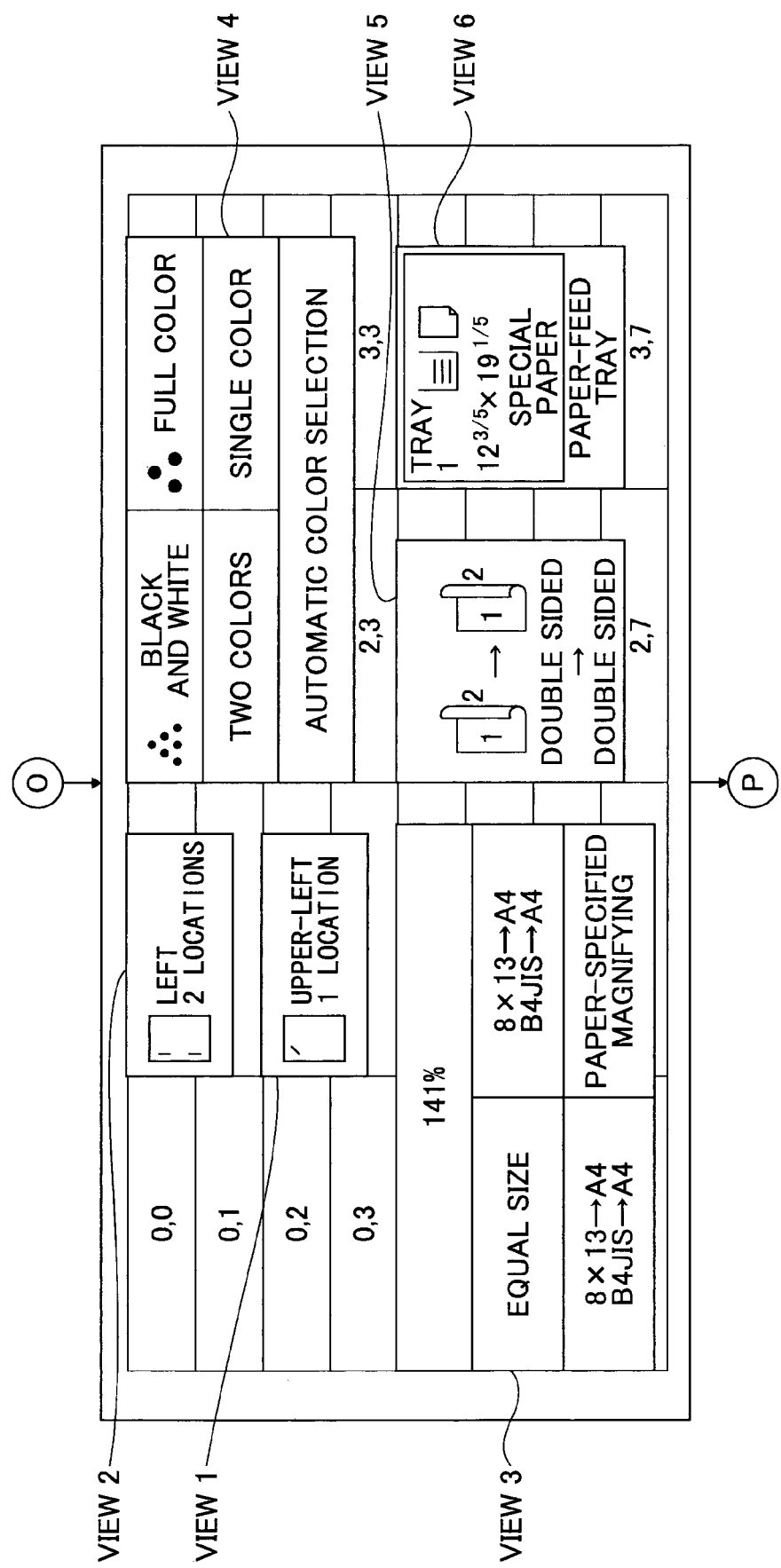

Then, the screen arrangement function selecting unit 64 re-arranges the existing view. FIG. 23D shows one example of a working palette in which the existing view is re-arranged. As compared to FIG. 23A, the view 1 of the "finishing" function is re-arranged.

Figure 23E:
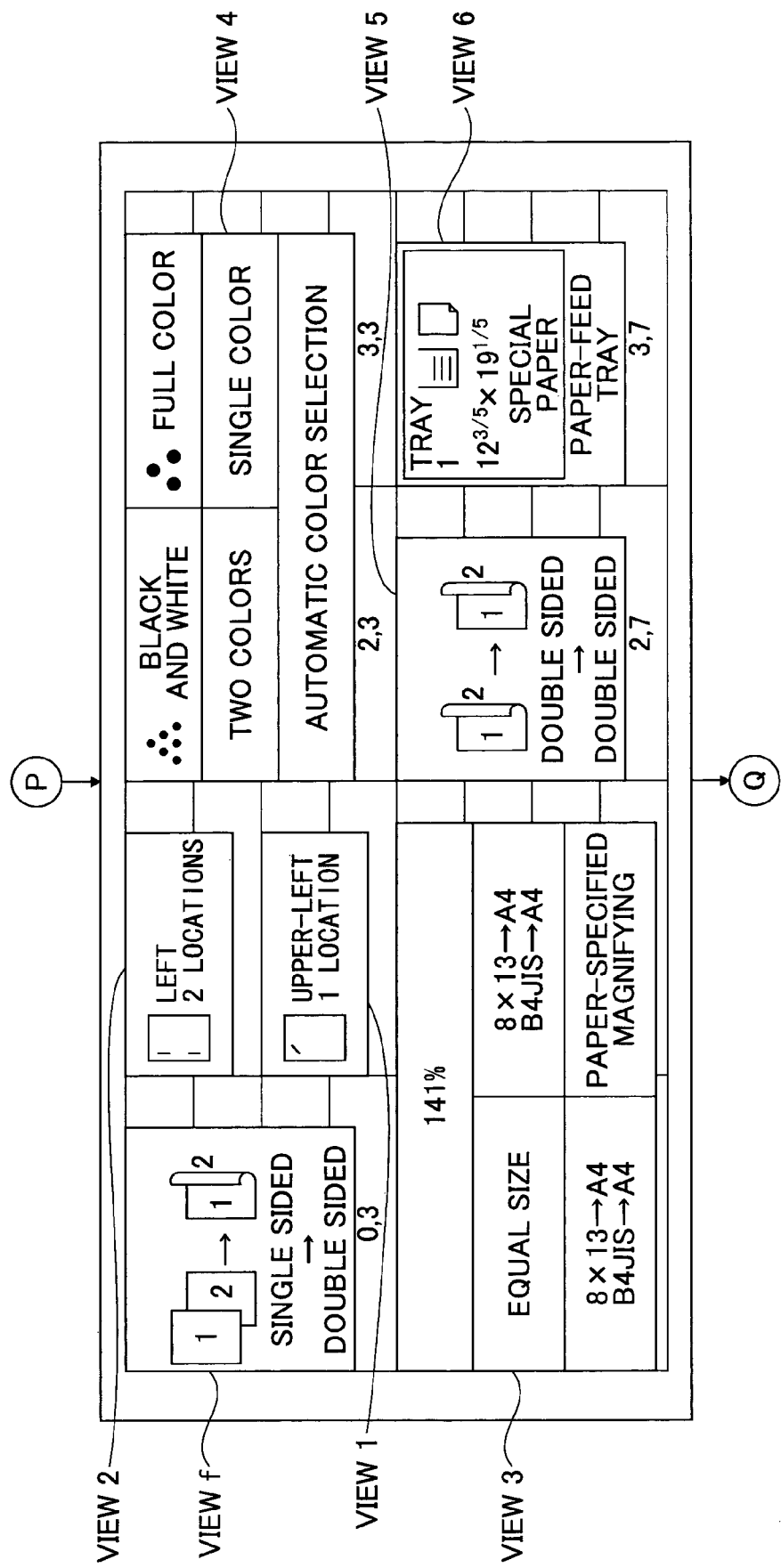

Next, the screen arrangement location selecting unit 64 tentatively places the selected view f in a space which became unoccupied as a result of re-arrangement. FIG. 23E is an example of a tentatively placed working palette of the view f. Compared to FIG. 23D, a space is arranged on the view f.

Next, when there are multiple views of the same function, the screen arrangement location selecting unit 64 re-arranges them so that they neighbor. In FIG. 23E both the view 5 of the "double sided" function and the tentatively placed view f belong to the same "double sided" function. Thus, the screen arrangement location selecting unit 64 re-arranges one of the view f and the view 5 such that they neighbor each other.

Figure 23F:
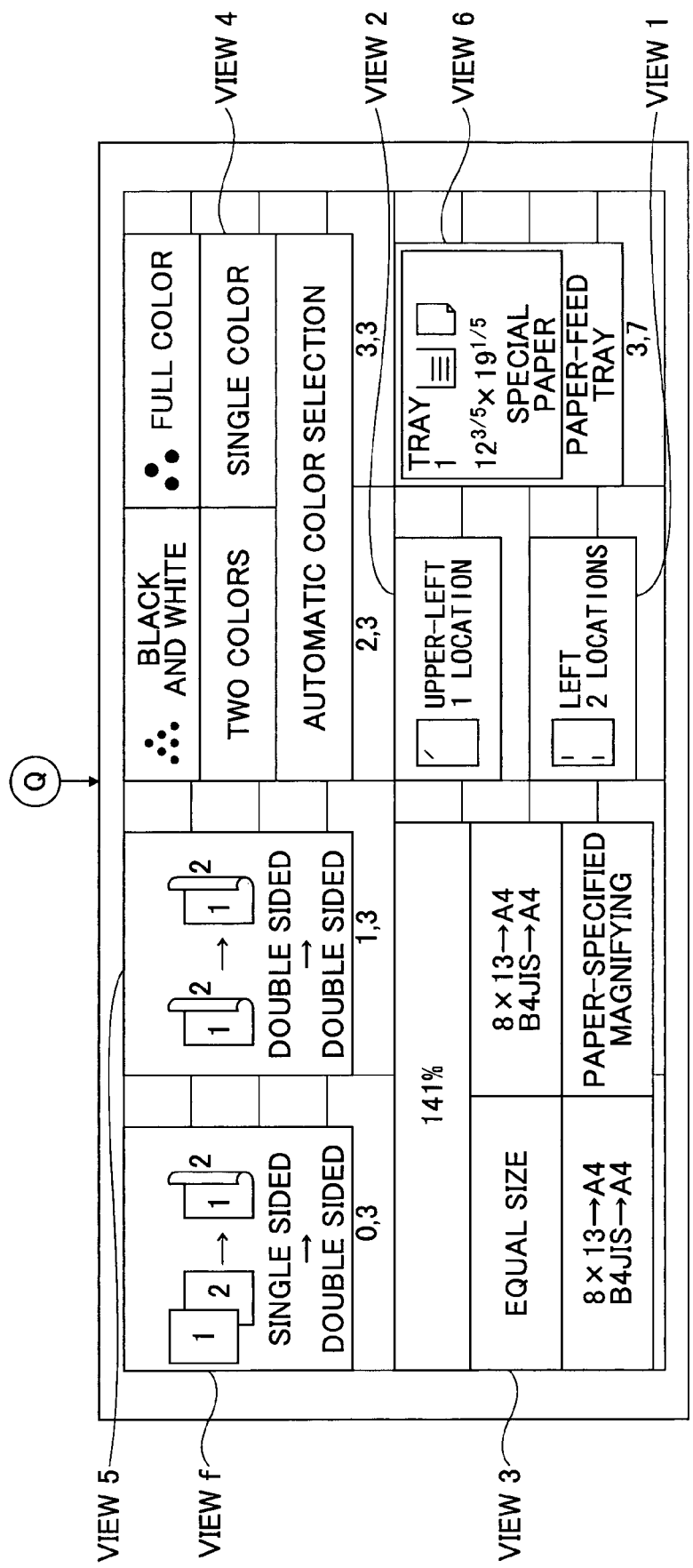

FIG. 23F shows one example of a working palette in which the view 5 is re-arranged. Compared with FIG. 23E, the view 5, and views 1 and 2 are mutually interchanged.

Primarily S310-320

FIGS. 24A-24G are drawings illustrating an exemplary screen transition when a view to be erased is determined with reference to usage frequency data 79.

Figure 24A:
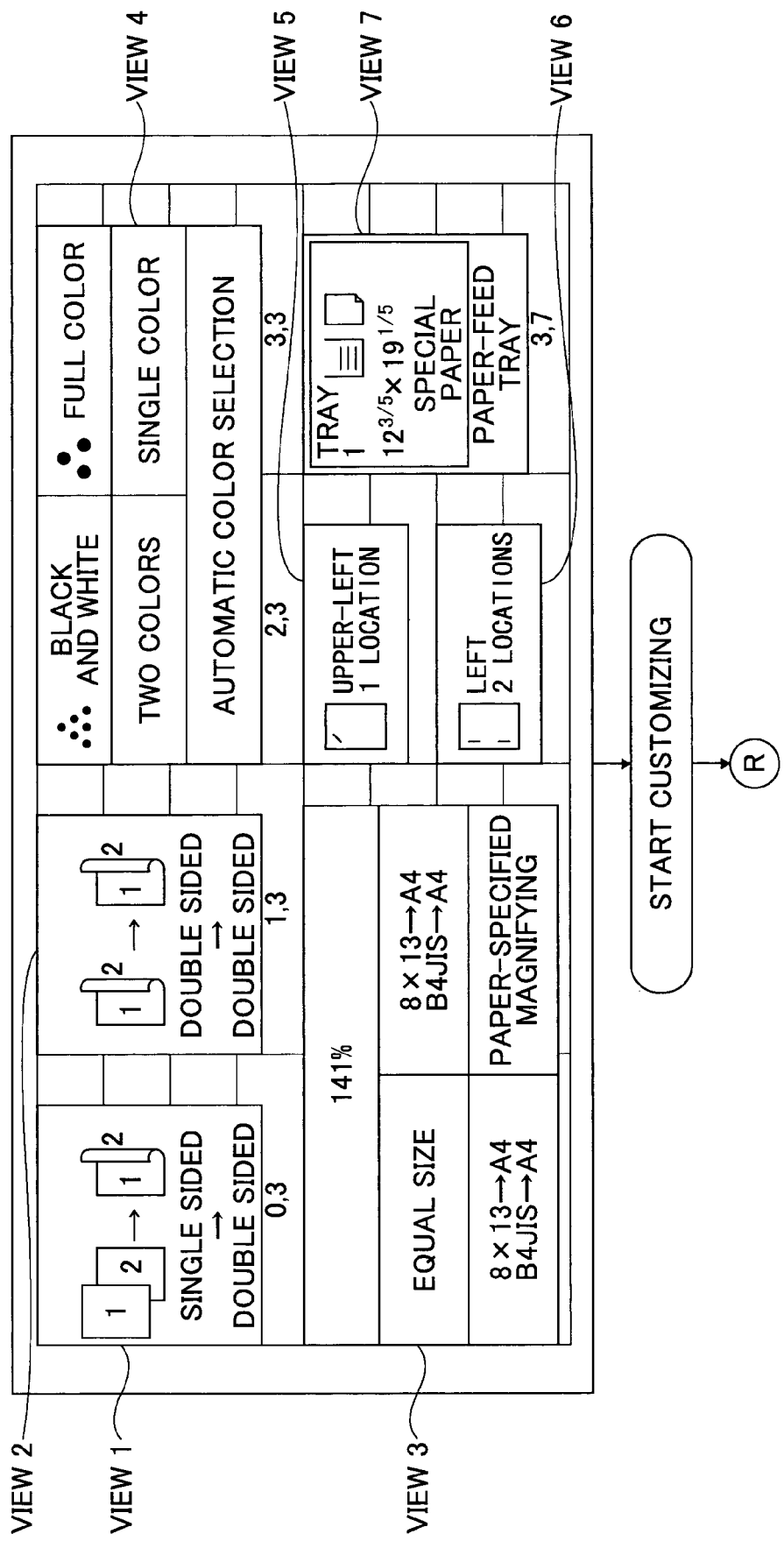

In the working palette of FIG. 24A are arranged views 1 and 2 of a "double sided" function, a view 3 of a "magnifying" function, a view 4 of a "color selection" function, views 5 and 6 of a "finishing" function, and a view 7 of a "paper feed" function. In other words, there is no space in FIG. 24A.

Figure 24B:
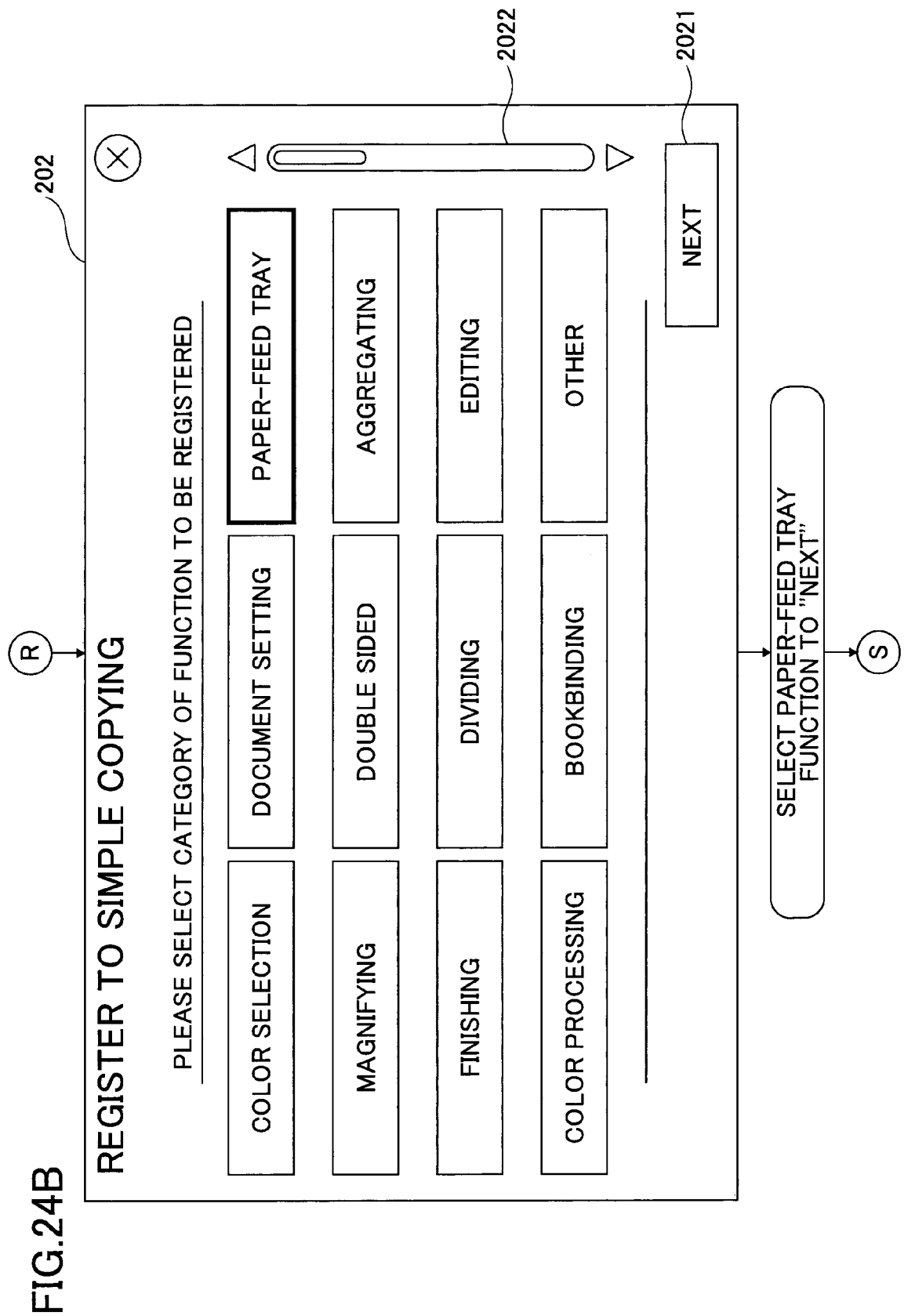
Figure 24C:
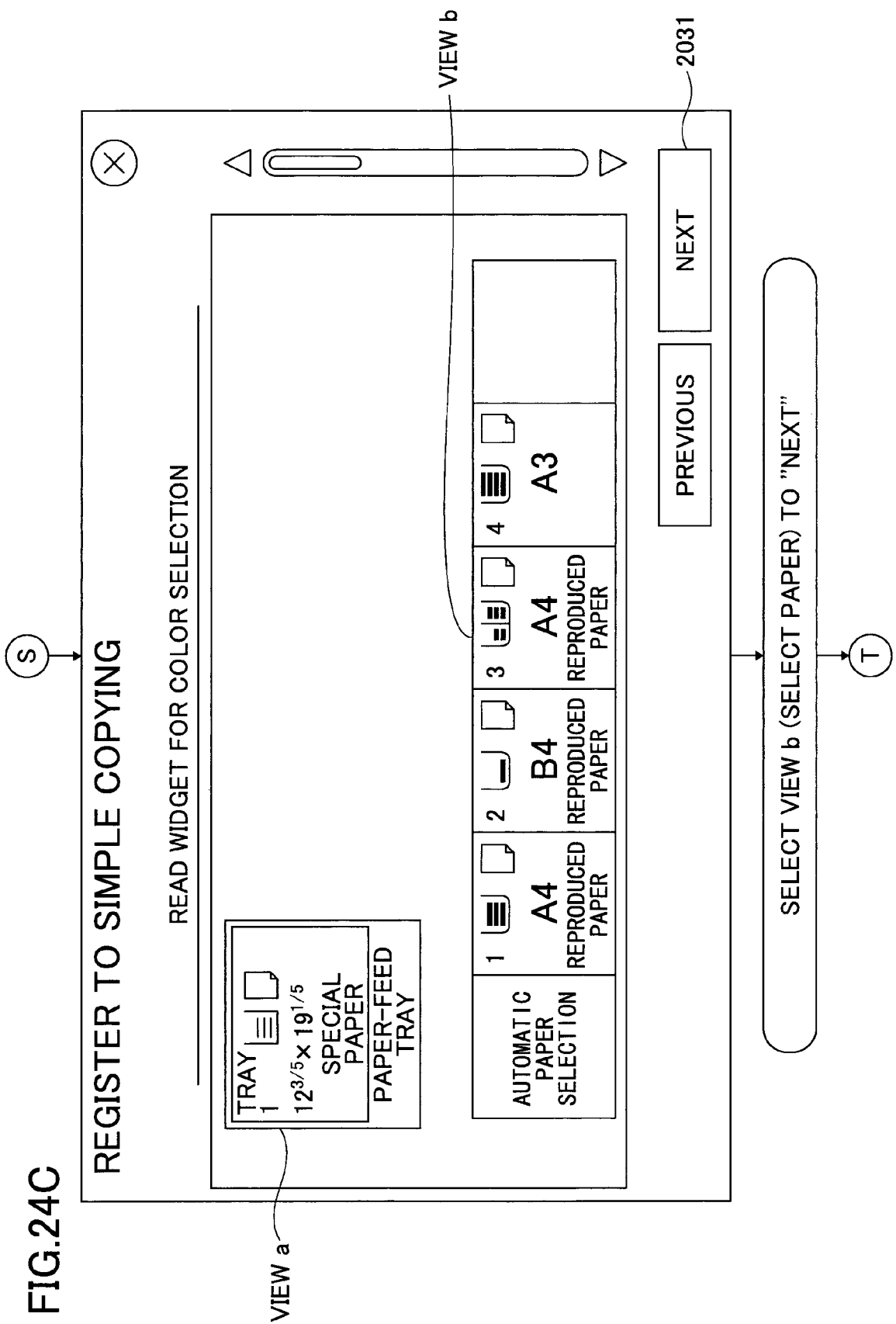

In the function list screen of FIG. 24B, the user selected the "paper feed" function. Thus, in FIG. 24C, a view selecting screen of the "paper feed" is displayed. In the view selecting screen, views a and b are displayed, and the user selects the view b.

The screen arrangement location selecting unit 64 reads out size information from the graphic data 71 of the view b and compares it with the size of the space (zero in FIGS. 24A-24G). Then, even when the existing view is re-arranged, it is determined that the selected view b cannot be arranged.

Then, the screen arrangement location selecting unit 64 refers to the usage frequency data 79 to determine a view to be erased. Here, with (d1) as the condition, a view to be erased is determined from the usage frequency.

Figure 24D:
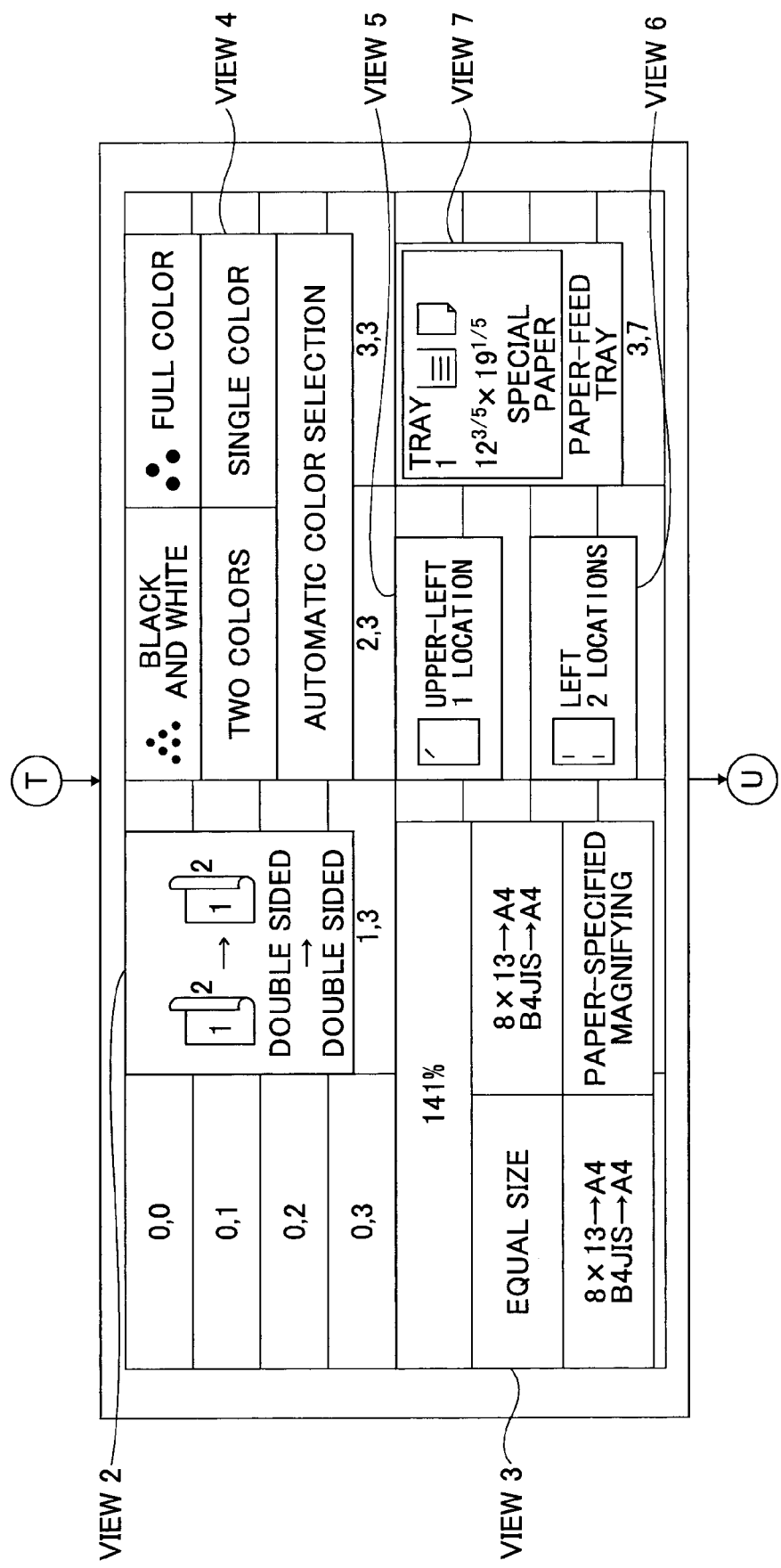

The screen arrangement location selecting unit 64 determines, for example, that the usage frequency of the view 1 of the "double sided" function is the smallest, so that the screen arrangement location selecting unit 64 determines that the view 1 is to be erased. FIG. 24D shows one example of a working palette in which the view 1 is erased.

Next, the screen arrangement location selecting unit 64 reads out size information from the graphic data 71 of the view b and compares it with the size of the space. However, it is determined that, even when the existing view is re-arranged, the selected view b cannot be arranged.

Figure 24E:
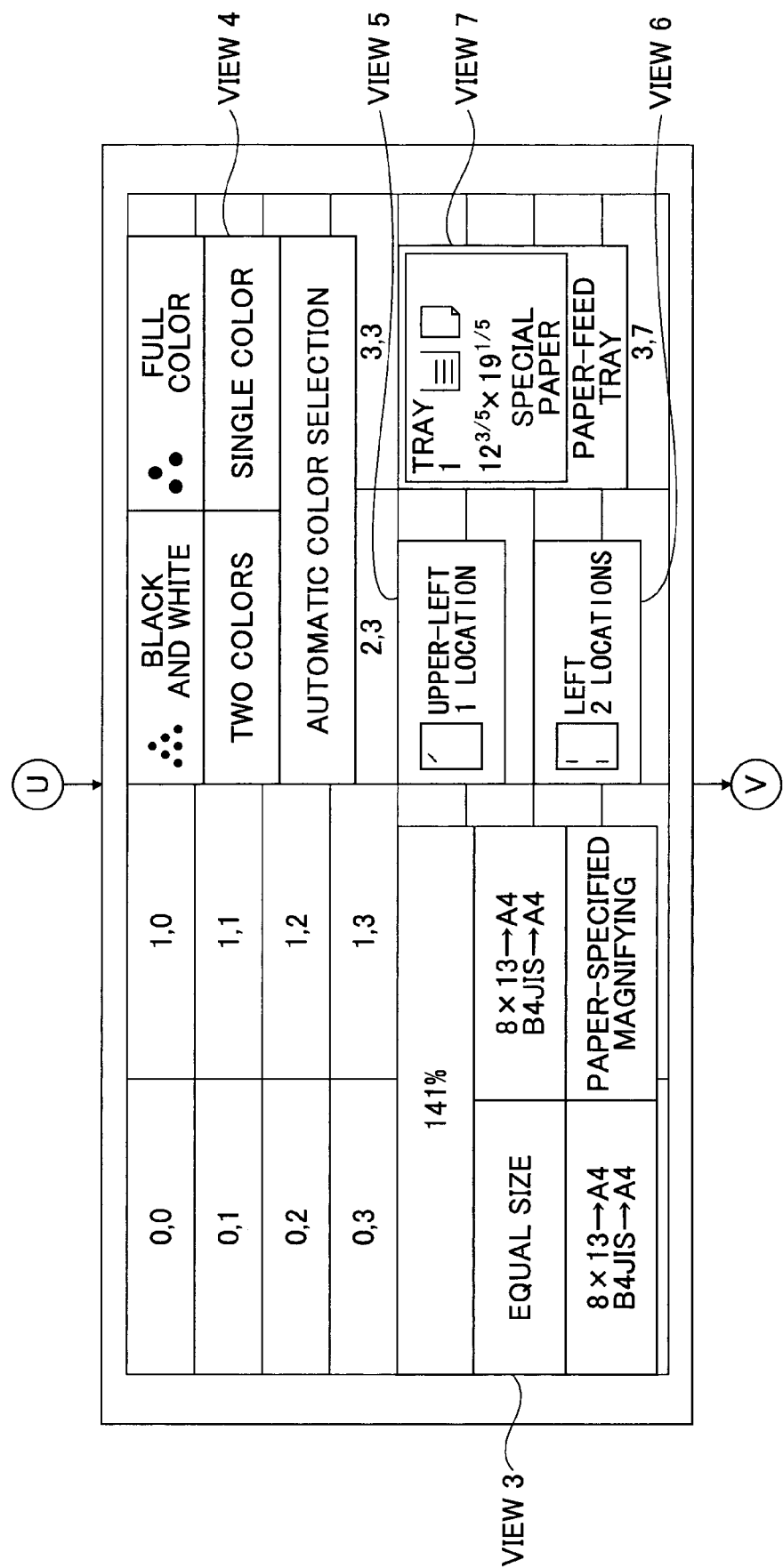

The screen arrangement location selecting unit 64 determines that the usage frequency of the view 2 of the "double sided" function is the smallest, so that the screen arrangement location selecting unit 64 determines that the view 2 is to be erased. FIG. 24E shows one example of a working palette in which a view 2 is erased.

The screen arrangement location selecting unit 64 reads out size information from the graphic data 71 of the view b and compares it with the size of the space. However, even when the existing view is re-arranged, it is determined that the selected view b cannot be arranged.

The screen arrangement location selecting unit 64 determines that the usage frequency of the view 4 of the "color selection" function is the smallest, so that the screen arrangement location selecting unit 64 determines that the view 4 is to be erased. FIG. 24F shows one example of a working palette in which the view 4 is erased.

Figure 24G:
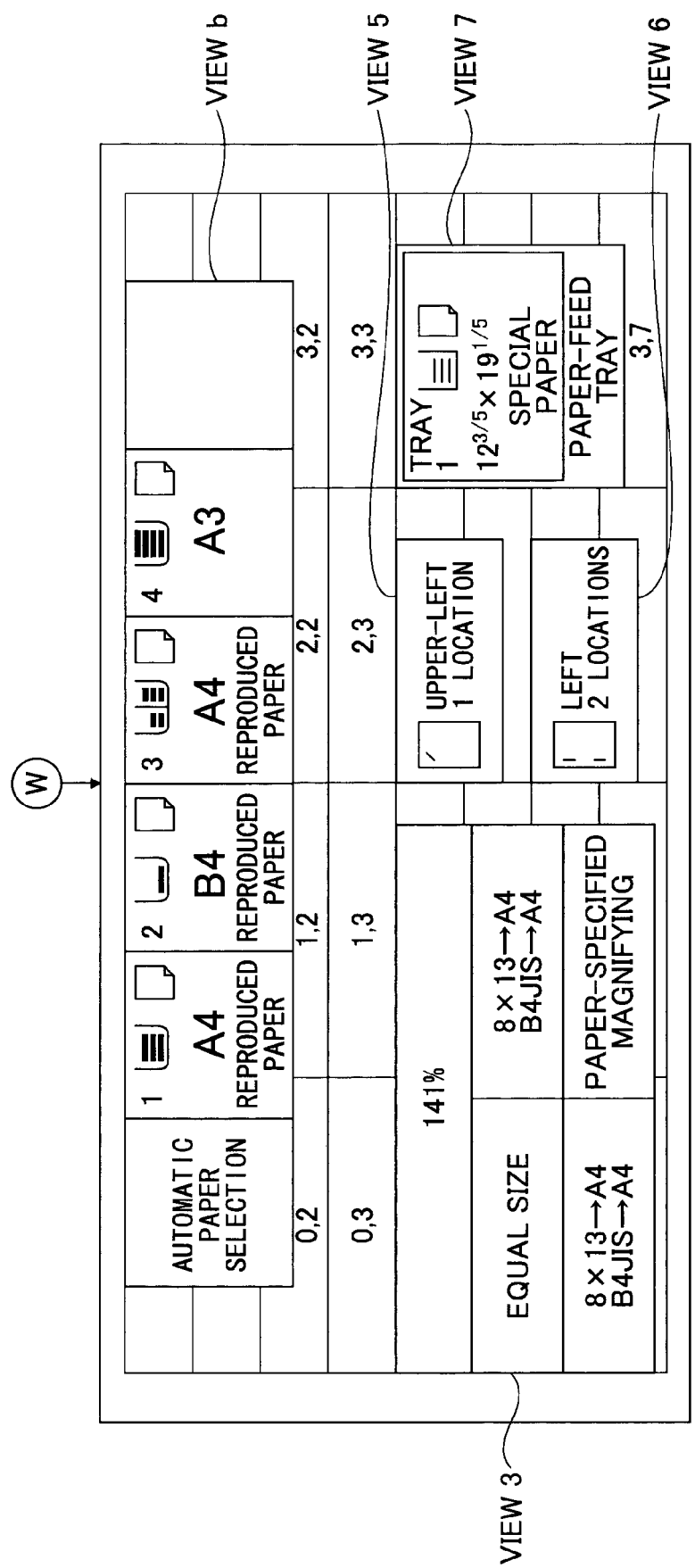

In this way, the screen arrangement location selecting unit 64 may determine that there is a space in which the view b can be arranged. Thus, the screen arrangement location selecting unit 64 arranges a selected view b in the space. FIG. 24G shows one example of a customized working palette. In FIG. 24G, it is seen that views 1, 2, and 4 of FIG. 24A are replaced by the view b.

As described above, the user may merely select a view in which a function and a setting value are integrally displayed to customize the operation screen 201. Moreover, the user may arrange a selected view as neighboring a view which belongs to the same function without designating a location for arrangement. Moreover, when there is no space in which a view is arranged, the display apparatus 100 may make a space unoccupied based on the usage frequency. Even in this case, the display apparatus 100 may arrange a selected view as neighboring a view which belongs to the same function. Thus, the number of times of operations required for customizing may be minimized.

Another Embodiment

While the user directly operates the operation panel 11 to customize the screen, the screen of the image forming apparatus 200 may also be customized from the PC (personal computer) 300.

FIG. 25 illustrates an example of an overview configuration diagram of a customized system to which are connected the image forming apparatus 200 and the PC 300. The image forming apparatus 200 and the PC 300 are connected via a network. The image forming apparatus 200 has a Web server function, while the PC 300 has a Web browser. When the user transmits a user name and a password from the PC 300 to the image forming apparatus 200, the image forming apparatus 200 authenticates the user, making the above customizing possible.

The user operates the PC 300 to designate an application and requests the image forming apparatus 200 to transmit an HTML file of the function list screen 202 of FIG. 14B. The image forming apparatus 200 transmits the HTML file of the function list screen 202 to the PC 300.

When the Web browser of the PC 300 displays the function list screen 202, the user uses a pointing device such as a mouse to select one function. The PC 300 requests the image forming apparatus 200 to transmit the HTML file of the view selecting screen 203 of FIG. 15A and result of selecting the function. The image forming apparatus 200 transmits the HTML file of the function list screen 203 to the PC 300.

When the Web browser of the PC 300 displays the view selecting screen 203, the user uses a pointing device such as a mouse to select one view. The PC 300 requests the image forming apparatus 200 to transmit the HTML file of the screen of the view selecting results. The image forming apparatus 200 transmits the HTML file of the view selecting screen 203, on which a result of selection of the view is reflected, to the PC 300.

When the user uses the mouse and the keyboard to select the "Next" button 203 the PC 300 requests the image forming apparatus 200 an arrangement process. The image forming apparatus 200 executes the arrangement process, determines the arrangement of the selected view, and transmits the HTML file of the customizing result checking screen 206 to the PC 300.

The Web browser of the PC 300 displays the customizing result checking screen 206 to make it possible for the user to check that the selected function is displayed on the selected view, and the view is arranged such that it neighbors one with the same function.

In this way, the display apparatus 100 of the present embodiments may also be applicable using the PC 300 if the image forming apparatus 200 and the PC 300 can communicate.

The present application is based on and claims the benefit of priority of Japanese Patent Application No. 2010-049361 filed on Mar. 5, 2010, the entire contents of which are hereby incorporated herein by reference.

The invention claimed is:
1. A display apparatus, comprising:
at least one processor; and
a memory storing instructions that, when executed by the at least one processor, cause the at least one processor to:
store layout specifying information specifying a layout of one or more function-setting components for selecting, from multiple setting values, a setting value for a function of application software, on an operation screen,
display the operation screen based on the layout specifying information,
store function-setting component information indicating, for each function, whether two or more of multiple function-setting components with a different setting value can be displayed on the operation screen,
display a list of functions for each application software,
accept a selection of a function from the list displayed and display in a list the multiple function-setting components corresponding to the selected function based on the function-setting component information corresponding to the selected function, accept a selection of a function-setting component from the list displayed, determine whether a function-setting component for the same function as the function set by the selected function-setting component is included in the layout specifying information, and, when determining that the function-setting component is included, determine whether two or more of the multiple function-setting components for the function can be displayed on the operation screen based on the function-setting component information stored, and when determining that the two or more of the multiple function-setting components can be displayed, update the layout specifying information to an arrangement of the selected function-setting component and the function-setting components included in the layout specifying information, and when determining that the two or more of the multiple function-setting components cannot be displayed, update the layout specifying information to an arrangement of the selected function-setting component, deleting a function-setting component for the same function as the function included in the layout specifying information.

2. The display apparatus as claimed in claim 1, wherein, based on size information of the selected function-setting component that is stored, the at least one processor detects an unoccupied space of the operation screen, on which space the selected function-setting component can be arranged.

3. The display apparatus as claimed in claim 2, wherein, when the function-setting component of the same function as the selected function-setting component is registered in the layout specifying information, the at least one processor arranges, in the unoccupied space which neighbors the function-setting component, the selected function-setting component.

4. The display apparatus as claimed in claim 2, wherein, based on a space of the operation screen and the size information of the selected function-setting component, the at least one processor determines whether the function-setting component which is already arranged on the operation screen may be re-arranged to yield the unoccupied space.

5. The display apparatus as claimed in claim 4, wherein, when the function-setting component of the same function as the selected function-setting component is registered in the layout specifying information, the at least one processor, after yielding the unoccupied space, arranges, in the unoccupied space which neighbors the function-setting component, the selected function-setting component.

6. The display apparatus as claimed in claim 5, wherein, when the function-setting component of the same function as the selected function-setting component is registered, and there is no unoccupied space which neighbors the function-setting component, after arranging, in the unoccupied space, the selected function-setting component, the at least one processor determines an arrangement of at least one of the selected function-setting component and the function-setting component such that the selected function-setting component and the function-setting component of the same function neighbor.

7. The display apparatus as claimed in claim 5, wherein, when it is determined that the function-setting component which is already arranged on the operation screen may not be re-arranged to yield the unoccupied space, the at least one processor, based on usage frequency information of the function-setting component, erases, from the operation screen, the function-setting component in ascending order of the usage frequency to yield the unoccupied space.

8. The display apparatus as claimed in claim 5, wherein, when it is determined that the function-setting component which is already arranged on the operation screen may not be re-arranged to yield the unoccupied space, the at least one processor, based on usage frequency information of the function, erases, from the operation screen, the function-setting component which belongs to the function in ascending order of the usage frequency of the function to yield the unoccupied space, the usage frequency information indicating the usage frequency for each function.

9. An image forming apparatus, comprising:
the display apparatus as claimed in claim 1; and
a printer that prints an image on a recording medium.

10. A method comprising the steps of:
displaying an operation screen based on layout specifying information, the layout specifying information specifying a layout of one or more function-setting components for selecting, from multiple setting values, a setting value for a function of application software, on the operation screen;
displaying a list of functions for each application software;
accepting a selection of a function from the list displayed;
displaying in a list multiple function-setting components corresponding to the selected function based on function-setting component information corresponding to the function selected, the function-setting component information being stored and indicating, for each function, whether two or more multiple function-setting components with a different setting value can be displayed on the operation screen;
accepting a selection of a function-setting component from the list displayed; determining whether a function-setting component for the same function as the function set by the selected function-setting component is included in the layout specifying information, and, when determining that the function-setting component is included, determining whether two or more of the multiple function-setting components for the function can be displayed based on the stored function-setting component information, and when determining that the two or more of the multiple function-setting components can be displayed, updating the layout specifying information to an arrangement of the selected function-setting component and the function-setting components included in the layout specifying information, and when determining that the two or more of the multiple function-setting components cannot be displayed, updating the layout specifying information to an arrangement of the selected function-setting component, deleting a function-setting component for the same function as the function included in the layout specifying information.

11. A non-transitory computer-readable storage medium including computer executable instructions, wherein the instructions, when executed by a CPU of a display apparatus, causes the display apparatus to perform a method, the method comprising:
displaying an operation screen based on layout specifying information, the layout specifying information specifying a layout of one or more function-setting components for selecting, from multiple setting values, a setting value for a function of application software, on the operation screen;
displaying a list of functions for each application software;

accepting a selection of a function from the list displayed;
displaying in a list multiple function-setting components corresponding to the selected function based on function-setting component information corresponding to the function selected, the function-setting component information being stored and indicating, for each function, whether two or more multiple function-setting components with a different setting value can be displayed on the operation screen;
accepting a selection of a function-setting component from the list displayed; determining whether a function-setting component for the same function as the function set by the selected function-setting component is included in the layout specifying information, and, when determining that the function-setting component is included, determining whether two or more of the multiple function-setting components for the function can be displayed based on the stored function-setting component information, and
when determining that the two or more of the multiple function-setting components can be displayed, updating the layout specifying information to an arrangement of the selected function-setting component and the function-setting components included in the layout specifying information, and when determining that the two or more of the multiple function-setting components cannot be displayed, updating the layout specifying information to an arrangement of the selected function-setting component, deleting a function-setting component for the same function as the function included in the layout specifying information.

* * * * *